(12) United States Patent
Parker et al.

(10) Patent No.: US 8,840,758 B2
(45) Date of Patent: Sep. 23, 2014

(54) PROCESSES TO PRODUCE SHORT CUT MICROFIBERS

(71) Applicant: Eastman Chemical Company, Kingsport, TN (US)

(72) Inventors: Kenny Randolph Parker, Afton, TN (US); Daniel William Klosiewicz, Kingsport, TN (US); Ramesh Chand Munjal, Kingsport, TN (US); David J Rogers, Jr., Kingsport, TN (US); Dustin A Tremaine, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 13/687,478

(22) Filed: Nov. 28, 2012

(65) Prior Publication Data

US 2013/0192779 A1    Aug. 1, 2013

Related U.S. Application Data

(60) Provisional application No. 61/592,854, filed on Jan. 31, 2012, provisional application No. 61/592,867, filed on Jan. 31, 2012, provisional application No. 61/592,917, filed on Jan. 31, 2012, provisional application No. 61/592,974, filed on Jan. 31, 2012.

(51) Int. Cl.
*B01D 12/00*    (2006.01)
*B01D 11/02*    (2006.01)
*C08G 63/688*    (2006.01)
*D21H 13/24*    (2006.01)

(52) U.S. Cl.
CPC ........ *C08G 63/6886* (2013.01); *B01D 11/0288* (2013.01); *B01D 12/00* (2013.01); *D21H 13/24* (2013.01)
USPC ......................................... 162/146; 210/774

(58) Field of Classification Search
CPC .............. B01D 12/00; B01D 11/0288; C08G 63/6886; D21H 13/24
USPC ........................................... 162/146; 210/774
See application file for complete search history.

(56) References Cited

U.S. PATENT DOCUMENTS 1,814,155 A    7/1931    Haughey
2,862,251 A    12/1958   Kalwaites (Continued)

FOREIGN PATENT DOCUMENTS

CA    1290517    10/1991
EP    0 340 763 A1    11/1989

(Continued)

OTHER PUBLICATIONS

Polymer Blends, vols. 1 and 2, Edited by D. R. Paul and C. B. Bucknell, 2000, John Wiley & Sons, Inc.

(Continued)

*Primary Examiner* — Jacob Thomas Minskey
(74) *Attorney, Agent, or Firm* — Polly C. Owen

(57) ABSTRACT

A process for producing a microfiber product stream, the process comprising:
(A) contacting short cut multicomponent fibers having a length of less than 25 millimeters with a heated aqueous stream in a mix zone to produce a short cut multicomponent fiber slurry;
(B) routing the short cut multicomponent fiber slurry and optionally, a heated aqueous stream, to a fiber opening zone to remove a portion of the water dispersible sulfopolyester to produce an opened microfiber slurry; and
(C) routing the opened microfiber slurry to a primary solid liquid separation zone to produce the microfiber product stream and a first mother liquor stream.

15 Claims, 11 Drawing Sheets

(56) References Cited

U.S. PATENT DOCUMENTS

| | | |
|---|---|---|
| 2,999,788 A | 9/1961 | Morgan |
| 3,018,272 A | 1/1962 | Griffing et al. |
| 3,033,822 A | 5/1962 | Kibler et al. |
| 3,049,469 A | 8/1962 | Davison et al. |
| 3,075,952 A | 1/1963 | Coover et al. |
| 3,372,084 A | 3/1968 | Hanns |
| 3,485,706 A | 12/1969 | Evans |
| 3,528,947 A | 9/1970 | Lappin et al. |
| 3,556,932 A | 1/1971 | Coscia et al. |
| 3,592,796 A | 7/1971 | Trapasso et al. |
| 3,772,076 A | 11/1973 | Keim |
| 3,779,993 A | 12/1973 | Kibler et al. |
| 3,783,093 A | 1/1974 | Gallacher et al. |
| 3,803,210 A | 4/1974 | Rod et al. |
| 3,833,457 A | 9/1974 | Misumi et al. |
| 3,846,507 A | 11/1974 | Thomm et al. |
| 3,998,740 A | 12/1976 | Bost et al. |
| 4,008,344 A | 2/1977 | Okamoto et al. |
| 4,073,777 A | 2/1978 | O'Neill et al. |
| 4,073,988 A | 2/1978 | Nishida et al. |
| 4,100,324 A | 7/1978 | Anderson et al. |
| 4,104,262 A | 8/1978 | Schade |
| 4,121,966 A | 10/1978 | Amano et al. |
| 4,127,696 A | 11/1978 | Okamoto |
| 4,137,393 A | 1/1979 | Sidebotham et al. |
| 4,145,469 A | 3/1979 | Newkirk et al. |
| 4,226,672 A | 10/1980 | Absolon et al. |
| 4,233,355 A | 11/1980 | Sato et al. |
| 4,234,652 A | 11/1980 | Vanoni et al. |
| 4,239,720 A | 12/1980 | Gerlach et al. |
| 4,240,918 A | 12/1980 | Lagasse et al. |
| 4,243,480 A | 1/1981 | Hernandez et al. |
| 4,288,503 A | 9/1981 | Goldberg |
| 4,297,412 A | 10/1981 | Achard et al. |
| 4,299,654 A | 11/1981 | Tlach et al. |
| 4,302,495 A | 11/1981 | Marra |
| 4,304,901 A | 12/1981 | O'Neill et al. |
| 4,342,801 A | 8/1982 | Gerlach et al. |
| 4,350,006 A | 9/1982 | Okamoto et al. |
| 4,365,041 A | 12/1982 | Okamoto et al. |
| 4,381,335 A | 4/1983 | Okamoto |
| 4,410,579 A | 10/1983 | Johns |
| 4,427,557 A | 1/1984 | Stockburger |
| 4,460,649 A | 7/1984 | Park et al. |
| 4,480,085 A | 10/1984 | Larson |
| 4,496,619 A | 1/1985 | Okamoto |
| 4,517,715 A | 5/1985 | Yoshida et al. |
| 4,569,343 A | 2/1986 | Kimura et al. |
| 4,618,524 A | 10/1986 | Groitzsch et al. |
| 4,647,497 A | 3/1987 | Weeks |
| 4,652,341 A | 3/1987 | Prior |
| 4,699,845 A | 10/1987 | Oikawa et al. |
| 4,738,785 A | 4/1988 | Langston et al. |
| 4,755,421 A | 7/1988 | Manning et al. |
| 4,795,668 A | 1/1989 | Krueger et al. |
| 4,804,719 A | 2/1989 | Weaver et al. |
| 4,810,775 A | 3/1989 | Bendix et al. |
| 4,863,785 A | 9/1989 | Berman et al. |
| 4,873,273 A | 10/1989 | Allan et al. |
| 4,910,292 A | 3/1990 | Blount |
| 4,921,899 A | 5/1990 | Phan et al. |
| 4,940,744 A | 7/1990 | Tortorici et al. |
| 4,943,477 A | 7/1990 | Kanamura et al. |
| 4,946,932 A | 8/1990 | Jenkins |
| 4,966,808 A | 10/1990 | Kawano |
| 4,973,656 A | 11/1990 | Blount |
| 4,990,593 A | 2/1991 | Blount |
| 4,996,252 A | 2/1991 | Phan et al. |
| 5,006,598 A | 4/1991 | Adams et al. |
| 5,039,339 A | 8/1991 | Phan et al. |
| 5,057,368 A | 10/1991 | Largman et al. |
| 5,069,970 A | 12/1991 | Largman et al. |
| 5,073,436 A | 12/1991 | Antonacci et al. |
| 5,108,820 A | 4/1992 | Kaneko et al. |
| 5,124,194 A | 6/1992 | Kawano |
| 5,158,844 A | 10/1992 | Hagens et al. |
| 5,162,074 A | 11/1992 | Hills |
| 5,162,399 A | 11/1992 | Sharma et al. |
| 5,171,767 A | 12/1992 | Buckley et al. |
| 5,176,952 A | 1/1993 | Joseph et al. |
| 5,218,042 A | 6/1993 | Kuo et al. |
| 5,242,640 A | 9/1993 | Butler et al. |
| 5,254,399 A | 10/1993 | Oku et al. |
| 5,258,220 A | 11/1993 | Joseph |
| 5,262,460 A | 11/1993 | Suzuki et al. |
| 5,274,025 A | 12/1993 | Stockl et al. |
| 5,277,976 A | 1/1994 | Hogle et al. |
| 5,281,306 A | 1/1994 | Kakiuchi et al. |
| 5,286,843 A | 2/1994 | Wood |
| 5,290,626 A | 3/1994 | Nishioi et al. |
| 5,290,631 A | 3/1994 | Fleury et al. |
| 5,290,654 A | 3/1994 | Sacripante et al. |
| 5,292,075 A | 3/1994 | Bartlett |
| 5,292,581 A | 3/1994 | Viazmensky et al. |
| 5,292,855 A | 3/1994 | Krutak et al. |
| 5,296,286 A | 3/1994 | Allen et al. |
| 5,308,697 A | 5/1994 | Muramoto et al. |
| 5,336,552 A | 8/1994 | Strack et al. |
| 5,338,406 A | 8/1994 | Smith |
| 5,342,863 A | 8/1994 | Buckley et al. |
| 5,366,804 A | 11/1994 | Dugan |
| 5,368,928 A | 11/1994 | Okamura et al. |
| 5,369,210 A | 11/1994 | George et al. |
| 5,369,211 A | 11/1994 | George et al. |
| 5,374,357 A | 12/1994 | Comstock et al. |
| 5,375,306 A | 12/1994 | Roussin-Moynier |
| 5,378,757 A | 1/1995 | Blount, Jr. et al. |
| 5,382,400 A | 1/1995 | Pike et al. |
| 5,386,003 A | 1/1995 | Greene et al. |
| 5,389,068 A | 2/1995 | Keck |
| 5,395,693 A | 3/1995 | Cho et al. |
| 5,405,698 A | 4/1995 | Dugan |
| 5,416,156 A | 5/1995 | Kamen |
| 5,423,432 A | 6/1995 | Krutak et al. |
| 5,431,994 A | 7/1995 | Kozulla |
| 5,446,079 A | 8/1995 | Buchanan et al. |
| 5,449,464 A | 9/1995 | El-Shall |
| 5,456,982 A | 10/1995 | Hansen et al. |
| 5,466,410 A | 11/1995 | Hills |
| 5,466,518 A | 11/1995 | Isaac et al. |
| 5,468,536 A | 11/1995 | Whitcomb et al. |
| 5,472,600 A | 12/1995 | Ellefson et al. |
| 5,482,772 A | 1/1996 | Strack et al. |
| 5,486,418 A | 1/1996 | Ohmory et al. |
| 5,496,627 A | 3/1996 | Bagrodia et al. |
| 5,498,468 A | 3/1996 | Blaney |
| 5,502,091 A | 3/1996 | Dasgupta |
| 5,508,101 A | 4/1996 | Patnode et al. |
| 5,509,913 A | 4/1996 | Yeo |
| 5,525,282 A | 6/1996 | Dugan |
| 5,530,059 A | 6/1996 | Blount, Jr. et al. |
| 5,536,811 A | 7/1996 | Wood |
| 5,543,488 A | 8/1996 | Miller et al. |
| 5,545,481 A | 8/1996 | Harrington |
| 5,552,495 A | 9/1996 | Miller et al. |
| 5,559,171 A | 9/1996 | Buchanan et al. |
| 5,559,205 A | 9/1996 | Hansen et al. |
| 5,567,510 A | 10/1996 | Patnode et al. |
| 5,571,620 A | 11/1996 | George et al. |
| 5,575,918 A | 11/1996 | Virnig et al. |
| 5,580,911 A | 12/1996 | Buchanan et al. |
| 5,593,778 A | 1/1997 | Kondo et al. |
| 5,593,807 A | 1/1997 | Sacripante et al. |
| 5,599,858 A | 2/1997 | Buchanan et al. |
| 5,605,746 A | 2/1997 | Groeger et al. |
| 5,607,491 A | 3/1997 | Jackson et al. |
| 5,607,765 A | 3/1997 | Hansen et al. |
| 5,620,785 A | 4/1997 | Watt et al. |
| 5,630,972 A | 5/1997 | Patnode et al. |
| 5,635,071 A | 6/1997 | Al-Samadi |
| 5,637,385 A | 6/1997 | Mizuki et al. |
| 5,643,662 A | 7/1997 | Yeo et al. |
| 5,646,237 A | 7/1997 | George et al. |
| 5,652,048 A | 7/1997 | Haynes et al. |

(56) References Cited

U.S. PATENT DOCUMENTS

| | | |
|---|---|---|
| 5,654,086 A | 8/1997 | Nishijima et al. |
| 5,658,704 A | 8/1997 | Patel et al. |
| 5,660,965 A | 8/1997 | Mychajlowskij et al. |
| 5,672,415 A | 9/1997 | Sawyer et al. |
| 5,688,582 A | 11/1997 | Nagaoka et al. |
| 5,698,331 A | 12/1997 | Matsumura et al. |
| 5,709,940 A | 1/1998 | George et al. |
| 5,736,083 A | 4/1998 | Dugan |
| 5,750,605 A | 5/1998 | Blumenthal et al. |
| 5,753,351 A | 5/1998 | Yoshida et al. |
| 5,759,926 A | 6/1998 | Pike et al. |
| 5,762,758 A | 6/1998 | Hoffman |
| 5,763,065 A | 6/1998 | Patnode et al. |
| 5,779,736 A | 7/1998 | Frederick et al. |
| 5,783,503 A | 7/1998 | Gillespie et al. |
| 5,785,725 A | 7/1998 | Cusick et al. |
| 5,798,078 A | 8/1998 | Myers |
| 5,817,740 A | 10/1998 | Anderson et al. |
| 5,820,982 A | 10/1998 | Salsman |
| 5,837,658 A | 11/1998 | Stork |
| 5,843,311 A | 12/1998 | Richter et al. |
| 5,853,701 A | 12/1998 | George et al. |
| 5,853,944 A | 12/1998 | Foucher et al. |
| 5,871,845 A | 2/1999 | Dahringer et al. |
| 5,883,181 A | 3/1999 | Cicchiello et al. |
| 5,888,916 A | 3/1999 | Tadokoro et al. |
| 5,895,710 A | 4/1999 | Sasse et al. |
| 5,916,678 A | 6/1999 | Jackson et al. |
| 5,916,687 A | 6/1999 | Takanashi et al. |
| 5,916,725 A | 6/1999 | Patel et al. |
| 5,916,935 A | 6/1999 | Wiggins et al. |
| 5,935,880 A | 8/1999 | Wang et al. |
| 5,935,883 A | 8/1999 | Pike |
| 5,935,884 A | 8/1999 | Williams et al. |
| 5,948,710 A | 9/1999 | Pomplun et al. |
| 5,952,251 A | 9/1999 | Jackson et al. |
| 5,954,967 A | 9/1999 | Egraz et al. |
| 5,970,583 A | 10/1999 | Groten et al. |
| 5,976,694 A | 11/1999 | Tsai et al. |
| 5,993,668 A | 11/1999 | Duan |
| 5,993,834 A | 11/1999 | Shah et al. |
| 6,004,673 A | 12/1999 | Nishijima |
| 6,007,910 A | 12/1999 | Miller et al. |
| 6,020,420 A | 2/2000 | George |
| 6,037,055 A | 3/2000 | Aneja et al. |
| 6,057,388 A | 5/2000 | Wiggins et al. |
| 6,080,471 A | 6/2000 | Shigematsu et al. |
| 6,090,731 A | 7/2000 | Pike et al. |
| 6,110,249 A | 8/2000 | Medcalf et al. |
| 6,110,588 A | 8/2000 | Perez et al. |
| 6,110,636 A | 8/2000 | Foucher et al. |
| 6,114,407 A | 9/2000 | Myers |
| 6,120,889 A | 9/2000 | Turner et al. |
| 6,121,170 A | 9/2000 | Tsai et al. |
| 6,162,340 A | 12/2000 | Zakikhani |
| 6,162,890 A | 12/2000 | George et al. |
| 6,168,719 B1 | 1/2001 | Shimokawa et al. |
| 6,171,685 B1 | 1/2001 | George et al. |
| 6,174,602 B1 | 1/2001 | Matsui et al. |
| 6,177,193 B1 | 1/2001 | Tsai et al. |
| 6,177,607 B1 | 1/2001 | Blaney et al. |
| 6,183,648 B1 | 2/2001 | Kozak et al. |
| 6,200,669 B1 | 3/2001 | Marmon et al. |
| 6,211,309 B1 | 4/2001 | McIntosh et al. |
| 6,218,321 B1 | 4/2001 | Lorcks et al. |
| 6,225,243 B1 | 5/2001 | Austin |
| 6,235,392 B1 | 5/2001 | Luo et al. |
| 6,248,809 B1 | 6/2001 | Buckley et al. |
| 6,294,645 B1 | 9/2001 | Allen et al. |
| 6,296,933 B1 | 10/2001 | Goda et al. |
| 6,300,306 B1 | 10/2001 | Firkins et al. |
| 6,316,592 B1 | 11/2001 | Bates et al. |
| 6,322,887 B1 | 11/2001 | Matsui et al. |
| 6,331,606 B1 | 12/2001 | Sun |
| 6,332,994 B1 | 12/2001 | Karageorgiou |
| 6,335,092 B1 | 1/2002 | Takeda et al. |
| 6,348,679 B1 | 2/2002 | Ryan et al. |
| 6,352,948 B1 | 3/2002 | Pike et al. |
| 6,355,137 B1 | 3/2002 | Staib |
| 6,361,784 B1 | 3/2002 | Brennan et al. |
| 6,365,697 B1 | 4/2002 | Kim et al. |
| 6,369,136 B2 | 4/2002 | Sorriero et al. |
| 6,381,817 B1 | 5/2002 | Moody, III |
| 6,384,108 B1 | 5/2002 | Breton et al. |
| 6,402,870 B1 | 6/2002 | Groten et al. |
| 6,403,677 B1 | 6/2002 | Walker |
| 6,417,251 B1 | 7/2002 | Brady |
| 6,420,024 B1 | 7/2002 | Perez et al. |
| 6,420,027 B2 | 7/2002 | Kimura et al. |
| 6,428,900 B1 | 8/2002 | Wang |
| 6,429,253 B1 | 8/2002 | Guerro et al. |
| 6,430,348 B1 | 8/2002 | Asano et al. |
| 6,432,532 B2 | 8/2002 | Perez et al. |
| 6,432,850 B1 | 8/2002 | Takagi et al. |
| 6,436,855 B1 | 8/2002 | Iwata et al. |
| 6,440,556 B2 | 8/2002 | Matsui et al. |
| 6,441,267 B1 | 8/2002 | Dugan |
| 6,471,910 B1 | 10/2002 | Haggard |
| 6,488,731 B2 | 12/2002 | Schultheiss et al. |
| 6,506,853 B2 | 1/2003 | Duan |
| 6,509,092 B1 | 1/2003 | Dugan |
| 6,512,024 B1 | 1/2003 | Lundgard et al. |
| 6,533,938 B1 | 3/2003 | Dilorio et al. |
| 6,541,175 B1 | 4/2003 | Jiang et al. |
| 6,548,592 B1 | 4/2003 | Lang et al. |
| 6,550,622 B2 | 4/2003 | Koslow |
| 6,551,353 B1 | 4/2003 | Baker et al. |
| 6,552,123 B1 | 4/2003 | Katayama et al. |
| 6,552,162 B1 | 4/2003 | Wang et al. |
| 6,554,881 B1 | 4/2003 | Healey |
| 6,573,204 B1 | 6/2003 | Philipp et al. |
| 6,576,716 B1 | 6/2003 | Wo |
| 6,579,466 B1 | 6/2003 | David et al. |
| 6,583,075 B1 | 6/2003 | Dugan |
| 6,586,529 B2 | 7/2003 | Mumick et al. |
| 6,589,426 B1 | 7/2003 | Husain et al. |
| 6,602,955 B2 | 8/2003 | Soerens et al. |
| H2086 H | 10/2003 | Amsler |
| 6,638,677 B2 | 10/2003 | Patel et al. |
| 6,657,017 B2 | 12/2003 | Wo et al. |
| 6,664,437 B2 | 12/2003 | Sawyer et al. |
| 6,692,825 B2 | 2/2004 | Qin et al. |
| 6,706,652 B2 | 3/2004 | Groten et al. |
| 6,720,063 B2 | 4/2004 | Kobayashi et al. |
| 6,730,387 B2 | 5/2004 | Rezai et al. |
| 6,743,506 B2 | 6/2004 | Bond et al. |
| 6,746,766 B2 | 6/2004 | Bond et al. |
| 6,746,779 B2 | 6/2004 | Hayes et al. |
| 6,759,124 B2 | 7/2004 | Royer et al. |
| 6,764,802 B2 | 7/2004 | Maric et al. |
| 6,767,498 B1 | 7/2004 | Talley, Jr. et al. |
| 6,776,858 B2 | 8/2004 | Bansal et al. |
| 6,780,560 B2 | 8/2004 | Farrugia et al. |
| 6,780,942 B2 | 8/2004 | Leon et al. |
| 6,787,245 B1 | 9/2004 | Hayes |
| 6,787,425 B1 | 9/2004 | Rotondaro et al. |
| 6,815,382 B1 | 11/2004 | Groten et al. |
| 6,838,172 B2 | 1/2005 | Yoon et al. |
| 6,838,403 B2 | 1/2005 | Tsai et al. |
| 6,841,038 B2 | 1/2005 | Horenziak et al. |
| 6,844,062 B2 | 1/2005 | Matsui et al. |
| 6,844,063 B2 | 1/2005 | Matsui et al. |
| 6,849,329 B2 | 2/2005 | Perez et al. |
| 6,855,422 B2 | 2/2005 | Magill et al. |
| 6,860,906 B2 | 3/2005 | Malisz et al. |
| 6,861,142 B1 | 3/2005 | Wilkie et al. |
| 6,890,649 B2 | 5/2005 | Hobbs et al. |
| 6,893,711 B2 | 5/2005 | Williamson et al. |
| 6,900,148 B2 | 5/2005 | Yoneda et al. |
| 6,902,796 B2 | 6/2005 | Morell et al. |
| 6,946,506 B2 | 9/2005 | Bond et al. |
| 6,949,288 B2 | 9/2005 | Hodge et al. |
| 6,953,622 B2 | 10/2005 | Tsai et al. |
| 6,989,193 B2 | 1/2006 | Haile et al. |

(56) References Cited

U.S. PATENT DOCUMENTS

| | | |
|---|---|---|
| 6,989,194 B2 | 1/2006 | Bansal et al. |
| 7,008,485 B2 | 3/2006 | Heikkila et al. |
| 7,011,653 B2 | 3/2006 | Imsangjan et al. |
| 7,011,885 B2 | 3/2006 | Chang et al. |
| 7,014,803 B2 | 3/2006 | Perez et al. |
| 7,022,201 B2 | 4/2006 | Anderson et al. |
| 7,025,885 B2 | 4/2006 | Cote et al. |
| 7,026,033 B2 | 4/2006 | Fujimori et al. |
| 7,070,695 B2 | 7/2006 | Husain et al. |
| 7,087,301 B2 | 8/2006 | Musgrave et al. |
| 7,091,140 B1 | 8/2006 | Ferencz et al. |
| 7,097,904 B2 | 8/2006 | Ochi et al. |
| 7,112,389 B1 | 9/2006 | Arora et al. |
| 7,144,614 B2 | 12/2006 | Nakajima et al. |
| 7,160,612 B2 | 1/2007 | Magill et al. |
| 7,163,744 B2 | 1/2007 | Nightingale et al. |
| 7,166,225 B2 | 1/2007 | Pitt et al. |
| 7,179,376 B2 | 2/2007 | Kaleem et al. |
| 7,186,343 B2 | 3/2007 | Rabie et al. |
| 7,186,344 B2 | 3/2007 | Hughes |
| 7,193,029 B2 | 3/2007 | Hayes |
| 7,194,788 B2 | 3/2007 | Clark et al. |
| 7,195,814 B2 | 3/2007 | Ista et al. |
| 7,214,765 B2 | 5/2007 | Ringeisen et al. |
| 7,220,815 B2 | 5/2007 | Hayes |
| 7,238,415 B2 | 7/2007 | Rodriguez et al. |
| 7,238,423 B2 | 7/2007 | Calhoun et al. |
| 7,241,497 B2 | 7/2007 | Magill et al. |
| 7,276,139 B2 | 10/2007 | Katai et al. |
| 7,285,209 B2 | 10/2007 | Yu et al. |
| 7,291,270 B2 | 11/2007 | Gibson et al. |
| 7,291,389 B1 | 11/2007 | Bitler et al. |
| 7,304,125 B2 | 12/2007 | Ibar |
| 7,306,735 B2 | 12/2007 | Baggott et al. |
| 7,309,372 B2 | 12/2007 | Kahlbaugh et al. |
| 7,314,497 B2 | 1/2008 | Kahlbaugh et al. |
| 7,329,723 B2 | 2/2008 | Jernigan et al. |
| 7,338,664 B2 | 3/2008 | Tseng et al. |
| 7,344,775 B2 | 3/2008 | Stevens et al. |
| 7,347,947 B2 | 3/2008 | Nakamura et al. |
| 7,357,985 B2 | 4/2008 | Kurian et al. |
| 7,358,022 B2 | 4/2008 | Farrugia et al. |
| 7,358,323 B2 | 4/2008 | Maeda et al. |
| 7,358,325 B2 | 4/2008 | Hayes |
| 7,361,700 B2 | 4/2008 | Sunamori et al. |
| 7,365,118 B2 | 4/2008 | McCleskey et al. |
| 7,371,701 B2 | 5/2008 | Inagaki |
| 7,387,976 B2 | 6/2008 | Baba et al. |
| 7,388,058 B2 | 6/2008 | Kaku et al. |
| 7,405,171 B2 | 7/2008 | Tsujiyama et al. |
| 7,405,266 B2 | 7/2008 | Bentley et al. |
| 7,432,219 B2 | 10/2008 | Strandqvist et al. |
| 7,442,277 B2 | 10/2008 | Kupper et al. |
| 7,462,386 B2 | 12/2008 | Yamasaki et al. |
| 7,497,895 B2 | 3/2009 | Sabottke |
| 7,513,004 B2 | 4/2009 | Luckman et al. |
| 7,544,444 B2 | 6/2009 | Adachi et al. |
| 7,560,159 B2 | 7/2009 | Goda et al. |
| 7,576,019 B2 | 8/2009 | Bond et al. |
| 7,588,688 B2 | 9/2009 | Butters et al. |
| 7,622,188 B2 | 11/2009 | Kamiyama et al. |
| 7,635,745 B2 | 12/2009 | Gupta et al. |
| 7,655,070 B1 | 2/2010 | Dallas et al. |
| 7,666,500 B2 | 2/2010 | Magill et al. |
| 7,666,502 B2 | 2/2010 | Magill et al. |
| 7,666,504 B2 | 2/2010 | Ochi et al. |
| 7,674,510 B2 | 3/2010 | Kamiya |
| 7,687,143 B2 | 3/2010 | Gupta et al. |
| 7,695,812 B2 | 4/2010 | Peng et al. |
| 7,696,111 B2 | 4/2010 | Mangold et al. |
| 7,704,595 B2 | 4/2010 | Morin |
| 7,718,104 B2 | 5/2010 | MacDonald et al. |
| 7,727,627 B2 | 6/2010 | Sen et al. |
| 7,732,557 B2 | 6/2010 | Phelps et al. |
| 7,736,737 B2 | 6/2010 | Van Dun et al. |
| 7,737,060 B2 | 6/2010 | Strickler et al. |
| 7,744,807 B2 | 6/2010 | Berrigan et al. |
| 7,754,123 B2 | 7/2010 | Verdegan et al. |
| 7,757,811 B2 | 7/2010 | Fox et al. |
| 7,765,647 B2 | 8/2010 | Smith et al. |
| 7,772,456 B2 | 8/2010 | Zhang et al. |
| 7,820,568 B2 | 10/2010 | Horiguchi et al. |
| 7,837,814 B2 | 11/2010 | Minami et al. |
| 7,858,732 B2 | 12/2010 | Bruchmann et al. |
| 7,883,604 B2 | 2/2011 | Dyer et al. |
| 7,884,037 B2 | 2/2011 | Sirovatka et al. |
| 7,887,526 B2 | 2/2011 | Van Gompel et al. |
| 7,892,672 B2 | 2/2011 | Nishikawa |
| 7,892,992 B2 | 2/2011 | Kamada et al. |
| 7,892,993 B2 | 2/2011 | Gupta et al. |
| 7,896,940 B2 | 3/2011 | Sundet et al. |
| 7,897,078 B2 | 3/2011 | Petersen et al. |
| 7,897,248 B2 | 3/2011 | Barrera et al. |
| 7,902,094 B2 | 3/2011 | Haile et al. |
| 7,902,096 B2 | 3/2011 | Brandner et al. |
| 7,910,207 B2 | 3/2011 | Kamiyama et al. |
| 7,914,866 B2 | 3/2011 | Shannon et al. |
| 7,918,313 B2 | 4/2011 | Gross et al. |
| 7,919,419 B2 | 4/2011 | Hurley et al. |
| 7,922,959 B2 | 4/2011 | Jones et al. |
| 7,923,143 B2 | 4/2011 | Tanaka et al. |
| 7,928,025 B2 | 4/2011 | Shipley et al. |
| 7,931,457 B2 | 4/2011 | Johnson et al. |
| 7,932,192 B2 | 4/2011 | Fujisawa et al. |
| 7,935,645 B2 | 5/2011 | Pourdeyhimi et al. |
| 7,947,142 B2 | 5/2011 | Fox et al. |
| 7,947,864 B2 | 5/2011 | Damay et al. |
| 7,951,313 B2 | 5/2011 | Matsubayashi et al. |
| 7,951,452 B2 | 5/2011 | Nakayama et al. |
| 7,959,848 B2 | 6/2011 | Reneker et al. |
| 8,021,457 B2 | 9/2011 | Dema et al. |
| 8,057,567 B2 | 11/2011 | Webb et al. |
| 8,129,019 B2 | 3/2012 | Pourdeyhimi et al. |
| 8,148,278 B2 | 4/2012 | Gupta et al. |
| 8,158,244 B2 | 4/2012 | Gupta et al. |
| 8,163,385 B2 | 4/2012 | Gupta et al. |
| 8,178,199 B2 | 5/2012 | Gupta et al. |
| 8,216,953 B2 | 7/2012 | Haile et al. |
| 8,227,362 B2 | 7/2012 | Haile et al. |
| 8,236,713 B2 | 8/2012 | Haile et al. |
| 8,247,335 B2 | 8/2012 | Haile et al. |
| 8,257,628 B2 | 9/2012 | Gupta et al. |
| 8,262,958 B2 | 9/2012 | Haile et al. |
| 8,273,451 B2 | 9/2012 | Gupta et al. |
| 8,277,706 B2 | 10/2012 | Gupta et al. |
| 8,314,041 B2 | 11/2012 | Gupta et al. |
| 8,388,877 B2 | 3/2013 | Gupta et al. |
| 8,398,907 B2 | 3/2013 | Gupta et al. |
| 8,435,908 B2 | 5/2013 | Haile et al. |
| 8,444,895 B2 | 5/2013 | Haile et al. |
| 8,444,896 B2 | 5/2013 | Haile et al. |
| 8,512,519 B2 | 8/2013 | Gupta et al. |
| 8,513,147 B2 | 8/2013 | Gupta et al. |
| 8,557,374 B2 | 10/2013 | Gupta et al. |
| 8,623,247 B2 | 1/2014 | Haile et al. |
| 2002/0009590 A1 | 1/2002 | Matsui et al. |
| 2002/0030016 A1 | 3/2002 | Schmidt |
| 2002/0079121 A1 | 6/2002 | Ryan et al. |
| 2002/0106510 A1 | 8/2002 | Deguchi et al. |
| 2002/0123290 A1 | 9/2002 | Tsai et al. |
| 2002/0127937 A1 | 9/2002 | Lange et al. |
| 2002/0127939 A1 | 9/2002 | Hwo et al. |
| 2002/0146552 A1 | 10/2002 | Mumick et al. |
| 2002/0187329 A1 | 12/2002 | Ista et al. |
| 2003/0026986 A1 | 2/2003 | Matsui et al. |
| 2003/0057155 A1 | 3/2003 | Husain et al. |
| 2003/0077444 A1 | 4/2003 | Bond et al. |
| 2003/0091822 A1 | 5/2003 | Bond et al. |
| 2003/0092343 A1 | 5/2003 | Bond et al. |
| 2003/0104204 A1 | 6/2003 | Bond et al. |
| 2003/0111763 A1 | 6/2003 | Jen |
| 2003/0166370 A1 | 9/2003 | Harris et al. |
| 2003/0166371 A1 | 9/2003 | Fingal et al. |
| 2003/0168191 A1 | 9/2003 | Hansen et al. |

(56) References Cited

U.S. PATENT DOCUMENTS

| | | |
|---|---|---|
| 2003/0176132 A1 | 9/2003 | Moriyasu et al. |
| 2003/0194558 A1 | 10/2003 | Anderson |
| 2003/0196955 A1 | 10/2003 | Hughes |
| 2004/0054331 A1 | 3/2004 | Hamilton et al. |
| 2004/0081829 A1 | 4/2004 | Klier et al. |
| 2004/0157037 A1 | 8/2004 | Yamaguchi et al. |
| 2004/0194558 A1 | 10/2004 | Nagase |
| 2004/0209058 A1 | 10/2004 | Chou et al. |
| 2004/0211729 A1 | 10/2004 | Sunkara et al. |
| 2004/0214495 A1 | 10/2004 | Foss et al. |
| 2004/0242106 A1 | 12/2004 | Rabasco et al. |
| 2004/0242838 A1 | 12/2004 | Duan |
| 2004/0258910 A1 | 12/2004 | Haile et al. |
| 2004/0260034 A1 | 12/2004 | Haile et al. |
| 2005/0026527 A1 | 2/2005 | Schmidt et al. |
| 2005/0027098 A1 | 2/2005 | Hayes |
| 2005/0032450 A1 | 2/2005 | Haggard et al. |
| 2005/0079781 A1 | 4/2005 | Tsujimoto et al. |
| 2005/0115902 A1 | 6/2005 | Kaleem et al. |
| 2005/0125908 A1 | 6/2005 | Pourdeyhimi |
| 2005/0148261 A1 | 7/2005 | Close et al. |
| 2005/0171250 A1 | 8/2005 | Hayes |
| 2005/0208300 A1 | 9/2005 | Magill et al. |
| 2005/0215157 A1 | 9/2005 | Dugan et al. |
| 2005/0221709 A1 | 10/2005 | Jordan et al. |
| 2005/0222956 A1 | 10/2005 | Bristow et al. |
| 2005/0227068 A1 | 10/2005 | Dugan |
| 2005/0239359 A1 | 10/2005 | Jones et al. |
| 2005/0282008 A1 | 12/2005 | Haile et al. |
| 2005/0287895 A1 | 12/2005 | Bansal |
| 2006/0011544 A1 | 1/2006 | Sharma et al. |
| 2006/0019570 A1 | 1/2006 | Groten et al. |
| 2006/0021938 A1 | 2/2006 | Diallo |
| 2006/0030230 A1 | 2/2006 | Nagaoka et al. |
| 2006/0035556 A1 | 2/2006 | Yokoi et al. |
| 2006/0049386 A1 | 3/2006 | Kody et al. |
| 2006/0051575 A1 | 3/2006 | Yoon et al. |
| 2006/0057350 A1 | 3/2006 | Ochi et al. |
| 2006/0057373 A1 | 3/2006 | Inagaki et al. |
| 2006/0060529 A1 | 3/2006 | Cote et al. |
| 2006/0065600 A1 | 3/2006 | Sunkara et al. |
| 2006/0081330 A1 | 4/2006 | Minami et al. |
| 2006/0083917 A1 | 4/2006 | Dugan |
| 2006/0093814 A1 | 5/2006 | Chang |
| 2006/0093819 A1 | 5/2006 | Atwood et al. |
| 2006/0113033 A1 | 6/2006 | Bruner |
| 2006/0128247 A1 | 6/2006 | Skoog et al. |
| 2006/0135020 A1 | 6/2006 | Weinberg et al. |
| 2006/0147709 A1 | 7/2006 | Mizumura et al. |
| 2006/0155094 A1 | 7/2006 | Meckel et al. |
| 2006/0159918 A1 | 7/2006 | Dugan et al. |
| 2006/0177656 A1 | 8/2006 | Kolmes et al. |
| 2006/0189956 A1 | 8/2006 | Catalan |
| 2006/0194027 A1 | 8/2006 | Pourdeyhimi et al. |
| 2006/0194047 A1 | 8/2006 | Gupta et al. |
| 2006/0204753 A1 | 9/2006 | Simmonds et al. |
| 2006/0210797 A1 | 9/2006 | Masuda et al. |
| 2006/0230731 A1 | 10/2006 | Kalayci et al. |
| 2006/0234049 A1 | 10/2006 | Van Dun et al. |
| 2006/0234050 A1 | 10/2006 | Frankel |
| 2006/0234587 A1 | 10/2006 | Horiguchi et al. |
| 2006/0263601 A1 | 11/2006 | Wang et al. |
| 2006/0281383 A1 | 12/2006 | Schmitt et al. |
| 2007/0009736 A1 | 1/2007 | Chuang et al. |
| 2007/0020453 A1 | 1/2007 | Sen et al. |
| 2007/0021021 A1 | 1/2007 | Verdegan et al. |
| 2007/0031637 A1 | 2/2007 | Anderson |
| 2007/0031668 A1 | 2/2007 | Hietpas et al. |
| 2007/0039889 A1 | 2/2007 | Ashford |
| 2007/0048523 A1 | 3/2007 | Pollet et al. |
| 2007/0056906 A1 | 3/2007 | Kaleem et al. |
| 2007/0062872 A1 | 3/2007 | Parker et al. |
| 2007/0074628 A1 | 4/2007 | Jones et al. |
| 2007/0077427 A1 | 4/2007 | Dugan |
| 2007/0098982 A1 | 5/2007 | Nishida et al. |
| 2007/0102361 A1 | 5/2007 | Kiefer et al. |
| 2007/0110980 A1 | 5/2007 | Shah |
| 2007/0110998 A1 | 5/2007 | Steele et al. |
| 2007/0114177 A1 | 5/2007 | Sabottke |
| 2007/0122613 A1 | 5/2007 | Stevens et al. |
| 2007/0122614 A1 | 5/2007 | Peng et al. |
| 2007/0128404 A1 | 6/2007 | Tung et al. |
| 2007/0167096 A1 | 7/2007 | Scott |
| 2007/0179275 A1 | 8/2007 | Gupta et al. |
| 2007/0182040 A1 | 8/2007 | Suzuki et al. |
| 2007/0190319 A1 | 8/2007 | Kalayci |
| 2007/0232179 A1 | 10/2007 | Polat et al. |
| 2007/0232180 A1 | 10/2007 | Polat et al. |
| 2007/0243377 A1 | 10/2007 | Nishida et al. |
| 2007/0254153 A1 | 11/2007 | Nadkarni et al. |
| 2007/0258935 A1 | 11/2007 | McEntire et al. |
| 2007/0259029 A1 | 11/2007 | McEntire et al. |
| 2007/0259177 A1 | 11/2007 | Gupta et al. |
| 2007/0264520 A1 | 11/2007 | Wood et al. |
| 2007/0278151 A1 | 12/2007 | Musale |
| 2007/0278152 A1 | 12/2007 | Musale |
| 2008/0000836 A1 | 1/2008 | Wang et al. |
| 2008/0003400 A1 | 1/2008 | Tseng |
| 2008/0003905 A1 | 1/2008 | Tseng et al. |
| 2008/0003912 A1 | 1/2008 | Pourdeyhimi et al. |
| 2008/0009574 A1 | 1/2008 | Huenefeld et al. |
| 2008/0009650 A1 | 1/2008 | Sluijmers et al. |
| 2008/0011680 A1 | 1/2008 | Partridge et al. |
| 2008/0038974 A1 | 2/2008 | Eagles |
| 2008/0039540 A1 | 2/2008 | Reitz |
| 2008/0064285 A1 | 3/2008 | Morton et al. |
| 2008/0134652 A1 | 6/2008 | Lim et al. |
| 2008/0160278 A1 | 7/2008 | Cheng et al. |
| 2008/0160856 A1 | 7/2008 | Chen et al. |
| 2008/0160859 A1 | 7/2008 | Gupta et al. |
| 2008/0170982 A1 | 7/2008 | Zhang et al. |
| 2008/0188151 A1 | 8/2008 | Yokoi et al. |
| 2008/0207833 A1 | 8/2008 | Bear et al. |
| 2008/0229672 A1 | 9/2008 | Woo et al. |
| 2008/0233850 A1 | 9/2008 | Woo et al. |
| 2008/0245037 A1 | 10/2008 | Rogers et al. |
| 2008/0264586 A1 | 10/2008 | Likitalo et al. |
| 2008/0287026 A1 | 11/2008 | Chakravarty et al. |
| 2008/0305389 A1 | 12/2008 | Arora et al. |
| 2008/0311815 A1 | 12/2008 | Gupta et al. |
| 2009/0025895 A1 | 1/2009 | Cowman |
| 2009/0036015 A1 | 2/2009 | Nhan et al. |
| 2009/0042475 A1 | 2/2009 | Pourdeyhimi |
| 2009/0163449 A1 | 6/2009 | Wempe |
| 2009/0249956 A1 | 10/2009 | Chi et al. |
| 2009/0258182 A1 | 10/2009 | Okamoto et al. |
| 2009/0274862 A1 | 11/2009 | Nakayama et al. |
| 2009/0294435 A1 | 12/2009 | Nhan et al. |
| 2009/0305592 A1 | 12/2009 | Shi et al. |
| 2010/0018660 A1 | 1/2010 | Varnell |
| 2010/0035500 A1 | 2/2010 | Kimura et al. |
| 2010/0072126 A1 | 3/2010 | Tsujimoto et al. |
| 2010/0112325 A1 | 5/2010 | Iwamoto et al. |
| 2010/0133173 A1 | 6/2010 | Inagaki |
| 2010/0133197 A1 | 6/2010 | Langner |
| 2010/0136312 A1 | 6/2010 | Inagaki |
| 2010/0143717 A1 | 6/2010 | Sakamoto et al. |
| 2010/0173154 A1 | 7/2010 | Shimotsu et al. |
| 2010/0180558 A1 | 7/2010 | Ito et al. |
| 2010/0187712 A1 | 7/2010 | Gupta et al. |
| 2010/0197027 A1 | 8/2010 | Zhang et al. |
| 2010/0200512 A1 | 8/2010 | Chase et al. |
| 2010/0203788 A1 | 8/2010 | Kimura et al. |
| 2010/0247894 A1 | 9/2010 | Beard |
| 2010/0272938 A1 | 10/2010 | Mitchell et al. |
| 2010/0273947 A1 | 10/2010 | Miyauchi et al. |
| 2010/0282682 A1 | 11/2010 | Eaton et al. |
| 2010/0285101 A1 | 11/2010 | Moore et al. |
| 2010/0291213 A1 | 11/2010 | Berrigan et al. |
| 2010/0310921 A1 | 12/2010 | Hayakawa et al. |
| 2011/0020590 A1 | 1/2011 | Yoneda et al. |
| 2011/0030885 A1 | 2/2011 | Anneaux et al. |
| 2011/0033705 A1 | 2/2011 | Komura et al. |
| 2011/0036487 A1 | 2/2011 | Rajala et al. |

(56) References Cited

U.S. PATENT DOCUMENTS

| | | |
|---|---|---|
| 2011/0039055 A1 | 2/2011 | Fujisawa et al. |
| 2011/0039468 A1 | 2/2011 | Baldwin, Jr. et al. |
| 2011/0040277 A1 | 2/2011 | Rajala et al. |
| 2011/0041471 A1 | 2/2011 | Sebastian et al. |
| 2011/0045042 A1 | 2/2011 | Sasaki et al. |
| 2011/0045231 A1 | 2/2011 | Kajiwara et al. |
| 2011/0045261 A1 | 2/2011 | Sellars |
| 2011/0046461 A1 | 2/2011 | McKenna |
| 2011/0049769 A1 | 3/2011 | Duchoslav et al. |
| 2011/0054429 A1 | 3/2011 | Lademann et al. |
| 2011/0056638 A1 | 3/2011 | Rosset |
| 2011/0059669 A1 | 3/2011 | He et al. |
| 2011/0064928 A1 | 3/2011 | Bonneh |
| 2011/0065573 A1 | 3/2011 | McCneany et al. |
| 2011/0065871 A1 | 3/2011 | Nagano et al. |
| 2011/0067369 A1 | 3/2011 | Chung et al. |
| 2011/0068507 A1 | 3/2011 | Warren et al. |
| 2011/0074060 A1 | 3/2011 | Angadjivand et al. |
| 2011/0076250 A1 | 3/2011 | Belenkaya et al. |
| 2011/0084028 A1 | 4/2011 | Stanfel et al. |
| 2011/0091761 A1 | 4/2011 | Miller et al. |
| 2011/0094515 A1 | 4/2011 | Duffy |
| 2011/0104493 A1 | 5/2011 | Barnholtz et al. |
| 2011/0114274 A1 | 5/2011 | Takano et al. |
| 2011/0117176 A1 | 5/2011 | Klun et al. |
| 2011/0117353 A1 | 5/2011 | Henshaw et al. |
| 2011/0117439 A1 | 5/2011 | Yamada et al. |
| 2011/0123584 A1 | 5/2011 | Seidling et al. |
| 2011/0124769 A1 | 5/2011 | Moen et al. |
| 2011/0124835 A1 | 5/2011 | DeWeijer et al. |
| 2011/0129510 A1 | 6/2011 | Liebmann et al. |
| 2011/0130063 A1 | 6/2011 | Matsubayashi et al. |
| 2011/0142900 A1 | 6/2011 | Ohta et al. |
| 2011/0143110 A1 | 6/2011 | Tsuchiya et al. |
| 2011/0147299 A1 | 6/2011 | Stanfel et al. |
| 2011/0168625 A1 | 7/2011 | Gupta et al. |
| 2011/0171535 A1 | 7/2011 | Ohinshi et al. |
| 2011/0171890 A1 | 7/2011 | Nakayama et al. |
| 2012/0015577 A1 | 1/2012 | Rudman et al. |

FOREIGN PATENT DOCUMENTS

| | | |
|---|---|---|
| EP | 0 396 771 A1 | 11/1990 |
| EP | 0 610 894 A1 | 8/1994 |
| EP | 0 610 897 A1 | 8/1994 |
| EP | 0 618 317 A1 | 10/1994 |
| EP | 0 830 466 A1 | 3/1998 |
| EP | 0 836 656 A1 | 4/1998 |
| EP | 0 859 073 A1 | 8/1998 |
| EP | 0 880 909 A1 | 12/1998 |
| EP | 0 666 344 B1 | 9/1999 |
| EP | 1 161 576 A1 | 12/2001 |
| EP | 1 243 675 A1 | 9/2002 |
| EP | 0 645 480 B1 | 11/2002 |
| EP | 0 961 847 B1 | 12/2002 |
| EP | 1359632 A2 | 4/2003 |
| EP | 0 935 682 B1 | 9/2003 |
| EP | 1 416 077 A2 | 5/2004 |
| EP | 0 905 292 B1 | 10/2004 |
| EP | 1538686 A1 | 6/2005 |
| EP | 1 550 746 A1 | 7/2005 |
| EP | 1 322 802 B1 | 8/2005 |
| EP | 1 314 808 B1 | 1/2006 |
| EP | 1252219 B1 | 8/2006 |
| EP | 1 325 184 B1 | 9/2006 |
| EP | 1 715 089 A2 | 10/2006 |
| EP | 1 319 095 B1 | 11/2006 |
| EP | 1 731 634 A | 12/2006 |
| EP | 1 149 195 B1 | 1/2007 |
| EP | 1 412 567 B1 | 1/2007 |
| EP | 1 404 905 B1 | 4/2007 |
| EP | 0 842 310 B1 | 1/2008 |
| EP | 1 894 609 A1 | 3/2008 |
| EP | 1 903 134 A1 | 3/2008 |
| EP | 1 938 883 A1 | 7/2008 |
| EP | 2 082 082 A2 | 7/2009 |
| EP | 1 516 079 B1 | 12/2009 |
| EP | 2 135 984 A1 | 12/2009 |
| EP | 1 224 900 B1 | 6/2010 |
| EP | 2 243 872 A1 | 10/2010 |
| EP | 2283796 A1 | 2/2011 |
| EP | 2287374 A1 | 2/2011 |
| EP | 1 620 506 B1 | 3/2011 |
| EP | 0847263 B2 | 3/2011 |
| EP | 2292309 A1 | 3/2011 |
| EP | 1474555 B1 | 4/2011 |
| EP | 2308579 A1 | 4/2011 |
| EP | 2311542 A1 | 4/2011 |
| EP | 2311543 A1 | 4/2011 |
| FR | 2654674 A1 | 5/1991 |
| GB | 1073640 | 6/1967 |
| JP | 52-066719 | 6/1977 |
| JP | 58-83046 A | 5/1983 |
| JP | 58174625 A | 10/1983 |
| JP | 58-220818 | 12/1983 |
| JP | 61-047822 | 3/1986 |
| JP | 61-296120 A | 12/1986 |
| JP | 62-078213 | 4/1987 |
| JP | 63-159523 A | 7/1988 |
| JP | S63-227898 A | 9/1988 |
| JP | 01-162825 A | 6/1989 |
| JP | 1-229899 A | 9/1989 |
| JP | 1-272820 A | 10/1989 |
| JP | 1-289838 A | 11/1989 |
| JP | 02-026920 A | 1/1990 |
| JP | 02-210092 A | 8/1990 |
| JP | 3-16378 B2 | 3/1991 |
| JP | 3-180587 A | 8/1991 |
| JP | 04-057918 A | 2/1992 |
| JP | 4327209 A | 11/1992 |
| JP | 5-18334 B2 | 3/1993 |
| JP | 05-263316 | 10/1993 |
| JP | 1993-263316 A | 10/1993 |
| JP | 5321106 | 12/1993 |
| JP | 6-002221 A | 1/1994 |
| JP | 6-25396 A | 2/1994 |
| JP | 9-77963 A | 3/1997 |
| JP | 9-100397 A | 4/1997 |
| JP | 9-249742 A | 9/1997 |
| JP | 09-291472 | 11/1997 |
| JP | 09-310230 | 12/1997 |
| JP | 2000-95850 | 4/2000 |
| JP | 3131100 B2 | 1/2001 |
| JP | 2001-123335 | 5/2001 |
| JP | 2003-253555 A | 9/2003 |
| JP | 2004-137319 | 5/2004 |
| JP | 2004-137418 A | 5/2004 |
| JP | 2005-002510 | 1/2005 |
| JP | 2005-154450 A | 6/2005 |
| JP | 2006-233365 A | 9/2006 |
| JP | 2007-092235 | 12/2007 |
| JP | 2010-070870 A | 4/2010 |
| JP | 2010-255173 A | 11/2010 |
| JP | 4648815 B2 | 3/2011 |
| KR | 2001-0044145 | 6/2001 |
| KR | 531939 B1 | 11/2005 |
| KR | 2011-031744 A | 3/2011 |
| KR | 2011-031746 A | 3/2011 |
| RU | 2414950 C1 | 3/2011 |
| RU | 2414960 C1 | 3/2011 |
| TW | 230212 B | 4/2005 |
| WO | WO 93/07197 A1 | 4/1993 |
| WO | WO 94/24218 A | 10/1994 |
| WO | WO 95/03172 A1 | 2/1995 |
| WO | WO 99/47621 A1 | 9/1999 |
| WO | WO 99/48668 | 9/1999 |
| WO | WO 01/66666 A2 | 9/2001 |
| WO | WO 02/060497 A2 | 8/2002 |
| WO | WO 03/069038 A1 | 8/2003 |
| WO | WO 2004/067818 A2 | 8/2004 |
| WO | WO 2004/099314 A1 | 11/2004 |
| WO | WO 2004/113598 A2 | 12/2004 |
| WO | WO 2005/066403 A1 | 7/2005 |

(56) References Cited

FOREIGN PATENT DOCUMENTS

| WO | WO 2005/103354 A1 | 11/2005 |
| WO | WO 2005/103357 A1 | 11/2005 |
| WO | WO 2006/001739 A1 | 1/2006 |
| WO | WO 2006/052732 A2 | 5/2006 |
| WO | WO 2006/098851 A2 | 9/2006 |
| WO | WO 2006/107695 A2 | 10/2006 |
| WO | WO 2007/089423 A2 | 8/2007 |
| WO | WO 2007/112443 A2 | 10/2007 |
| WO | WO 2008/028134 A1 | 3/2008 |
| WO | WO 2008/085332 A2 | 7/2008 |
| WO | WO 2009/024836 A1 | 2/2009 |
| WO | WO 2009/051283 A1 | 4/2009 |
| WO | WO 2009/076401 A1 | 6/2009 |
| WO | WO 2009/088564 A1 | 7/2009 |
| WO | WO 2009/140381 A1 | 11/2009 |
| WO | WO 2009/152349 A1 | 12/2009 |
| WO | WO 2010/114820 A2 | 10/2010 |
| WO | WO 2010/117612 A2 | 10/2010 |
| WO | WO 2010/125239 A2 | 11/2010 |
| WO | WO 2010/140853 A2 | 12/2010 |
| WO | WO 2010/146240 A2 | 12/2010 |
| WO | WO 2011/015709 A1 | 2/2011 |
| WO | WO 2011/018459 A1 | 2/2011 |
| WO | WO 2011/008481 A3 | 3/2011 |
| WO | WO 2011/027732 A1 | 3/2011 |
| WO | WO 2011/028661 A2 | 3/2011 |
| WO | WO 2011/034523 A1 | 3/2011 |
| WO | WO 2011/047966 A1 | 4/2011 |
| WO | WO 2011/049831 A2 | 4/2011 |
| WO | WO 2011/049927 A2 | 4/2011 |
| WO | WO 2011/052173 A1 | 5/2011 |
| WO | WO 2011/054932 A1 | 5/2011 |
| WO | WO 2011/062761 A1 | 5/2011 |
| WO | WO 2011/063372 A2 | 5/2011 |
| WO | WO 2011/066224 A2 | 6/2011 |
| WO | WO 2011/070233 A1 | 6/2011 |
| WO | WO 2011/104427 A1 | 9/2011 |
| WO | WO 2011/157892 A1 | 12/2011 |

OTHER PUBLICATIONS

Manas-Zloczower and Tadmor, "Mixing and Compounding of Polymers," 1994, Carl Hanser Verlag Publisher, N.Y.
PCT International Search Report dated Feb. 4, 2008 for International Application No. PCT/US2007/001082.
U.S. Appl. No. 08/550,042, filed Oct. 30, 1995, Michael C. Cook.
PCT International Search Report dated Nov. 6, 2008 for International Application No. PCT/US2007/025661.
PCT International Search Report dated Jul. 26, 2007 for International Application No. PCT/US2007/001083.
Office Action with Mail Date of Mar. 30, 2009 for related U.S. Appl. No. 11/204,868.
Office Action with Mail Date of Mar. 26, 2009 for related U.S. Appl. No. 11/344,320.
U.S. Appl. No. 61/172,257, filed Apr. 24, 2009, Rakesh Kumar Gupta, et al.
Lydall Filtration and Separation; "Nonwoven Liquid Filtration Media Construction and Performance"; Accessed from the web: http://www.lydallfiltration.com/tech/documents/Nonwovenliquidfiltration.pdf.
PCT International Search Report dated Jul. 3, 2009 for International Application No. PCT/US2009/001717.
PCT International Search Report dated Feb. 28, 2012 for International Application No. PCT/US2011/056990.
PCT International Search Report dated Feb. 28, 2012 for International Application No. PCT/US2011/056994.
PCT International Search Report dated Feb. 14, 2012 for International Application No. PCT/US2011/056989.
PCT International Search Report dated Feb. 28, 2012 for International Application No. PCT/US2011/056995.
PCT International Search Report dated Feb. 28, 2012 for International Application No. PCT/US2011/056991.
PCT International Search Report dated Feb. 28, 2012 for International Application No. PCT/US2011/057002.
USPTO Notice of Allowance dated Nov. 9, 2009 for copending U.S. Appl. No. 11/648,955.
USPTO Office Action dated Dec. 24, 2009 for copending U.S. Appl. No. 11/344,320.
USPTO Office Action dated Dec. 22, 2009 for copending U.S. Appl. No. 11/204,868.
USPTO Notice of Allowance dated Jun. 9, 2010 for copending U.S. Appl. No. 11/344,320.
USPTO Notice of Allowance dated Jun. 9, 2010 for copending U.S. Appl. No. 11/204,868.
USPTO Office Action dated Aug. 6, 2010 for copending U.S. Appl. No. 11/648,953.
USPTO Office Action dated Dec. 21, 2004 for U.S. Appl. No. 10/850,548, published as 2004-0258910.
USPTO Notice of Allowance dated Jun. 8, 2005 for U.S. Appl. No. 10/850,548.
DIN STD 54900 (in German, no English translation available).
ASTM D6340-98 (Reapproved 2007) ASTM International, copyright Sep. 15, 2010.
PCT International Search Report dated Feb. 7, 2005 for International Application No. PCT/US2004/018682.
Copending U.S. Appl. No. 12/765,461, filed Apr. 22, 2010, Rakesh Kumar Gupta, et al.
Smook, G.A., "Handbook for Pulp and Paper Technologist", Angus Wilde Publications, $2^{nd}$ Ed., 1992, pp. 194-195, 211-212.
PCT International Search Report dated Dec. 30, 2008 for International Application No. PCT/US2007/025770.
Ke Qinfei, et al., "Non-woven Science", Donghau University Press, 2004.9, Catalog, p. 115-132 (unavailable).
USPTO Notice of Allowance dated Nov. 9, 2009 for U.S. Appl. No. 11/648,955.
USPTO Office Action dated Sep. 27, 2010 for U.S. Appl. No. 12/199,304.
USPTO Notice of Allowance dated Sep. 30, 2010 for U.S. Appl. No. 11/344,320.
USPTO Notice of Allowance dated Oct. 14, 2010 for U.S. Appl. No. 11/204,868.
Copending U.S. Appl. No. 12/909,574, filed Oct. 21, 2010, Rakesh Kumar Gupta, et al.
Copending U.S. Appl. No. 12/966,483, filed Dec. 13, 2010, William Alston Haile, et al.
Copending U.S. Appl. No. 12/966,487, filed Dec. 13, 2010, William Alston Haile, et al.
Copending U.S. Appl. No. 12/966,494, filed Dec. 13, 2010, William Alston Haile, et al.
Copending U.S. Appl. No. 12/966,502, filed Dec. 13, 2010, William Alston Haile, et al.
Copending U.S. Appl. No. 12/966,507, filed Dec. 13, 2010, William Alston Haile, et al.
Copending U.S. Appl. No. 12/966,512, filed Dec. 13, 2010, William Alston Haile, et al.
Copending U.S. Appl. No. 12/966,518, filed Dec. 13, 2010, William Alston Haile, et al.
Copending U.S. Appl. No. 12/966,521, filed Dec. 13, 2010, William Alston Haile, et al.
Copending U.S. Appl. No. 12/975,443, filed Dec. 22, 2010, Rakesh Kumar Gupta, et al.
Copending U.S. Appl. No. 12/975,447, filed Dec. 22, 2010, Rakesh Kumar Gupta, et al.
Copending U.S. Appl. No. 12/975,450, filed Dec. 22, 2010, Rakesh Kumar Gupta, et al.
Copending U.S. Appl. No. 12/975,452, filed Dec. 22, 2010, Rakesh Kumar Gupta, et al.
Copending U.S. Appl. No. 12/975,456, filed Dec. 22, 2010, Rakesh Kumar Gupta, et al.
Copending U.S. Appl. No. 12/975,459, filed Dec. 22, 2010, Rakesh Kumar Gupta, et al.
Copending U.S. Appl. No. 12/975,463, filed Dec. 22, 2010, Rakesh Kumar Gupta, et al.
Copending U.S. Appl. No. 12/975,482, filed Dec. 22, 2010, Rakesh Kumar Gupta, et al.

(56) References Cited

OTHER PUBLICATIONS

Copending U.S. Appl. No. 12/975,484, filed Dec. 22, 2010, Rakesh Kumar Gupta, et al.
Copending U.S. Appl. No. 12/975,487, filed Dec. 22, 2010, Rakesh Kumar Gupta, et al.
Copending U.S. Appl. No. 12/981,950, filed Dec. 30, 2010, William Alston Haile, et al.
Copending U.S. Appl. No. 12/981,960, filed Dec. 30, 2010, William Alston Haile, et al.
Copending U.S. Appl. No. 12/981,982, filed Dec. 30, 2010, William Alston Haile, et al.
Copending U.S. Appl. No. 12/982,001, filed Dec. 30, 2010, William Alston Haile, et al.
New copending U.S. Appl. No. 13/352,362, filed Jan. 18, 2012, Rakesh Kumar Gupta et al.
USPTO Notice of Allowance dated Apr. 4, 2011 for copending U.S. Appl. No. 12/199,304.
USPTO Office Action dated Mar. 18, 2011 for copending U.S. Appl. No. 11/648,953.
USPTO Office Action dated Apr. 6, 2011 for copending U.S. Appl. No. 12/975,487.
USPTO Office Action dated Apr. 4, 2011 for copending U.S. Appl. No. 12/981,960.
USPTO Office Action dated Apr. 6, 2011 for copending U.S. Appl. No. 12/975,482.
USPTO Office Action dated Jun. 7, 2011 for copending U.S. Appl. No. 12/982,001.
USPTO Office Action dated Jun. 9, 2011 for copending U.S. Appl. No. 12/975,459.
USPTO Office Action dated May 27, 2011 for copending U.S. Appl. No. 12/975,452.
USPTO Office Action dated Jun. 23, 2011 for copending U.S. Appl. No. 12/966,487.
USPTO Office Action dated Jun. 23, 2011 for copending U.S. Appl. No. 12/966,502.
USPTO Office Action dated May 10, 2012 for copending U.S. Appl. No. 12/966,521.
USPTO Office Action dated Mar. 16, 2012 for copending U.S. Appl. No. 12/966,483.
USPTO Notice of Allowance dated Apr. 2, 2012 for copending U.S. Appl. No. 12/966,502.
USPTO Office Action dated Jun. 23, 2011 for copending U.S. Appl. No. 12/975,443.
USPTO Notice of Allowance dated Jul. 18, 2011 for copending U.S. Appl. No. 12/199,304.
USPTO Office Action dated Aug. 10, 2011 for copending U.S. Appl. No. 12/966,512.
USPTO Office Action dated Sep. 15, 2011 for copending U.S. Appl. No. 11/648,953.
USPTO Office Action dated May 3, 2012 for copending U.S. Appl. No. 12/765,461.
USPTO Office Action dated Sep. 8, 2011 for copending U.S. Appl. No. 12/966,494.
USPTO Notice of Allowance dated Apr. 18, 2012 for copending U.S. Appl. No. 12/966,494.
USPTO Office Action dated Sep. 26, 2011 for copending U.S. Appl. No. 12/966,507.
USPTO Office Action dated Apr. 23, 2012 for copending U.S. Appl. No. 12/966,507.
USPTO Office Action dated Sep. 1, 2011 for copending U.S. Appl. No. 12/975,450.
USPTO Office Action dated Aug. 24, 2011 for copending U.S. Appl. No. 12/975,456.
USPTO Office Action dated Apr. 19, 2012 for copending U.S. Appl. No. 12/975,456.
USPTO Office Action dated Sep. 27, 2011 for copending U.S. Appl. No. 12/975,463.
USPTO Office Action dated Apr. 19, 2012 for copending U.S. Appl. No. 12/975,463.
USPTO Office Action dated Aug. 31, 2011 for copending U.S. Appl. No. 13/053,615.
Coons, R., "Eastman Chemical Core Focus Delivers Value," Chemical Week, Aug. 15/22, 2011, pp. 19-22.
USPTO Office Action dated Nov. 10, 2011 for copending U.S. Appl. No. 12/981,950.
USPTO Office Action dated Jan. 25, 2012 for copending U.S. Appl. No. 12/981,982.
USPTO Notice of Allowance dated Jan. 3, 2012 for copending U.S. Appl. No. 12/975,487.
USPTO Notice of Allowance dated Dec. 23, 2011 for copending U.S. Appl. No. 12/975,452.
USPTO Notice of Allowance dated Apr. 2, 2012 for copending U.S. Appl. No. 12/975,452.
USPTO Notice of Allowance dated Dec. 8, 2011 for copending U.S. Appl. No. 12/981,960.
USPTO Notice of Allowance dated Mar. 15, 2012 for copending U.S. Appl. No. 12/981,960.
USPTO Notice of Allowance dated Dec. 13, 2011 for copending U.S. Appl. No. 12/966,487.
USPTO Notice of Allowance dated Apr. 13, 2012 for copending U.S. Appl. No. 12/966,487.
USPTO Notice of Allowance dated Dec. 12, 2011 for copending U.S. Appl. No. 12/966,502.
USPTO Notice of Allowance dated Dec. 9, 2011 for copending U.S. Appl. No. 12/966,512.
USPTO Notice of Allowance dated Mar. 21, 2012 for copending U.S. Appl. No. 12/966,512.
USPTO Notice of Allowance dated Jan. 9, 2012 for copending U.S. Appl. No. 12/975,482.
USPTO Office Action dated Jan. 30, 2012 for copending U.S. Appl. No. 12/975,443.
USPTO Office Action dated Nov. 10, 2011 for copending U.S. Appl. No. 12/975,484.
USPTO Notice of Allowance dated Apr. 18, 2012 for copending U.S. Appl. No. 12/975,484.
U.S. Appl. No. 61/405,306, filed Oct. 21, 2010, Rakesh Kumar Gupta, et al.
U.S. Appl. No. 61/405,312, filed Oct. 21, 2010, Rakesh Kumar Gupta, et al.
U.S. Appl. No. 61/588,744, filed Nov. 11, 2011, Clark et al.
U.S. Appl. No. 61/592,854, filed Jan. 31, 2012, Parker et al.
U.S. Appl. No. 61/592,867, filed Jan. 31, 2012, Parker et al.
U.S. Appl. No. 61/592,876, filed Jan. 31, 2012, Parker et al.
U.S. Appl. No. 61/592,917, filed Jan. 31, 2012, Parker et al.
U.S. Appl. No. 61/592,974, filed Jan. 31, 2012, Parker et al.
New copending U.S. Appl. No. 13/273,692, filed Oct. 14, 2011, Rakesh Kumar Gupta, et al.
New copending U.S. Appl. No. 13/273,648, filed Oct. 14, 2011, Rakesh Kumar Gupta, et al.
New copending U.S. Appl. No. 13/273,710, filed Oct. 14, 2011, Rakesh Kumar Gupta, et al.
New copending U.S. Appl. No. 13/273,720, filed Oct. 14, 2011, Rakesh Kumar Gupta, et al.
New copending U.S. Appl. No. 13/273,929, filed Oct. 14, 2011, Rakesh Kumar Gupta, et al.
New copending U.S. Appl. No. 13/273,937, filed Oct. 14, 2011, Rakesh Kumar Gupta, et al.
New copending U.S. Appl. No. 13/273,727, filed Oct. 14, 2011, Rakesh Kumar Gupta, et al.
New copending U.S. Appl. No. 13/273,737, filed Oct. 14, 2011, Rakesh Kumar Gupta, et al.
New copending U.S. Appl. No. 13/273,745, filed Oct. 14, 2011, Rakesh Kumar Gupta, et al.
New copending U.S. Appl. No. 13/273,749, filed Oct. 14, 2011, Rakesh Kumar Gupta, et al.
New copending U.S. Appl. No. 13/433,812, filed Mar. 29, 2012, Clark et al.
New copending U.S. Appl. No. 13/433,854, filed Mar. 29, 2012, Clark et al.

(56) References Cited

OTHER PUBLICATIONS

Investigation of the utility of islands-in-the-stream bicomponent fiber technology in the spunbound process. Fedorova, Dec. 2006. (retrieved on Mar. 20, 2012 from internet) pp. 22-23, 74 <URL: http://repository.lib.ncsu.edu/ir/bitstream/1840.16/5145/1/etd.pdf.
"Choosing the Proper Short Cut Fiber", technical data sheet, MiniFibers, Inc., [online] pp. 1-2, 2006, [retrieved on Feb. 15, 2006], Retrieved from the Inernet: <URL: htts://www.minifibers.com/Literature/choosing_fiber.htm>.
USPTO Notice of Allowance dated Feb. 7, 2012 for copending U.S. Appl. No. 12/975,459.
USPTO Notice of Allowance dated Feb. 17, 2012 for copending U.S. Appl. No. 12/982,001.
USPTO Notice of Allowance dated Feb. 21, 2012 for copending U.S. Appl. No. 12/975,450.
USPTO Notice of Allowance dated Feb. 23, 2012 for copending U.S. Appl. No. 13/053,615.
USPTO Office Action dated Nov. 10, 2011 for copending U.S. Appl. No. 12/975,447.
USPTO Office Action dated Mar. 2, 2012 for copending U.S. Appl. No. 12/966,518.
Keith, James M., "Dispersions fo Synthetic Fibers in Wet-Lay Nonwovens". MiniFIBERS, Inc., originally published in the Tappi Journal, vol. 77, No. 6, Jun. 1994, entire document.
USPTO Office Action dated Jan. 25, 2008 for copending U.S. Appl. No. 11/343,955.
USPTO Office Action dated Oct. 10, 2008 for copending U.S. Appl. No. 11/343,955.
USPTO Notice of Allowance dated Mar. 9, 2009 for copending U.S. Appl. No. 11/343,955.
USPTO Notice of Allowance dated Aug. 7, 2009 for copending U.S. Appl. No. 11/343,955.
Copending U.S. Appl. No. 11/648,955, filed Jan. 3, 2007, Rakesh Kumar Gupta, et al.
USPTO Office Action dated May 21, 2012 for copending U.S. Appl. No. 12/981,982.
USPTO Office Action dated Oct. 4, 2012 for copending U.S. Appl. No. 13/273,745.
USPTO Office Action dated Nov. 26, 2012 for copending U.S. Appl. No. 13/273,648.
USPTO Office Action dated Nov. 20, 2012 for copending U.S. Appl. No. 13/273,710.
USPTO Office Action dated Nov. 7, 2012 for copending U.S. Appl. No. 13/273,720.
Database WPI Thomson Scientific, London, GB AN2004/520211 XP002639794 & JP 2004/137418 Dated May 13, 2004—abstract.
USPTO Notice of Allowance dated Jun. 4, 2012 for copending U.S. Appl. No. 12/981,960.
USPTO Notice of Allowance dated Jun. 7, 2012 for copending U.S. Appl. No. 12/966,487.
USPTO Notice of Allowance dated Jun. 11, 2012 for copending U.S. Appl. No. 12/966,512.
USPTO Notice of Allowance dated Jun. 13, 2012 for copending U.S. Appl. No. 12/966,502.
USPTO Notice of Allowance dated Jun. 29, 2012 for copending U.S. Appl. No. 12/981,950.
USPTO Notice of Allowance dated Jul. 3, 2012 for copending U.S. Appl. No. 12/974,452.
USPTO Office Action dated Jul. 5, 2012 for copending U.S. Appl. No. 12/966,507.
USPTO Notice of Allowance dated Jul. 6, 2012 for copending U.S. Appl. No. 12/975,456.
USPTO Notice of Allowance dated Jul. 27, 2012 for copending U.S. Appl. No. 12/981,982.
USPTO Office Action dated Aug. 14, 2012 for copending U.S. Appl. No. 12/199,304.
USPTO Notice of Allowance dated Jul. 19, 2012 for copending U.S. Appl. No. 12/981,950.
USPTO Notice of Allowance dated Aug. 10, 2012 for copending U.S. Appl. No. 12/975,487.
USPTO Notice of Allowance dated Jul. 31, 2012 for copending U.S. Appl. No. 12/975,456.
USPTO Office Action dated Aug. 27, 2012 for copending U.S. Appl. No. 12/975,443.
USPTO Office Action dated Aug. 28, 2012 for copending U.S. Appl. No. 12/975,447.
USPTO Notice of Allowance dated Oct. 11, 2012 for copending U.S. Appl. No. 12/975,487.
USPTO Notice of Allowance dated Oct. 22, 2012 for copending U.S. Appl. No. 12/966,518.
USPTO Notice of Allowance dated Nov. 2, 2012 for copending U.S. Appl. No. 12/966,507.
USPTO Office Action dated Nov. 2, 2012 for copending U.S. Appl. No. 13/273,692.
USPTO Notice of Allowance dated Dec. 10, 2012 for copending U.S. Appl. No. 12/966,521.
New co-pending U.S. Appl. No. 13/671,682, filed Nov. 8, 2012.
New co-pending U.S. Appl. No. 13/687,466, filed Nov. 28, 2012.
New co-pending U.S. Appl. No. 13/687,472, filed Nov. 28, 2012.
New co-pending U.S. Appl. No. 13/687,493, filed Nov. 28, 2012.
New co-pending U.S. Appl. No. 13/687,505, filed Nov. 28, 2012.
USPTO Office Action dated Dec. 4, 2012 for copending U.S. Appl. No. 13/273,749.
USPTO Notice of Allowance dated Jan. 8, 2013 for copending U.S. Appl. No. 12/966,483.
USPTO Notice of Allowance dated Jan. 10, 2013 for copending U.S. Appl. No. 12/975,447.
USPTO Notice of Allowance dated Jan. 15, 2013 for copending U.S. Appl. No. 12/975,463.
PCT International Search Report dated Jan. 23, 2013 for International Application No. PCT/US2012/064272.
USPTO Notice of Allowance dated Jan. 25, 2013 for copending U.S. Appl. No. 12/966,521.
USPTO Notice of Allowance dated Jan. 28, 2013 for copending U.S. Appl. No. 12/765,461.
USPTO Notice of Allowance dated Mar. 21, 2013 for copending U.S. Appl. No. 12/975,482.
USPTO Notice of Allowance dated Mar. 22, 2013 for copending U.S. Appl. No. 12/966,518.
PCT International Search Report dated Mar. 29, 2013 for International Application No. PCT/US2013/022830.
PCT International Search Report dated Mar. 27, 2013 for International Application No. PCT/US2013/022832.
PCT International Search Report dated Mar. 27, 2013 for International Application No. PCT/US2013/022834.
PCT International Search Report dated Mar. 27, 2013 for International Application No. PCT/US2013/022835.
PCT International Search Report dated Mar. 27, 2013 for International Application No. PCT/US2013/022838.
PCT International Search Report dated Mar. 29, 2013 for International Application No. PCT/US2013/021804.
USPTO Notice of Allowance dated Apr. 24, 2013 for copending U.S. Appl. No. 12/199,304.
USPTO Notice of Allowance dated Apr. 8, 2013 for copending U.S. Appl. No. 12/966,483.
USPTO Notice of Allowance dated Apr. 16, 2013 for copending U.S. Appl. No. 12/765,461.
USPTO Notice of Allowance dated Mar. 28, 2013 for copending U.S. Appl. No. 12/966,521.
USPTO Notice of Allowance dated May 1, 2013 for copending U.S. Appl. No. 12/975,482.
CFF Acrylic Pulps/Fibrillated Fibers, Datasheet [Online], Sterling Fibers, Feb. 7, 2011 [retrieved Mar. 4, 2013], <url: http://www.sterlingfibers.com/wetlaid.htm>.
USPTO Office Action dated Jun. 19, 2013 for copending U.S. Appl. No. 12/909,574.
USPTO Office Action dated Aug. 19, 2013 for copending U.S. Appl. No. 13/273,745.
USPTO Office Action dated Jul. 30, 2013 for copending U.S. Appl. No. 13/273,749.
USPTO Office Action dated Jul. 22, 2013 for copending U.S. Appl. No. 13/433,812.

(56) References Cited

OTHER PUBLICATIONS

USPTO Office Action dated Jul. 19, 2013 for copending U.S. Appl. No. 13/433,854.
Extended European Search Report dated Feb. 25, 2014 for Application No./Patent No. 11835114.7-1303 / 2630297 PCT/US2011056997.
USPTO Office Action dated Mar. 7, 2014 for copending U.S. Appl. No. 12/966,494.
USPTO Office Action dated Mar. 13, 2014 for copending U.S. Appl. No. 12/909,574.
New co-pending U.S. Appl. No. 14/108,389, filed Dec. 17, 2013.
USPTO Office Action dated Mar. 25, 2014 for copending U.S. Appl. No. 13/273,727.
New Co-pending U.S. Appl. No. 14/249,858, filed Apr. 10, 2014.
New Co-pending U.S. Appl. No. 14/249,868, filed Apr. 10, 2014.
New co-pending U.S. Appl. No. 13/941,816, filed Jul. 15, 2013.
Pettersson, Patrick; "Fluid Flow in Wood Fiber Networks", Lulea University of Technology, 2006:34, ISSN: 1402-1757.
USPTO Notice of Allowance dated Sep. 5, 2013 for copending U.S. Appl. No. 12/966,507.
USPTO Office Action dated Sep. 6, 2013 for copending U.S. Appl. No. 12/966,494.
USPTO Office Action dated Sep. 20, 2013 for copending U.S. Appl. No. 13/687,472.
USPTO Office Action dated Sep. 20, 2013 for copending U.S. Appl. No. 13/687,505.
USPTO Office Action dated Sep. 24, 2013 for copending U.S. Appl. No. 13/687,466.
USPTO Office Action dated Sep. 25, 2013 for copending U.S. Appl. No. 13/273,692.
USPTO Office Action dated Sep. 25, 2013 for copending U.S. Appl. No. 13/273,648.
USPTO Office Action dated Sep. 25, 2013 for copending U.S. Appl. No. 13/687,493.
USPTO Office Action dated Oct. 9, 2013 for copending U.S. Appl. No. 13/944,458.
USPTO Office Action dated Dec. 3, 2013 for copending U.S. Appl. No. 13/273,937.
USPTO Notice of Allowance dated Dec. 4, 2013 for copending U.S. Appl. No. 12/975,484.
USPTO Office Action dated Dec. 31, 2013 for copending U.S. Appl. No. 13/352,362.
USPTO Notice of Allowance dated Feb. 4, 2014 for copending U.S. Appl. No. 12/975,484.
USPTO Office Action dated Feb. 10, 2014 for copending U.S. Appl. No. 13/433,854.

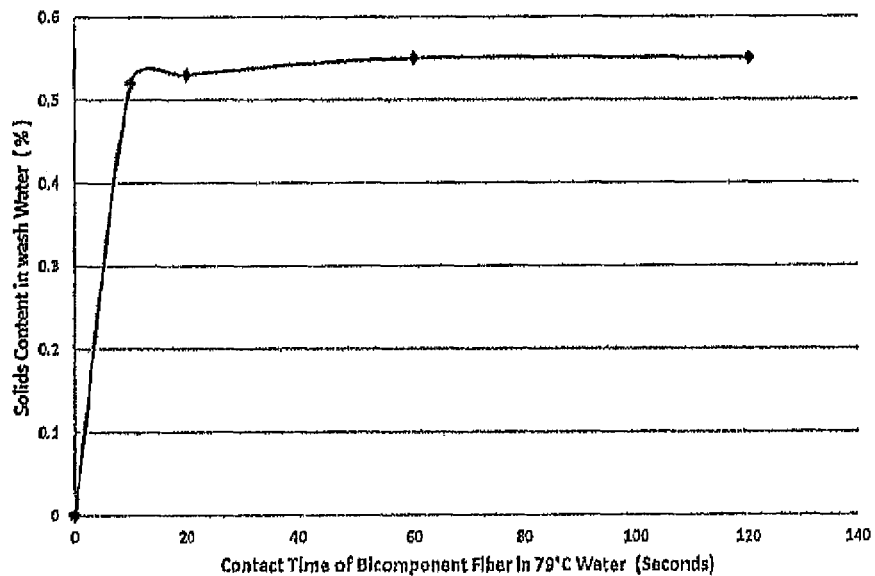
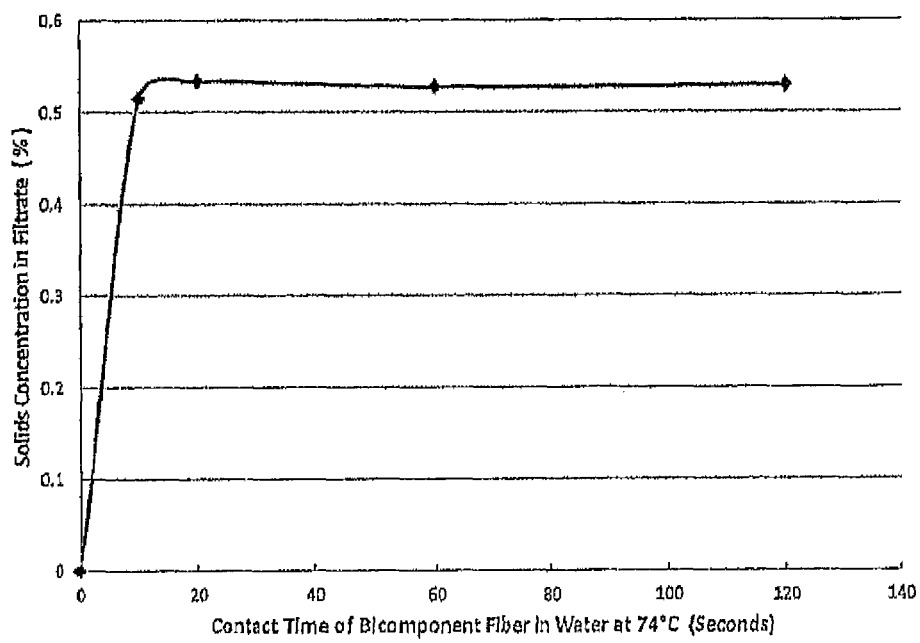

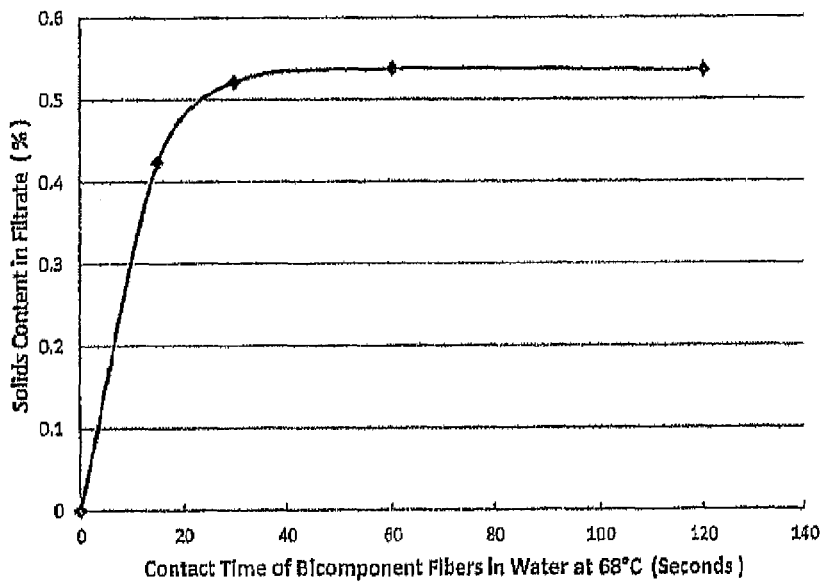
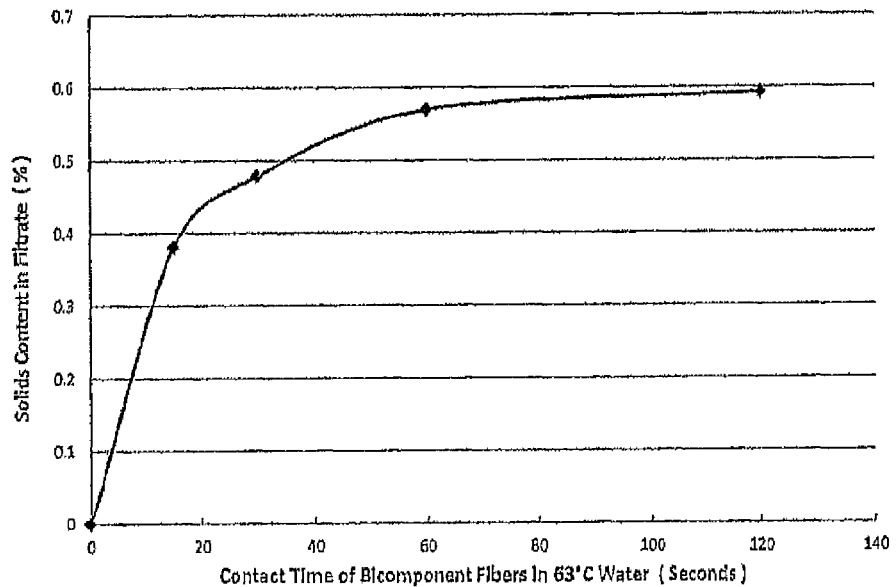

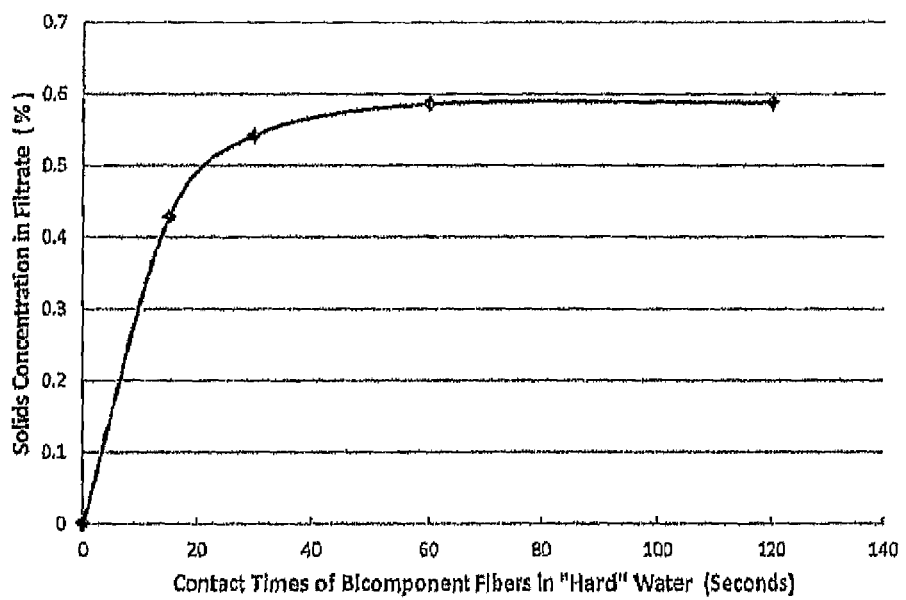

PROCESSES TO PRODUCE SHORT CUT MICROFIBERS

RELATED APPLICATIONS

This application claims priority to U.S. Provisional Application Ser. Nos. 61/592,854, 61/592,867; 61/592,917; and 61/592,974 filed on Jan. 31, 2012, the disclosures of which are incorporated herein by reference to the extent they do not contradict the statements herein.

FIELD OF THE INVENTION

The present invention pertains to water-dispersible fibers and fibrous articles comprising a sulfopolyester. The invention further pertains to multicomponent fibers comprising a sulfopolyester and the microdenier fibers and fibrous articles prepared therefrom. The invention also pertains to processes for producing water-dispersible, multicomponent, and microdenier fibers and to articles produced therefrom.

BACKGROUND OF THE INVENTION

Fibers, melt blown webs and other melt spun fibrous articles have been made from thermoplastic polymers, such as poly(propylene), polyamides, and polyesters. One common application of these fibers and fibrous articles are nonwoven fabrics and, in particular, in personal care products such as wipes, feminine hygiene products, baby diapers, adult incontinence briefs, hospital/surgical and other medical disposables, protective fabrics and layers, geotextiles, industrial wipes, and filter media. Unfortunately, the personal care products made from conventional thermoplastic polymers are difficult to dispose of and are usually placed in landfills. One promising alternative method of disposal is to make these products or their components "flushable", i.e., compatible with public sewerage systems. The use of water-dispersible or water-soluble materials also improves recyclability and reclamation of personal care products. The various thermoplastic polymers now used in personal care products are not inherently water-dispersible or soluble and, hence, do not produce articles that readily disintegrate and can be disposed of in a sewerage system or recycled easily.

The desirability of flushable personal care products has resulted in a need for fibers, nonwovens, and other fibrous articles with various degrees of water-responsivity. Various approaches to addressing these needs have been described, for example, in U.S. Pat. Nos. 6,548,592; 6,552,162; 5,281,306; 5,292,581; 5,935,880; and 5,509,913; U.S. patent application Ser. Nos. 09/775,312; and 09/752,017; and PCT International Publication No. WO 01/66666 A2. These approaches, however, suffer from a number of disadvantages and do not provide a fibrous article, such as a fiber or nonwoven fabric, that possesses a satisfactory balance of performance properties, such as tensile strength, absorptivity, flexibility, and fabric integrity under both wet or dry conditions.

For example, typical nonwoven technology is based on the multidirectional deposition of fibers that are treated with a resin binding adhesive to form a web having strong integrity and other desirable properties. The resulting assemblies, however, generally have poor water-responsivity and are not suitable for flushable applications. The presence of binder also may result in undesirable properties in the final product, such as reduced sheet wettability, increased stiffness, stickiness, and higher production costs. It is also difficult to produce a binder that will exhibit adequate wet strength during use and yet disperse quickly upon disposal. Thus, nonwoven assemblies using these binders may either disintegrate slowly under ambient conditions or have less than adequate wet strength properties in the presence of body fluids. To address this problem, pH and ion-sensitive water-dispersible binders, such as lattices containing acrylic or methacrylic acid with or without added salts, are known and described, for example, in U.S. Pat. No. 6,548,592 B1. Ion concentrations and pH levels in public sewerage and residential septic systems, however, can vary widely among geographical locations and may not be sufficient for the binder to become soluble and disperse. In this case, the fibrous articles will not disintegrate after disposal and can clog drains or sewer laterals.

Multicomponent fibers containing a water-dispersible component and a thermoplastic water non-dispersible component have been described, for example, in U.S. Pat. Nos. 5,916,678; 5,405,698; 4,966,808; 5,525,282; 5,366,804; 5,486,418. For example, these multicomponent fibers may be a bicomponent fiber having a shaped or engineered transverse cross section such as, for example, an islands-in-the-sea, sheath core, side-by-side, or segmented pie configuration. The multicomponent fiber can be subjected to water or a dilute alkaline solution where the water-dispersible component is dissolved away to leave the water non-dispersible component behind as separate, independent fibers of extremely small fineness. Polymers which have good water dispersibility, however, often impart tackiness to the resulting multicomponent fibers, which causes the fiber to stick together, block, or fuse during winding or storage after several days, especially under hot, humid conditions. To prevent fusing, often a fatty acid or oil-based finish is applied to the surface of the fiber. In addition, large proportions of pigments or fillers are sometimes added to water dispersible polymers to prevent fusing of the fibers as described, for example, in U.S. Pat. No. 6,171,685. Such oil finishes, pigments, and fillers require additional processing steps and can impart undesirable properties to the final fiber. Many water-dispersible polymers also require alkaline solutions for their removal which can cause degradation of the other polymer components of the fiber such as, for example, reduction of inherent viscosity, tenacity, and melt strength. Further, some water-dispersible polymers can not withstand exposure to water during hydroentanglement and, thus, are not suitable for the manufacture of nonwoven webs and fabrics.

Alternatively, the water-dispersible component may serve as a bonding agent for the thermoplastic fibers in nonwoven webs. Upon exposure to water, the fiber to fiber bonds come apart such that the nonwoven web loses its integrity and breaks down into individual fibers. The thermoplastic fiber components of these nonwoven webs, however, are not water-dispersible and remain present in the aqueous medium and, thus, must eventually be removed from municipal wastewater treatment plants. Hydroentanglement may be used to produce disintegratable nonwoven fabrics without or with very low levels (<5 weight %) of added binder to hold the fibers together. Although these fabrics may disintegrate upon disposal, they often utilize fibers that are not water soluble or water-dispersible and may result in entanglement and plugging within sewer systems. Any added water-dispersible binders also must be minimally affected by hydroentangling and not form gelatinous buildup or cross-link, and thereby contribute to fabric handling or sewer related problems.

A few water-soluble or water-dispersible polymers are available, but are generally not applicable to melt blown fiber forming operations or melt spinning in general. Polymers, such as polyvinyl alcohol, polyvinyl pyrrolidone, and polyacrylic acid are not melt processable as a result of thermal decomposition that occurs at temperatures below the point where a suitable melt viscosity is attained. High molecular weight polyethylene oxide may have suitable thermal stability, but would provide a high viscosity solution at the polymer interface resulting in a slow rate of disintegration. Water-dispersible sulfopolyesters have been described, for example, in U.S. Pat. Nos. 6,171,685; 5,543,488; 5,853,701; 4,304,901; 6,211,309; 5,570,605; 6,428,900; and 3,779,993. Typical sulfopolyesters, however, are low molecular weight thermoplastics that are brittle and lack the flexibility to withstand a winding operation to yield a roll of material that does not fracture or crumble. Sulfopolyesters also can exhibit blocking or fusing during processing into film or fibers, which may require the use of oil finishes or large amounts of pigments or fillers to avoid. Low molecular weight polyethylene oxide (more commonly known as polyethylene glycol) is a weak/brittle polymer that also does not have the required physical properties for fiber applications. Forming fibers from known water-soluble polymers via solution techniques is an alternative, but the added complexity of removing solvent, especially water, increases manufacturing costs.

Accordingly, there is a need for a water-dispersible fiber and fibrous articles prepared therefrom that exhibit adequate tensile strength, absorptivity, flexibility, and fabric integrity in the presence of moisture, especially upon exposure to human bodily fluids. In addition, a fibrous article is needed that does not require a binder and completely disperses or dissolves in residential or municipal sewerage systems. Potential uses include, but are not limited to, melt blown webs, spunbond fabrics, hydroentangled fabrics, wet-laid nonwovens, dry-laid non-wovens, bicomponent fiber components, adhesive promoting layers, binders for cellulosics, flushable nonwovens and films, dissolvable binder fibers, protective layers, and carriers for active ingredients to be released or dissolved in water. There is also a need for multicomponent fiber having a water-dispersible component that does not exhibit excessive blocking or fusing of filaments during spinning operations, is easily removed by hot water at neutral or slightly acidic pH, and is suitable for hydroentangling processes to manufacture nonwoven fabrics. These multicomponent fibers can be utilized to produce microfibers that can be used to produce various articles. Other extrudable and melt spun fibrous materials are also possible.

SUMMARY OF THE INVENTION

We have unexpectedly discovered that flexible, water-dispersible fibers may be prepared from sulfopolyesters. Thus the present invention provides a water-dispersible fiber comprising:
(A) a sulfopolyester having a glass transition temperature (Tg) of at least 25° C., the sulfopolyester comprising:
  (i) residues of one or more dicarboxylic acids;
  (ii) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof
  (iii) one or more diol residues wherein at least 25 mole %, based on the total diol residues, is a poly(ethylene glycol) having a structure

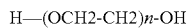

wherein n is an integer in the range of 2 to about 500; and
  (iv) 0 to about 25 mole %, based on the total repeating units, of residues of a branching monomer having 3 or more functional groups wherein the functional groups are hydroxyl, carboxyl, or a combination thereof;
(B) optionally, a water-dispersible polymer blended with the sulfopolyester; and
(C) optionally, a water non-dispersible polymer blended with the sulfopolyester with the proviso that the blend is an immiscible blend;
wherein the fiber contains less than 10 weight % of a pigment or filler, based on the total weight of the fiber.

The fibers of the present invention may be unicomponent fibers that rapidly disperse or dissolve in water and may be produced by melt-blowing or melt-spinning. The fibers may be prepared from a single sulfopolyester or a blend of the sulfopolyester with a water-dispersible or water non-dispersible polymer. Thus, the fiber of the present invention, optionally, may include a water-dispersible polymer blended with the sulfopolyester. In addition, the fiber may optionally include a water non-dispersible polymer blended with the sulfopolyester, provided that the blend is an immiscible blend. Our invention also includes fibrous articles comprising our water-dispersible fibers. Thus, the fibers of our invention may be used to prepare various fibrous articles, such as yarns, melt-blown webs, spunbonded webs, and nonwoven fabrics that are, in turn, water-dispersible or flushable. Staple fibers of our invention can also be blended with natural or synthetic fibers in paper, nonwoven webs, and textile yarns.

Another aspect of the present invention is a water-dispersible fiber comprising:
(A) a sulfopolyester having a glass transition temperature (Tg) of at least 25° C., the sulfopolyester comprising:
  (i) about 50 to about 96 mole % of one or more residues of isophthalic acid or terephthalic acid, based on the total acid residues;
  (ii) about 4 to about 30 mole %, based on the total acid residues, of a residue of sodiosulfoisophthalic acid;
  (iii) one or more diol residues wherein at least 25 mole %, based on the total diol residues, is a poly(ethylene glycol) having a structure

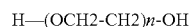

wherein n is an integer in the range of 2 to about 500;
  (iv) 0 to about 20 mole %, based on the total repeating units, of residues of a branching monomer having 3 or more functional groups wherein the functional groups are hydroxyl, carboxyl, or a combination thereof;
(B) optionally, a first water-dispersible polymer blended with the sulfopolyester; and
(C) optionally, a water non-dispersible polymer blended with the sulfopolyester to form a blend with the proviso that the blend is an immiscible blend;
wherein the fiber contains less than 10 weight % of a pigment or filler, based on the total weight of the fiber.

The water-dispersible, fibrous articles of the present invention include personal care articles such as, for example, wipes, gauze, tissue, diapers, training pants, sanitary napkins, bandages, wound care, and surgical dressings. In addition to being water-dispersible, the fibrous articles of our invention are flushable, that is, compatible with and suitable for disposal in residential and municipal sewerage systems.

The present invention also provides a multicomponent fiber comprising a water-dispersible sulfopolyester and one or more water non-dispersible polymers. The fiber has an engineered geometry such that the water non-dispersible polymers are present as segments substantially isolated from each other by the intervening sulfopolyester, which acts as a binder or encapsulating matrix for the water non-dispersible segments. Thus, another aspect of our invention is a multicomponent fiber having a shaped cross section, comprising:
(A) a water dispersible sulfopolyester having a glass transition temperature (Tg) of at least 57° C., the sulfopolyester comprising:
  (i) residues of one or more dicarboxylic acids;
  (ii) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof;
  (iii) one or more diol residues wherein at least 25 mole %, based on the total diol residues, is a poly(ethylene glycol) having a structure

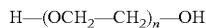
  H—(OCH$_2$—CH$_2$)$_n$—OH wherein n is an integer in the range of 2 to about 500; and
  (iv) 0 to about 25 mole %, based on the total repeating units, of residues of a branching monomer having 3 or more functional groups wherein the functional groups are hydroxyl, carboxyl, or a combination thereof; and
(B) a plurality of segments comprising one or more water non-dispersible polymers immiscible with the sulfopolyester, wherein the segments are substantially isolated from each other by the sulfopolyester intervening between the segments.

The sulfopolyester has a glass transition temperature of at least 57° C. which greatly reduces blocking and fusion of the fiber during winding and long term storage.

The sulfopolyester may be removed by contacting the multicomponent fiber with water to leave behind the water non-dispersible segments as microdenier fibers. Our invention, therefore, also provides a process for microdenier fibers comprising:
(A) spinning a water dispersible sulfopolyester having a glass transition temperature (Tg) of at least 57° C. and one or more water non-dispersible polymers immiscible with the sulfopolyester into multicomponent fibers, the sulfopolyester comprising:
  (i) about 50 to about 96 mole % of one or more residues of isophthalic acid or terephthalic acid, based on the total acid residues;
  (ii) about 4 to about 30 mole %, based on the total acid residues, of a residue of sodiosulfoisophthalic acid;
  (iii) one or more diol residues wherein at least 25 mole %, based on the total diol residues, is a poly(ethylene glycol) having a structure

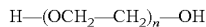
  H—(OCH$_2$—CH$_2$)$_n$—OH wherein n is an integer in the range of 2 to about 500; and
  (iv) 0 to about 20 mole %, based on the total repeating units, of residues of a branching monomer having 3 or more functional groups wherein the functional groups are hydroxyl, carboxyl, or a combination thereof;
wherein the fibers have a plurality of segments comprising the water non-dispersible polymers wherein the segments are substantially isolated from each other by the sulfopolyester intervening between the; and
(B) contacting the multicomponent fibers with water to remove the sulfopolyester thereby forming microdenier fibers.

The water non-dispersible polymers may be biodistintegratable as determined by DIN Standard 54900 and/or biodegradable as determined by ASTM Standard Method, D6340-98. The multicomponent fiber also may be used to prepare a fibrous article such as a yarn, fabric, melt-blown web, spun-bonded web, or non-woven fabric and which may comprise one or more layers of fibers. The fibrous article having multicomponent fibers, in turn, may be contacted with water to produce fibrous articles containing microdenier fibers.

Thus, another aspect of the invention is a process for a microdenier fiber web, comprising:
(A) spinning a water dispersible sulfopolyester having a glass transition temperature (Tg) of at least 57° C. and one or more water non-dispersible polymers immiscible with the sulfopolyester into multicomponent fibers, the sulfopolyester comprising:
  (i) about 50 to about 96 mole % of one or more residues of isophthalic acid or terephthalic acid, based on the total acid residues;
  (ii) about 4 to about 30 mole %, based on the total acid residues, of a residue of sodiosulfoisophthalic acid;
  (iii) one or more diol residues wherein at least 25 mole %, based on the total diol residues, is a poly(ethylene glycol) having a structure

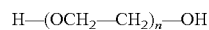
  H—(OCH$_2$—CH$_2$)$_n$—OH wherein n is an integer in the range of 2 to about 500; and
  (iv) 0 to about 20 mole %, based on the total repeating units, of residues of a branching monomer having 3 or more functional groups wherein the functional groups are hydroxyl, carboxyl, or a combination thereof.
wherein the multicomponent fibers have a plurality of segments comprising the water non-dispersible polymers and the segments are substantially isolated from each other by the sulfopolyester intervening between the segments;
(B) overlapping and collecting the multicomponent fibers of Step A to form a nonwoven web; and
(C) contacting the nonwoven web with water to remove the sulfopolyester thereby forming a microdenier fiber web.

Our invention also provides a process making a water-dispersible, nonwoven fabric comprising:
(A) heating a water-dispersible polymer composition to a temperature above its flow point, wherein the polymer composition comprises
  (i) a sulfopolyester having a glass transition temperature (Tg) of at least 25° C., the sulfopolyester comprising:
    (a) residues of one or more dicarboxylic acids;
    (b) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof;
    (c) one or more diol residues wherein at least 20 mole %, based on the total diol residues, is a poly(ethylene glycol) having a structure

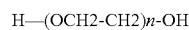
    H—(OCH2-CH2)$n$-OH wherein n is an integer in the range of 2 to about 500;
    (d) 0 to about 25 mole %, based on the total repeating units, of residues of a branching monomer having 3 or more functional groups wherein the functional groups are hydroxyl, carboxyl, or a combination thereof;
  (ii) optionally, a water-dispersible polymer blended with the sulfopolyester; and
  (iii) optionally, a water non-dispersible polymer blended with the sulfopolyester to form a blend with the proviso that the blend is an immiscible blend;

wherein the polymer composition contains less than 10 weight % of a pigment or filler, based on the total weight of the polymer composition;

(B) melt spinning filaments; and (C) overlapping and collecting the filaments of Step B to form a nonwoven web.

In another aspect of the present invention, there is provided a multicomponent fiber, having a shaped cross section, comprising:

(A) at least one water dispersible sulfopolyester; and (B) a plurality of microfiber domains comprising one or more water non-dispersible polymers immiscible with the sulfopolyester, wherein the domains are substantially isolated from each other by the sulfopolyester intervening between the domains;

wherein the water dispersible sulfopolyesters exhibits a melt viscosity of less than about 12,000 poise measured at 240° C. at a strain rate of 1 rad/sec, and wherein the sulfopolyester comprises less than about 25 mole % of residues of at least one sulfomonomer, based on the total moles of diacid or diol residues.

In another aspect of the present invention, there is provided a multicomponent extrudate having a shaped cross section, comprising:

(A) at least one water dispersible sulfopolyester; and (B) a plurality of domains comprising one or more water non-dispersible polymers immiscible with the sulfopolyester, wherein the domains are substantially isolated from each other by the sulfopolyester intervening between the domains, wherein the extrudate is capable of being melt drawn at a speed of at least about 2000 m/min.

In another aspect of the present invention, there is provided a process for making a multicomponent fiber having a shaped cross section comprising spinning at least one water dispersible sulfopolyester and one or more water non-dispersible polymers immiscible with the sulfopolyester, wherein the multicomponent fiber has a plurality of domains comprising the water non-dispersible polymers and the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprises less than about 25 mole % of residues of at least one sulfomonomer, based on the total moles of diacid or diol residues.

In another aspect of the invention, there is provided a process for making a multicomponent fiber having a shaped cross section comprising extruding at least one water dispersible sulfopolyester and one or more water non-dispersible polymers immiscible with the sulfopolyester to produce a multicomponent extrudate, wherein the multicomponent extrudate has a plurality of domains comprising the water non-dispersible polymers and the domains are substantially isolated from each other by the sulfopolyester intervening between the domains; and melt drawing the multicomponent extrudate at a speed of at least about 2000 m/min to produce the multicomponent fiber.

In another aspect, the present invention provides a process for producing microdenier fibers comprising:

(A) spinning at least one water dispersible sulfopolyester and one or more water non-dispersible polymers immiscible with the water dispersible sulfopolyester into multicomponent fibers, wherein the multicomponent fibers have a plurality of domains comprising the water non-dispersible polymers wherein the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprises less than about 25 mole % of residues of at least one sulfomonomer, based on the total moles of diacid or diol residues; and (B) contacting the multicomponent fibers with water to remove the water dispersible sulfopolyester thereby forming microdenier fibers of the water non-dispersible polymer(s).

In another aspect, the present invention provides a process for producing microdenier fibers comprising:

(A) extruding at least one water dispersible sulfopolyester and one or more water non-dispersible polymers immiscible with the water dispersible sulfopolyester to produce multicomponent extrudates, wherein the multicomponent extrudates have a plurality of domains comprising the water non-dispersible polymers wherein the domains are substantially isolated from each other by the sulfopolyester intervening between the domains;

(B) melt drawing the multicomponent extrudates at a speed of at least about 2000 m/min to form multicomponent fibers; and (C) contacting the multicomponent fibers with water to remove the water dispersible sulfopolyester thereby forming microdenier fibers of the water non-dispersible polymer(s).

In another aspect of this invention, a process is provided for making a microdenier fiber web comprising:

(A) spinning at least one water dispersible sulfopolyester and one or more water non-dispersible polymers immiscible with the sulfopolyester into multicomponent fibers, the multicomponent fibers have a plurality of domains comprising the water non-dispersible polymers wherein the domains are substantially isolated from each other by the water dispersible sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprising less than about 25 mole % of residues of at least one sulfomonomer, based on the total moles of diacid or diol residues;

(B) collecting the multicomponent fibers of Step (A) to form a non-woven web; and (C) contacting the non-woven web with water to remove the sulfopolyester thereby forming a microdenier fiber web.

In another aspect of this invention, a process for making a microdenier fiber web is provided comprising:

(A) extruding at least one water dispersible sulfopolyester and one or more water non-dispersible polymers immiscible with the sulfopolyester to a produce multicomponent extrudate, the multicomponent extrudate have a plurality of domains comprising the water non-dispersible polymers wherein the domains are substantially isolated from each other by the sulfopolyester intervening between the domains;

(B) melt drawing the multicomponent extrudates at a speed of at least about 2000 m/min to form multicomponent fibers;

(C) collecting the multicomponent fibers of Step (B) to form a non-woven web; and (D) contacting the non-woven web with water to remove the sulfopolyester thereby forming a microdenier fiber web.

In another embodiment of this invention, a process for producing cut water non-dispersible polymer microfibers is provided, the process comprising:
- (A) cutting a multicomponent fiber into cut multicomponent fibers;
- (B) contacting a fiber-containing feedstock with water to produce a fiber mix slurry; wherein the fiber-containing feedstock comprises cut multicomponent fibers;
- (C) heating the fiber mix slurry to produce a heated fiber mix slurry;
- (D) optionally, mixing the fiber mix slurry in a shearing zone;
- (E) removing at least a portion of the sulfopolyester from the cut multicomponent fiber to produce a slurry mixture comprising a sulfopolyester dispersion and the cut water non-dispersible polymer microfibers; and
- (F) separating the cut water non-dispersible polymer microfibers from the slurry mixture.

In another embodiment of this invention, a cut water non-dispersible polymer microfiber is provided comprising at least one water non-dispersible polymer wherein the cut water non-dispersible polymer microfiber has an equivalent diameter of less than 5 microns and length of less than 25 millimeters.

In another embodiment of this invention, a process for producing a nonwoven article from the water non-dispersible polymer microfiber is provided, the process comprising:
- (A) providing a water non-dispersible polymer microfiber produced from a multicomponent fiber; and
- (B) producing the nonwoven article utilizing a wet-laid process or a dry-laid process.

In another embodiment of the invention, a process for producing a microfiber product stream is provided. The process comprises:
- (A) contacting short cut multicomponent fibers having a length of less than 25 millimeters with a heated aqueous stream in a fiber opening zone to remove a portion of the water dispersible sulfopolyester to produce an opened microfiber slurry; wherein the short cut multicomponent fibers comprise at least one water dispersible sulfopolyester and at least one water non-dispersible synthetic polymer immiscible with the water dispersible sulfopolyester; wherein the heated aqueous stream is at a temperature of at least 40° C.; wherein the opened microfiber slurry comprises water, microfiber, and water dispersible sulfopolyester; and
- (B) routing the opened microfiber slurry to a primary solid liquid separation zone to produce the microfiber product stream and a first mother liquor stream; wherein the first mother liquor stream comprises water and the water dispersible sulfopolyester.

In another embodiment of the invention, a process for producing a microfiber product stream is provided. The process comprises:
- (A) contacting short cut multicomponent fibers having a length of less than 25 millimeters with a heated aqueous stream in a fiber opening zone to remove a portion of the water dispersible sulfopolyester to produce an opened microfiber slurry; wherein the short cut multicomponent fibers comprise at least one water dispersible sulfopolyester and at least one water non-dispersible polymer immiscible with the water dispersible sulfopolyester; wherein the heated aqueous stream is at a temperature of at least 40° C.; wherein the opened microfiber slurry comprises water non-dispersible polymer microfiber, water dispersible sulfopolyester, and water; and
- (B) routing the opened microfiber slurry to a primary solid liquid separation zone to produce the microfiber product stream and a first mother liquor stream; wherein the first mother liquor stream comprises water and water dispersible sulfopolyester.

In another embodiment of the invention, another process for producing a microfiber product stream is provided. The process comprises:
- (A) contacting short cut multicomponent fibers having a length of less than 25 millimeters with a treated aqueous stream in a fiber slurry zone to produce a short cut multicomponent fiber slurry; wherein the short cut multicomponent fibers comprise at least one water dispersible sulfopolyester and at least one water non-dispersible synthetic polymer immiscible with the water dispersible sulfopolyester; and wherein the treated aqueous stream is at a temperature of less than 40° C.;
- (B) contacting the short cut multicomponent fiber slurry and a heated aqueous stream in a fiber opening zone to remove a portion of the water dispersible sulfopolyester to produce an opened microfiber slurry; wherein the opened microfiber slurry comprises water non-dispersible polymer microfiber, water dispersible sulfopolyester, and water; and
- (C) routing the opened microfiber slurry to a primary solid liquid separation zone to produce the microfiber product stream and a first mother liquor stream; wherein the first mother liquor stream comprises water and the water dispersible sulfopolyester.

In another embodiment of the invention, another process for producing a microfiber product stream is provided. The process comprises:
- (A) contacting short cut multicomponent fibers having a length of less than 25 millimeters with a heated aqueous stream in a mix zone to produce a short cut multicomponent fiber slurry; wherein the short cut multicomponent fibers comprise at least one water dispersible sulfopolyester and at least one water non-dispersible polymer immiscible with the water dispersible sulfopolyester; and wherein the heated aqueous stream is at a temperature of 40° C. or greater;
- (B) routing the short cut multicomponent fiber slurry and optionally, a heated aqueous stream, to a fiber opening zone to remove a portion of the water dispersible sulfopolyester to produce an opened microfiber slurry; wherein the opened microfiber slurry comprises water non-dispersible polymer microfiber, water dispersible sulfopolyester, and water; and
- (C) routing the opened microfiber slurry to a primary solid liquid separation zone to produce the microfiber product stream and a first mother liquor stream; wherein the first mother liquor stream comprises water and the water dispersible sulfopolyester.

In another embodiment of the invention, another process for producing a microfiber product stream is provided. The process comprises:
- (A) contacting short cut multicomponent fibers having a length of less than 25 millimeters with a treated aqueous stream in a fiber slurry zone to produce a short cut multicomponent fiber slurry; wherein the short cut multicomponent fibers comprise at least one water dispersible sulfopolyester and at least one water non-dispersible synthetic polymer immiscible with the water dispersible sulfopolyester; and wherein the treated aqueous stream is at a temperature of less than 40° C.;

(B) contacting the short cut multicomponent fiber slurry with a heated aqueous stream in a mix zone to produce a heated multicomponent fiber slurry;
(C) routing the heated multicomponent fiber slurry to a fiber opening zone to remove a portion of the water dispersible sulfopolyester to produce an opened microfiber slurry; and
(D) routing the opened microfiber slurry to a primary solid liquid separation zone to produce the microfiber product stream and a first mother liquor stream; wherein the first mother liquor stream comprises water and the water dispersible sulfopolyester.

In another embodiment of the invention, a process for separating a first mother liquor stream is provided. The process comprises routing a first mother liquor stream to a second solid liquid separation zone to produce a secondary wet cake stream and a second mother liquor stream; wherein the second mother liquor stream comprises water and water dispersible sulfopolyester; wherein the secondary wet cake stream comprises water non-dispersible polymer microfiber.

In yet another embodiment of the invention, a process for recovering sulfopolyester is provided. The process comprises:
(A) routing a second mother liquor to a primary concentration zone to produce a primary polymer concentrate stream and a primary recovered water stream; and
(B) optionally, routing the primary recovered water stream to a fiber opening zone.

BRIEF DESCRIPTION OF THE FIGURES

FIG. 8 shows composition of wash recovered from bicomponent fiber opening at 79° C. in Example 36.

FIG. 9 shows composition of wash recovered from bicomponent fiber opening at 74° C. in Example 38.

FIG. 10 shows composition of filtrate recovered from bicomponent fiber opening at 68° C. in Example 39.

FIG. 11 shows composition of filtrate recovered from bicomponent fiber opening at 63° C. in Example 40.

FIG. 12 shows composition of wash recovered from bicomponent fiber opening at 77° C. using water with 200 ppm calcium in Comparative Example 41.

DETAILED DESCRIPTION

Figure 1A:
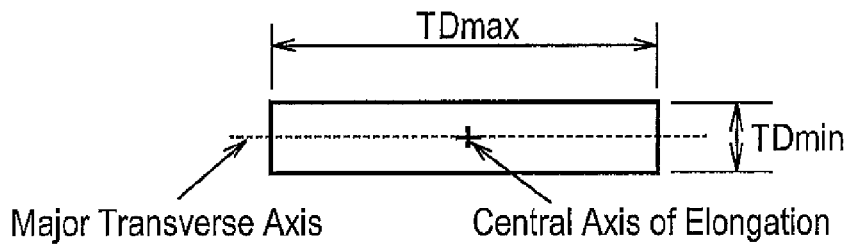
FIGS. 1a, 1b, and 1c are cross-sectional views of three differently-configured fibers, particularly illustrating how various measurements relating to the size and shape of the fibers are determined

The present invention provides water-dispersible fibers and fibrous articles that show tensile strength, absorptivity, flexibility, and fabric integrity in the presence of moisture, especially upon exposure to human bodily fluids. The fibers and fibrous articles of our invention do not require the presence of oil, wax, or fatty acid finishes or the use of large amounts (typically 10 weight % or greater) of pigments or fillers to prevent blocking or fusing of the fibers during processing. In addition, the fibrous articles prepared from our novel fibers do not require a binder and readily disperse or dissolve in home or public sewerage systems.

In a general embodiment, our invention provides a water-dispersible fiber comprising a sulfopolyester having a glass transition temperature (Tg) of at least 25° C., wherein the sulfopolyester comprises:
(A) residues of one or more dicarboxylic acids;
(B) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof;
(C) one or more diol residues wherein at least 25 mole %, based on the total diol residues, is a poly(ethylene glycol) having a structure

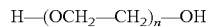

wherein n is an integer in the range of 2 to about 500; and 0 to about 25 mole %, based on the total repeating units, of residues of a branching monomer having 3 or more functional groups wherein the functional groups are hydroxyl, carboxyl, or a combination thereof. Our fiber may optionally include a water-dispersible polymer blended with the sulfopolyester and, optionally, a water non-dispersible polymer blended with the sulfopolyester with the proviso that the blend is an immiscible blend. Our fiber contains less than 10 weight % of a pigment or filler, based on the total weight of the fiber. The present invention also includes fibrous articles comprising these fibers and may include personal care products such as wipes, gauze, tissue, diapers, adult incontinence briefs, training pants, sanitary napkins, bandages, and surgical dressings. The fibrous articles may have one or more absorbent layers of fibers.

The fibers of our invention may be unicomponent fibers, bicomponent or multicomponent fibers. For example, the fibers of the present invention may be prepared by melt spinning a single sulfopolyester or sulfopolyester blend and include staple, monofilament, and multifilament fibers with a shaped cross-section. In addition, our invention provides multicomponent fibers, such as described, for example, in U.S. Pat. No. 5,916,678, which may be prepared by extruding the sulfopolyester and one or more water non-dispersible polymers, which are immiscible with the sulfopolyester, separately through a spinneret having a shaped or engineered transverse geometry such as, for example, an "islands-in-the-sea", sheath-core, side-by-side, ribbon (stripped), or segmented pie configuration. The sulfopolyester may be later removed by dissolving the interfacial layers or pie segments and leaving the smaller filaments or microdenier fibers of the water non-dispersible polymer(s). These fibers of the water non-dispersible polymer have fiber size much smaller than the multicomponent fiber before removing the sulfopolyester. For example, the sulfopolyester and water non-dispersible polymers may be fed to a polymer distribution system where the polymers are introduced into a segmented spinneret plate. The polymers follow separate paths to the fiber spinneret and are combined at the spinneret hole which comprises either two concentric circular holes thus providing a sheath-core type fiber, or a circular spinneret hole divided along a diameter into multiple parts to provide a fiber having a side-by-side type. Alternatively, the immiscible water dispersible sulfopolyester and water non-dispersible polymers may be introduced separately into a spinneret having a plurality of radial channels to produce a multicomponent fiber having a segmented pie cross section. Typically, the sulfopolyester will form the "sheath" component of a sheath core configuration. In fiber cross sections having a plurality of segments, the water non-dispersible segments, typically, are substantially isolated from each other by the sulfopolyester. Alternatively, multicomponent fibers may be formed by melting the sulfopolyester and water non-dispersible polymers in separate extruders and directing the polymer flows into one spinneret with a plurality of distribution flow paths in form of small thin tubes or segments to provide a fiber having an islands-in-the-sea shaped cross section. An example of such a spinneret is described in U.S. Pat. No. 5,366,804. In the present invention, typically, the sulfopolyester will form the "sea" component and the water non-dispersible polymer will form the "islands" component.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "C1 to C5 hydrocarbons", is intended to specifically include and disclose C1 and C5 hydrocarbons as well as C2, C3, and C4 hydrocarbons.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

The unicomponent fibers and fibrous articles produced from the unicomponent fibers of the present invention are water-dispersible and, typically, completely disperse at room temperature. Higher water temperatures can be used to accelerate their dispersibility or rate of removal from the nonwoven or multicomponent fiber. The term "water-dispersible", as used herein with respect to unicomponent fibers and fibrous articles prepared from unicomponent fibers, is intended to be synonymous with the terms "water-dissipatable", "water-disintegratable", "water-dissolvable", "water-dispellable", "water soluble", water-removable", "hydrosoluble", and "hydrodispersible" and is intended to mean that the fiber or fibrous article is therein or therethrough dispersed or dissolved by the action of water. The terms "dispersed", "dispersible", "dissipate", or "dissipatable" mean that, using a sufficient amount of deionized water (e.g., 100:1 water:fiber by weight) to form a loose suspension or slurry of the fibers or fibrous article, at a temperature of about 60° C., and within a time period of up to 5 days, the fiber or fibrous article dissolves, disintegrates, or separates into a plurality of incoherent pieces or particles distributed more or less throughout the medium such that no recognizable filaments are recoverable from the medium upon removal of the water, for example, by filtration or evaporation. Thus, "water-dispersible", as used herein, is not intended to include the simple disintegration of an assembly of entangled or bound, but otherwise water insoluble or nondispersible, fibers wherein the fiber assembly simply breaks apart in water to produce a slurry of fibers in water which could be recovered by removal of the water. In the context of this invention, all of these terms refer to the activity of water or a mixture of water and a water-miscible cosolvent on the sulfopolyesters described herein. Examples of such water-miscible cosolvents includes alcohols, ketones, glycol ethers, esters and the like. It is intended for this terminology to include conditions where the sulfopolyester is dissolved to form a true solution as well as those where the sulfopolyester is dispersed within the aqueous medium. Often, due to the statistical nature of sulfopolyester compositions, it is possible to have a soluble fraction and a dispersed fraction when a single sulfopolyester sample is placed in an aqueous medium.

Similarly, the term "water-dispersible", as used herein in reference to the sulfopolyester as one component of a multicomponent fiber or fibrous article, also is intended to be synonymous with the terms "water-dissipatable", "water-disintegratable", "water-dissolvable", "water-dispellable", "water soluble", "water-removable", "hydrosoluble", and "hydrodispersible" and is intended to mean that the sulfopolyester component is sufficiently removed from the multicomponent fiber and is dispersed or dissolved by the action of water to enable the release and separation of the water non-dispersible fibers contained therein. The terms "dispersed", "dispersible", "dissipate", or "dissipatable" mean that, using a sufficient amount of deionized water (e.g., 100:1 water:fiber by weight) to form a loose suspension or slurry of the fibers or fibrous article, at a temperature of about 60° C., and within a time period of up to 5 days, sulfopolyester component dissolves, disintegrates, or separates from the multicomponent fiber, leaving behind a plurality of microdenier fibers from the water non-dispersible segments.

The term "segment" or "domain" or "zone" when used to describe the shaped cross section of a multicomponent fiber refers to the area within the cross section comprising the water non-dispersible polymers where these domains or segments are substantially isolated from each other by the water-dispersible sulfopolyester intervening between the segments or domains. The term "substantially isolated", as used herein, is intended to mean that the segments or domains are set apart from each other to permit the segments domains to form individual fibers upon removal of the sulfopolyester. Segments or domains or zones can be of similar size and shape or varying size and shape. Again, segments or domains or zones can be arranged in any configuration. These segments or domains or zones are "substantially continuous" along the length of the multicomponent extrudate or fiber. The term "substantially continuous" means continuous along at least 10 cm length of the multicomponent fiber. These segments, domains, or zones of the multicomponent fiber produce water non-dispersible polymer microfibers when the water dispersible sulfopolyester is removed.

As stated within this disclosure, the shaped cross section of a multicomponent fiber can, for example, be in the form of a sheath core, islands-in-the sea, segmented pie, hollow segmented pie; off-centered segmented pie, side-by-side, ribbon (stripped) etc.

The water-dispersible fiber of the present invention is prepared from polyesters or, more specifically sulfopolyesters, comprising dicarboxylic acid monomer residues, sulfomonomer residues, diol monomer residues, and repeating units. The sulfomonomer may be a dicarboxylic acid, a diol, or hydroxycarboxylic acid. Thus, the term "monomer residue", as used herein, means a residue of a dicarboxylic acid, a diol, or a hydroxycarboxylic acid. A "repeating unit", as used herein, means an organic structure having 2 monomer residues bonded through a carbonyloxy group. The sulfopolyesters of the present invention contain substantially equal molar proportions of acid residues (100 mole %) and diol residues (100 mole %) which react in substantially equal proportions such that the total moles of repeating units is equal to 100 mole %. The mole % ages provided in the present disclosure, therefore, may be based on the total moles of acid residues, the total moles of diol residues, or the total moles of repeating units. For example, a sulfopolyester containing 30 mole % of a sulfomonomer, which may be a dicarboxylic acid, a diol, or hydroxycarboxylic acid, based on the total repeating units, means that the sulfopolyester contains 30 mole % sulfomonomer out of a total of 100 mole % repeating units. Thus, there are 30 moles of sulfomonomer residues among every 100 moles of repeating units. Similarly, a sulfopolyester containing 30 mole % of a dicarboxylic acid sulfomonomer, based on the total acid residues, means the sulfopolyester contains 30 mole % sulfomonomer out of a total of 100 mole % acid residues. Thus, in this latter case, there are 30 moles of sulfomonomer residues among every 100 moles of acid residues.

The sulfopolyesters described herein have an inherent viscosity, abbreviated hereinafter as "Ih.V.", of at least about 0.1 dL/g, preferably about 0.2 to 0.3 dL/g, and most preferably greater than about 0.3 dL/g, measured in a 60/40 parts by weight solution of phenol/tetrachloroethane solvent at 25° C. and at a concentration of about 0.5 g of sulfopolyester in 100 mL of solvent. The term "polyester", as used herein, encompasses both "homopolyesters" and "copolyesters" and means a synthetic polymer prepared by the polycondensation of difunctional carboxylic acids with difunctional hydroxyl compound. As used herein, the term "sulfopolyester" means any polyester comprising a sulfomonomer. Typically the difunctional carboxylic acid is a dicarboxylic acid and the difunctional hydroxyl compound is a dihydric alcohol such as, for example glycols and diols. Alternatively, the difunctional carboxylic acid may be a hydroxy carboxylic acid such as, for example, p-hydroxybenzoic acid, and the difunctional hydroxyl compound may be a aromatic nucleus bearing 2 hydroxy substituents such as, for example, hydroquinone. The term "residue", as used herein, means any organic structure incorporated into the polymer through a polycondensation reaction involving the corresponding monomer. Thus, the dicarboxylic acid residue may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The sulfopolyester of the present invention includes one or more dicarboxylic acid residues. Depending on the type and concentration of the sulfomonomer, the dicarboxylic acid residue may comprise from about 60 to about 100 mole % of the acid residues. Other examples of concentration ranges of dicarboxylic acid residues are from about 60 mole % to about 95 mole %, and about 70 mole % to about 95 mole %. Examples of dicarboxylic acids that may be used include aliphatic dicarboxylic acids, alicyclic dicarboxylic acids, aromatic dicarboxylic acids, or mixtures of two or more of these acids. Thus, suitable dicarboxylic acids include, but are not limited to, succinic; glutaric; adipic; azelaic; sebacic; fumaric; maleic; itaconic; 1,3-cyclohexane-dicarboxylic; 1,4-cyclohexanedicarboxylic; diglycolic; 2,5-norbornanedicarboxylic; phthalic; terephthalic; 1,4-naphthalenedicarboxylic; 2,5-naphthalenedicarboxylic; diphenic; 4,4'-oxydibenzoic; 4,4'-sulfonyldibenzoic; and isophthalic. The preferred dicarboxylic acid residues are isophthalic, terephthalic, and 1,4-cyclohexanedicarboxylic acids, or if diesters are used, dimethyl terephthalate, dimethyl isophthalate, and dimethyl-1,4-cyclohexanedicarboxylate with the residues of isophthalic and terephthalic acid being especially preferred. Although the dicarboxylic acid methyl ester is the most preferred embodiment, it is also acceptable to include higher order alkyl esters, such as ethyl, propyl, isopropyl, butyl, and so forth. In addition, aromatic esters, particularly phenyl, also may be employed.

The sulfopolyester includes about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof. Additional examples of concentration ranges for the sulfomonomer residues are about 4 to about 35 mole %, about 8 to about 30 mole %, and about 8 to about 25 mole %, based on the total repeating units. The sulfomonomer may be a dicarboxylic acid or ester thereof containing a sulfonate group, a diol containing a sulfonate group, or a hydroxy acid containing a sulfonate group. The term "sulfonate" refers to a salt of a sulfonic acid having the structure "—$SO_3M$" wherein M is the cation of the sulfonate salt. The cation of the sulfonate salt may be a metal ion such as $Li^+$, $Na^+$, $K^+$, $Mg^{++}$, $Ca^{++}$, $Ni^{++}$, $Fe^{++}$, and the like. Alternatively, the cation of the sulfonate salt may be non-metallic such as a nitrogenous base as described, for example, in U.S. Pat. No. 4,304,901. Nitrogen-based cations are derived from nitrogen-containing bases, which may be aliphatic, cycloaliphatic, or aromatic compounds. Examples of such nitrogen containing bases include ammonia, dimethylethanolamine, diethanolamine, triethanolamine, pyridine, morpholine, and piperidine. Because monomers containing the nitrogen-based sulfonate salts typically are not thermally stable at conditions required to make the polymers in the melt, the method of this invention for preparing sulfopolyesters containing nitrogen-based sulfonate salt groups is to disperse, dissipate, or dissolve the polymer containing the required amount of sulfonate group in the form of its alkali metal salt in water and then exchange the alkali metal cation for a nitrogen-based cation.

When a monovalent alkali metal ion is used as the cation of the sulfonate salt, the resulting sulfopolyester is completely dispersible in water with the rate of dispersion dependent on the content of sulfomonomer in the polymer, temperature of the water, surface area/thickness of the sulfopolyester, and so forth. When a divalent metal ion is used, the resulting sulfopolyesters are not readily dispersed by cold water but are more easily dispersed by hot water. Utilization of more than one counterion within a single polymer composition is possible and may offer a means to tailor or fine-tune the water-responsivity of the resulting article of manufacture. Examples of sulfomonomers residues include monomer residues where the sulfonate salt group is attached to an aromatic acid nucleus, such as, for example, benzene; naphthalene; diphenyl; oxydiphenyl; sulfonyldiphenyl; and methylenediphenyl or cycloaliphatic rings, such as, for example, cyclohexyl; cyclopentyl; cyclobutyl; cycloheptyl; and cyclooctyl. Other examples of sulfomonomer residues which may be used in the present invention are the metal sulfonate salt of sulfophthalic acid, sulfoterephthalic acid, sulfoisophthalic acid, or combinations thereof. Other examples of sulfomonomers which may be used are 5-sodiosulfoisophthalic acid and esters thereof. If the sulfomonomer residue is from 5-sodiosulfoisophthalic acid, typical sulfomonomer concentration ranges are about 4 to about 35 mole %, about 8 to about 30 mole %, and about 8 to 25 mole %, based on the total moles of acid residues.

The sulfomonomers used in the preparation of the sulfopolyesters are known compounds and may be prepared using methods well known in the art. For example, sulfomonomers in which the sulfonate group is attached to an aromatic ring may be prepared by sulfonating the aromatic compound with oleum to obtain the corresponding sulfonic acid and followed by reaction with a metal oxide or base, for example, sodium acetate, to prepare the sulfonate salt. Procedures for preparation of various sulfomonomers are described, for example, in U.S. Pat. Nos. 3,779,993; 3,018,272; and 3,528,947.

It is also possible to prepare the polyester using, for example, a sodium sulfonate salt, and ion-exchange methods to replace the sodium with a different ion, such as zinc, when the polymer is in the dispersed form. This type of ion exchange procedure is generally superior to preparing the polymer with divalent salts insofar as the sodium salts are usually more soluble in the polymer reactant melt-phase.

The sulfopolyester includes one or more diol residues which may include aliphatic, cycloaliphatic, and aralkyl glycols. The cycloaliphatic diols, for example, 1,3- and 1,4-cyclohexanedimethanol, may be present as their pure cis or trans isomers or as a mixture of cis and trans isomers. As used herein, the term "diol" is synonymous with the term "glycol" and means any dihydric alcohol. Examples of diols include, but are not limited to, ethylene glycol; diethylene glycol; triethylene glycol; polyethylene glycols; 1,3-propanediol; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol, or combinations of one or more of these glycols.

The diol residues may include from about 25 mole % to about 100 mole %, based on the total diol residues, of residue of a poly(ethylene glycol) having a structure

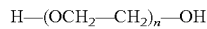

H—(OCH$_2$—CH$_2$)$_n$—OH wherein n is an integer in the range of 2 to about 500. Non-limiting examples of lower molecular weight polyethylene glycols, e.g., wherein n is from 2 to 6, are diethylene glycol, triethylene glycol, and tetraethylene glycol. Of these lower molecular weight glycols, diethylene and triethylene glycol are most preferred. Higher molecular weight polyethylene glycols (abbreviated herein as "PEG"), wherein n is from 7 to about 500, include the commercially available products known under the designation CARBOWAX®, a product of Dow Chemical Company (formerly Union Carbide). Typically, PEGs are used in combination with other diols such as, for example, diethylene glycol or ethylene glycol. Based on the values of n, which range from greater than 6 to 500, the molecular weight may range from greater than 300 to about 22,000 g/mol. The molecular weight and the mole % are inversely proportional to each other; specifically, as the molecular weight is increased, the mole % will be decreased in order to achieve a designated degree of hydrophilicity. For example, it is illustrative of this concept to consider that a PEG having a molecular weight of 1000 may constitute up to 10 mole % of the total diol, while a PEG having a molecular weight of 10,000 would typically be incorporated at a level of less than 1 mole % of the total diol.

Certain dimer, trimer, and tetramer diols may be formed in situ due to side reactions that may be controlled by varying the process conditions. For example, varying amounts of diethylene, triethylene, and tetraethylene glycols may be formed from ethylene glycol from an acid-catalyzed dehydration reaction which occurs readily when the polycondensation reaction is carried out under acidic conditions. The presence of buffer solutions, well-known to those skilled in the art, may be added to the reaction mixture to retard these side reactions. Additional compositional latitude is possible, however, if the buffer is omitted and the dimerization, trimerization, and tetramerization reactions are allowed to proceed.

The sulfopolyester of the present invention may include from 0 to about 25 mole %, based on the total repeating units, of residues of a branching monomer having 3 or more functional groups wherein the functional groups are hydroxyl, carboxyl, or a combination thereof. Non-limiting examples of branching monomers are 1,1,1-trimethylol propane, 1,1,1-trimethylolethane, glycerin, pentaerythritol, erythritol, threitol, dipentaerythritol, sorbitol, trimellitic anhydride, pyromellitic dianhydride, dimethylol propionic acid, or combinations thereof. Further examples of branching monomer concentration ranges are from 0 to about 20 mole % and from 0 to about 10 mole %. The presence of a branching monomer may result in a number of possible benefits to the sulfopolyester of the present invention, including but not limited to, the ability to tailor rheological, solubility, and tensile properties. For example, at a constant molecular weight, a branched sulfopolyester, compared to a linear analog, will also have a greater concentration of end groups that may facilitate post-polymerization crosslinking reactions. At high concentrations of branching agent, however, the sulfopolyester may be prone to gelation.

The sulfopolyester used for the fiber of the present invention has a glass transition temperature, abbreviated herein as "Tg", of at least 25° C. as measured on the dry polymer using standard techniques, such as differential scanning calorimetry ("DSC"), well known to persons skilled in the art. The Tg measurements of the sulfopolyesters of the present invention are conducted using a "dry polymer", that is, a polymer sample in which adventitious or absorbed water is driven off by heating to polymer to a temperature of about 200° C. and allowing the sample to return to room temperature. Typically, the sulfopolyester is dried in the DSC apparatus by conducting a first thermal scan in which the sample is heated to a temperature above the water vaporization temperature, holding the sample at that temperature until the vaporization of the water absorbed in the polymer is complete (as indicated by an a large, broad endotherm), cooling the sample to room temperature, and then conducting a second thermal scan to obtain the Tg measurement. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

Our novel fibers may consist essentially of or, consist of, the sulfopolyesters described hereinabove. In another embodiment, however, the sulfopolyesters of this invention may be a single polyester or may be blended with one or more supplemental polymers to modify the properties of the resulting fiber. The supplemental polymer may or may not be water-dispersible depending on the application and may be miscible or immiscible with the sulfopolyester. If the supplemental polymer is water non-dispersible, it is preferred that the blend with the sulfopolyester is immiscible. The term "miscible", as used herein, is intended to mean that the blend has a single, homogeneous amorphous phase as indicated by a single composition-dependent Tg. For example, a first polymer that is miscible with second polymer may be used to "plasticize" the second polymer as illustrated, for example, in U.S. Pat. No. 6,211,309. By contrast, the term "immiscible", as used herein, denotes a blend that shows at least 2, randomly mixed, phases and exhibits more than one Tg. Some polymers may be immiscible and yet compatible with the sulfopolyester. A further general description of miscible and immiscible polymer blends and the various analytical techniques for their characterization may be found in *Polymer Blends* Volumes 1 and 2, Edited by D. R. Paul and C. B. Bucknall, 2000, John Wiley & Sons, Inc.

Non-limiting examples of water-dispersible polymers that may be blended with the sulfopolyester are polymethacrylic acid, polyvinyl pyrrolidone, polyethylene-acrylic acid copolymers, polyvinyl methyl ether, polyvinyl alcohol, polyethylene oxide, hydroxy propyl cellulose, hydroxypropyl methyl cellulose, methyl cellulose, ethyl hydroxyethyl cellulose, isopropyl cellulose, methyl ether starch, polyacrylamides, poly(N-vinyl caprolactam), polyethyl oxazoline, poly (2-isopropyl-2-oxazoline), polyvinyl methyl oxazolidone, water-dispersible sulfopolyesters, polyvinyl methyl oxazolidimone, poly(2,4-dimethyl-6-triazinylethylene), and ethylene oxide-propylene oxide copolymers. Examples of polymers which are water non-dispersible that may be blended with the sulfopolyester include, but are not limited to, polyolefins, such as homo- and copolymers of polyethylene and polypropylene; poly(ethylene terephthalate); poly(butylene terephthalate); and polyamides, such as nylon-6; polylactides; caprolactone; Eastar Bio® (poly(tetramethylene adipate-co-terephthalate), a product of Eastman Chemical Company); polycarbonate; polyurethane; and polyvinyl chloride.

According to our invention, blends of more than one sulfopolyester may be used to tailor the end-use properties of the resulting fiber or fibrous article, for example, a nonwoven fabric or web. The blends of one or more sulfopolyesters will have Tg's of at least 25° C. for the water-dispersible, unicomponent fibers and at least 57° C. for the multicomponent fibers. Thus, blending may also be exploited to alter the processing characteristics of a sulfopolyester to facilitate the fabrication of a nonwoven. In another example, an immiscible blend of polypropylene and sulfopolyester may provide a conventional nonwoven web that will break apart and completely disperse in water as true solubility is not needed. In this latter example, the desired performance is related to maintaining the physical properties of the polypropylene while the sulfopolyester is only a spectator during the actual use of the product or, alternatively, the sulfopolyester is fugitive and is removed before the final form of the product is utilized.

The sulfopolyester and supplemental polymer may be blended in batch, semicontinuous, or continuous processes. Small scale batches may be readily prepared in any high-intensity mixing devices well-known to those skilled in the art, such as Banbury mixers, prior to melt-spinning fibers. The components may also be blended in solution in an appropriate solvent. The melt blending method includes blending the sulfopolyester and supplemental polymer at a temperature sufficient to melt the polymers. The blend may be cooled and pelletized for further use or the melt blend can be melt spun directly from this molten blend into fiber form. The term "melt" as used herein includes, but is not limited to, merely softening the polyester. For melt mixing methods generally known in the polymers art, see *Mixing and Compounding of Polymers* (I. Manas-Zloczower & Z. Tadmor editors, Carl Hanser Verlag Publisher, 1994, New York, N.Y.).

Our invention also provides a water-dispersible fiber comprising a sulfopolyester having a glass transition temperature (Tg) of at least 25° C., wherein the sulfopolyester comprises:

(A) about 50 to about 96 mole % of one or more residues of isophthalic acid or terephthalic acid, based on the total acid residues;

(B) about 4 to about 30 mole %, based on the total acid residues, of a residue of sodiosulfoisophthalic acid;

(C) one or more diol residues wherein at least 25 mole %, based on the total diol residues, is a poly(ethylene glycol) having a structure

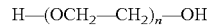

wherein n is an integer in the range of 2 to about 500; (iv) 0 to about 20 mole %, based on the total repeating units, of residues of a branching monomer having 3 or more functional groups wherein the functional groups are hydroxyl, carboxyl, or a combination thereof. As described hereinabove, the fiber may optionally include a first water-dispersible polymer blended with the sulfopolyester; and, optionally, a water non-dispersible polymer blended with the sulfopolyester such that the blend is an immiscible blend. Our fiber may contain less than 10 weight % of a pigment or filler, less than 8 weight %, or less than 6 weight % based on the total weight of the fiber. The first water-dispersible polymer is as described hereinabove. The sulfopolyester should have a glass transition temperature (Tg) of at least 25° C., but may have, for example, a Tg of about 35° C., about 48° C., about 55° C., about 65° C., about 70° C., about 75° C., about 85° C., and about 90° C. The sulfopolyester may contain other concentrations of isophthalic acid residues, for example, about 60 to about 95 mole %, and about 75 to about 95 mole %. Further examples of isophthalic acid residue concentrations ranges are about 70 to about 85 mole %, about 85 to about 95 mole % and about 90 to about 95 mole %. The sulfopolyester also may comprise about 25 to about 95 mole % of the residues of diethylene glycol. Further examples of diethylene glycol residue concentration ranges include about 50 to about 95 mole %, about 70 to about 95 mole %, and about 75 to about 95 mole %. The sulfopolyester also may include the residues of ethylene glycol and/or 1,4-cyclohexanedimethanol, abbreviated herein as "CHDM". Typical concentration ranges of CHDM residues are about 10 to about 75 mole %, about 25 to about 65 mole %, and about 40 to about 60 mole %. Typical concentration ranges of ethylene glycol residues are about 10 to about 75 mole %, about 25 to about 65 mole %, and about 40 to about 60 mole %. In another embodiment, the sulfopolyester comprises is about 75 to about 96 mole % of the residues of isophthalic acid and about 25 to about 95 mole % of the residues of diethylene glycol.

The sulfopolyesters of the instant invention are readily prepared from the appropriate dicarboxylic acids, esters, anhydrides, or salts, sulfomonomer, and the appropriate diol or diol mixtures using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation and is to be contrasted with a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the sulfopolyester may deteriorate in appearance if allowed to reside in a reactor at an elevated temperature for too long a duration.

The sulfopolyesters of the present invention are prepared by procedures known to persons skilled in the art. The sulfomonomer is most often added directly to the reaction mixture from which the polymer is made, although other processes are known and may also be employed, for example, as described in U.S. Pat. Nos. 3,018,272, 3,075,952, and 3,033,822. The reaction of the sulfomonomer, diol component and the dicarboxylic acid component may be carried out using conventional polyester polymerization conditions. For example, when preparing the sulfopolyesters by means of an ester interchange reaction, i.e., from the ester form of the dicarboxylic acid components, the reaction process may comprise two steps. In the first step, the diol component and the dicarboxylic acid component, such as, for example, dimethyl isophthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form sulfopolyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and most preferably about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 ton) to about 0.013 kPa (0.1 ton). Stirring or appropriate conditions are used in both stages to ensure adequate heat transfer and surface renewal of the reaction mixture. The reactions of both stages are facilitated by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction mechanism is driven to completion, it is preferred to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of sulfopolyester by direct esterification, i.e., from the acid form of the dicarboxylic acid component, sulfopolyesters are produced by reacting the dicarboxylic acid or a mixture of dicarboxylic acids with the diol component or a mixture of diol components. The reaction is conducted at a pressure of from about 7 kPa gauge (1 psig) to about 1379 kPa gauge (200 psig), preferably less than 689 kPa (100 psig) to produce a low molecular weight, linear or branched sulfopolyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction.

The water dispersible, multicomponent, and short cut fibers and fibrous articles made therefrom also may contain other conventional additives and ingredients which do not deleteriously affect their end use. For example, additives such as fillers, surface friction modifiers, light and heat stabilizers, extrusion aids, antistatic agents, colorants, dyes, pigments, fluorescent brighteners, antimicrobials, anticounterfeiting markers, hydrophobic and hydrophilic enhancers, viscosity modifiers, slip agents, tougheners, adhesion promoters, and the like may be used.

The fibers and fibrous articles of our invention do not require the presence of additives such as, for example, pigments, fillers, oils, waxes, or fatty acid finishes, to prevent blocking or fusing of the fibers during processing. The terms "blocking or fusing", as used herein, is understood to mean that the fibers or fibrous articles stick together or fuse into a mass such that the fiber cannot be processed or used for its intended purpose. Blocking and fusing can occur during processing of the fiber or fibrous article or during storage over a period of days or weeks and is exacerbated under hot, humid conditions.

In one embodiment of the invention, the fibers and fibrous articles will contain less than 10 weight % of such anti-blocking additives, based on the total weight of the fiber or fibrous article. For example, the fibers and fibrous articles may contain less than 10 weight % of a pigment or filler. In other examples, the fibers and fibrous articles may contain less than 9 weight %, less than 5 weight %, less than 3 weight %, less than 1 weight %, and 0 weight % of a pigment or filler, based on the total weight of the fiber. Colorants, sometimes referred to as toners, may be added to impart a desired neutral hue and/or brightness to the sulfopolyester. When colored fibers are desired, pigments or colorants may be included in the sulfopolyester reaction mixture during the reaction of the diol monomer and the dicarboxylic acid monomer or they may be melt blended with the preformed sulfopolyester. A preferred method of including colorants is to use a colorant having thermally stable organic colored compounds having reactive groups such that the colorant is copolymerized and incorporated into the sulfopolyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the copolyester reaction process after an ester interchange or direct esterification reaction.

For the purposes of this invention, the term "fiber" refers to a polymeric body of high aspect ratio capable of being formed into two or three dimensional articles such as woven or nonwoven fabrics. In the context of the present invention, the term "fiber" is synonymous with "fibers" and intended to mean one or more fibers. The fibers of our invention may be unicomponent fibers, bicomponent, or multicomponent fibers. The term "unicomponent fiber", as used herein, is intended to mean a fiber prepared by melt spinning a single sulfopolyester, blends of one or more sulfopolyesters, or blends of one or more sulfopolyesters with one or more additional polymers and includes staple, monofilament, and multifilament fibers. "Unicomponent" is intended to be synonymous with the term "monocomponent" and includes "biconstituent" or "multiconstituent" fibers, and refers to fibers which have been formed from at least two polymers extruded from the same extruder as a blend. Unicomponent or biconstituent fibers do not have the various polymer components arranged in relatively constantly positioned distinct zones across the cross-sectional area of the fiber and the various polymers are usually not continuous along the entire length of the fiber, instead usually forming fibrils or protofibrils which start and end at random. Thus, the term "unicomponent" is not intended to exclude fibers formed from a polymer or blends of one or more polymers to which small amounts of additives may be added for coloration, anti-static properties, lubrication, hydrophilicity, etc.

By contrast, the term "multicomponent fiber", as used herein, intended to mean a fiber prepared by melting the two or more fiber forming polymers in separate extruders and by directing the resulting multiple polymer flows into one spinneret with a plurality of distribution flow paths but spun together to form one fiber. Multicomponent fibers are also sometimes referred to as conjugate or bicomponent fibers. The polymers are arranged in substantially constantly positioned distinct segments or zones across the cross-section of the conjugate fibers and extend continuously along the length of the conjugate fibers. The configuration of such a multicomponent fiber may be, for example, a sheath/core arrangement wherein one polymer is surrounded by another or may be a side by side arrangement, a ribbon or stripped arrangement, a pie arrangement or an "islands-in-the-sea" arrangement. For example, a multicomponent fiber may be prepared by extruding the sulfopolyester and one or more water non-dispersible polymers separately through a spinneret having a shaped or engineered transverse geometry such as, for example, an "islands-in-the-sea" or segmented pie configuration. Multicomponent fibers, typically, are staple, monofilament or multifilament fibers that have a shaped or round cross-section.

Most fiber forms are heatset. The fiber may include the various antioxidants, pigments, and additives as described herein.

Monofilament fibers generally range in size from about 15 to about 8000 denier per filament (abbreviated herein as "d/f"). Our novel fibers typically will have d/f values in the range of about 40 to about 5000. Monofilaments may be in the form of unicomponent or multicomponent fibers. The multifilament fibers of our invention will preferably range in size from about 1.5 micrometers for melt blown webs, about 0.5 to about 50 d/f for staple fibers, and up to about 5000 d/f for monofilament fibers. Multifilament fibers may also be used as crimped or uncrimped yarns and tows. Fibers used in melt blown web and melt spun fabrics may be produced in microdenier sizes. The term "microdenier", as used herein, is intended to mean a d/f value of 1 d/f or less. For example, the microdenier fibers of the instant invention typically have d/f values of 1 or less, 0.5 or less, or 0.1 or less. Nanofibers can also be produced by electrostatic spinning.

As noted hereinabove, the sulfopolyesters also are advantageous for the preparation of bicomponent and multicomponent fibers having a shaped cross section. We have discovered that sulfopolyesters or blends of sulfopolyesters having a glass transition temperature (Tg) of at least 57° C. are particularly useful for multicomponent fibers to prevent blocking and fusing of the fiber during spinning and take up. Thus, our invention provides a multicomponent fiber having shaped cross section, comprising:

(A) a water dispersible sulfopolyester having a glass transition temperature (Tg) of at least 57° C., the sulfopolyester comprising:
(i) residues of one or more dicarboxylic acids;
(ii) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof;
(iii) one or more diol residues wherein at least 25 mole %, based on the total diol residues, is a poly(ethylene glycol) having a structure

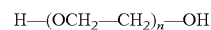

wherein n is an integer in the range of 2 to about 500; and
(iv) 0 to about 25 mole %, based on the total repeating units, of residues of a branching monomer having 3 or more functional groups wherein the functional groups are hydroxyl, carboxyl, or a combination thereof; and (B) a plurality of segments comprising one or more water non-dispersible polymers immiscible with the sulfopolyester, wherein the segments are substantially isolated from each other by the sulfopolyester intervening between the segments;

optionally, wherein the fiber has an islands-in-the-sea or segmented pie cross section and contains less than 10 weight % of a pigment or filler, based on the total weight of the fiber.

The dicarboxylic acids, diols, sulfopolyester, sulfomonomers, and branching monomers residues are as described previously for other embodiments of the invention. For multicomponent fibers, it is advantageous that the sulfopolyester have a Tg of at least 57° C. Further examples of glass transition temperatures that may be exhibited by the sulfopolyester or sulfopolyester blend of our multicomponent fiber are at least 60° C., at least 65° C., at least 70° C., at least 75° C., at least 80° C., at least 85° C., and at least 90° C. Further, to obtain a sulfopolyester with a Tg of at least 57° C., blends of one or more sulfopolyesters may be used in varying proportions to obtain a sulfopolyester blend having the desired Tg.

The Tg of a sulfopolyester blend may be calculated by using a weighted average of the Tg's of the sulfopolyester components. For example, sulfopolyester having a Tg of 48° C. may be blended in a 25:75 wt:wt ratio with another sulfopolyester having Tg of 65° C. to give a sulfopolyester blend having a Tg of approximately 61° C.

In another embodiment of the invention, the water dispersible sulfopolyester component of the multicomponent fiber presents properties which allow at least one of the following:
(A) the multicomponent fibers to be spun to a desired low denier,
(B) the sulfopolyester in these multicomponent fibers is resistant to removal during hydroentangling of a web formed from the fibers but is efficiently removed at elevated temperatures after hydroentanglement, and
(C) the multicomponent fibers are heat settable to yield a stable, strong fabric. Surprising and unexpected results were achieved in furtherance of these objectives using a sulfopolyester having a certain melt viscosity and level of sulfomonomer residues.

Therefore, in another embodiment of the invention, a multicomponent fiber is provided having a shaped cross section comprising:
(A) at least one water dispersible sulfopolyester; and
(B) a plurality of domains comprising one or more water non-dispersible polymers immiscible with the sulfopolyester, wherein the domains are substantially isolated from each other by the sulfopolyester intervening between the domains,
optionally, wherein the fiber has an as-spun denier of less than about 6 denier per filament;
wherein the water dispersible sulfopolyesters exhibits a melt viscosity of less than about 12,000 poise measured at 240° C. at a strain rate of 1 rad/sec, and
wherein the sulfopolyester comprises less than about 25 mole % of residues of at least one sulfomonomer, based on the total moles of diacid or diol residues.

The sulfopolyester utilized in these multicomponent fibers has a melt viscosity of generally less than about 12,000 poise. In other embodiments, the melt viscosity of the sulfopolyester is less than about 10,000 poise, less than about 6,000, or less than about 4,000 poise measured at 240° C. and 1 rad/sec shear rate. In another aspect, the sulfopolyester exhibits a melt viscosity of between about 1,000 to about 12,000 poise, between about 2,000 to about 6,000 poise, or between about 2,500 to about 4,000 poise measured at 240° C. and 1 rad/sec shear rate. Prior to determining the viscosity, the samples are dried at 60° C. in a vacuum oven for 2 days. The melt viscosity is measured on rheometer using a 25 mm diameter parallel-plate geometry at 1 mm gap setting. A dynamic frequency sweep is run at a strain rate range of 1 to 400 rad/sec and 10% strain amplitude. The viscosity is then measured at 240° C. and strain rate of 1 rad/sec.

The level of sulfomonomer residues in the sulfopolyester polymers for use in accordance with this aspect of the present invention is generally less than about 25 mole % or less than about 20 mole %, reported as a percentage of the total diacid or diol residues in the sulfopolyester. In other embodiments, this level is between about 4 to about 20 mole %, between about 5 to about 12 mole %, or between about 7 to about 10 mole %. Sulfomonomers for use with the invention preferably have 2 functional groups and one or more sulfonate groups attached to an aromatic or cycloaliphatic ring wherein the functional groups are hydroxyl, carboxyl, or a combination thereof. In one embodiment, a sodiosulfo-isophthalic acid monomer is utilized.

In addition to the sulfomonomer described previously, the sulfopolyester can comprise residues of one or more dicarboxylic acids, one or more diol residues wherein at least 25 mole %, based on the total diol residues, is a poly(ethylene glycol) having a structure

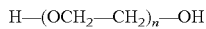

wherein n is an integer in the range of 2 to about 500, and 0 to about 20 mole %, based on the total repeating units, of residues of a branching monomer having 3 or more functional groups wherein the functional groups are hydroxyl, carboxyl, or a combination thereof.

In another embodiment, the sulfopolyester comprises from about 80-96 mole % dicarboxylic acid residues, from about 4 to about 20 mole % sulfomonomer residues, and 100 mole % diol residues (there being a total mole % of 200%, i.e., 100 mole % diacid and 100 mole % diol). More specifically, the dicarboxylic portion of the sulfopolyester comprises between about 60-80 mole % terephthalic acid, about 0-30 mole % isophthalic acid, and about 4-20 mole % 5-sodiosulfoisophthalic acid (5-SSIPA). The diol portion comprises from about 0-50 mole % diethylene glycol and from about 50-100 mole % ethylene glycol. An exemplary formulation according to this embodiment of the invention is set forth subsequently.

|  | Approximate Mole % (based on total moles of diol or diacid residues) |
|---|---|
| Terephthalic acid | 71 |
| Isophthalic acid | 20 |
| 5-SSIPA | 9 |
| Diethylene glycol | 35 |
| Ethylene glycol | 65 |

The water non-dispersible component of the multicomponent fiber may comprise any of those water non-dispersible polymers described herein. Spinning of the fiber may also occur according to any method described herein. However, the improved rheological properties of multicomponent fibers in accordance with this aspect of the invention provide for enhanced drawings speeds. When the sulfopolyester and water non-dispersible polymer are extruded to produce multicomponent extrudates, the multicomponent extrudate is capable of being melt drawn to produce the multicomponent fiber, using any of the methods disclosed herein, at a speed of at least about 2000 m/min, more preferably at least about 3000 m/min, even more preferably at least about 4000 m/min, and most preferably at least about 4500 m/min. Although not intending to be bound by theory, melt drawing of the multicomponent extrudates at these speeds results in at least some oriented crystallinity in the water non-dispersible component of the multicomponent fiber. This oriented crystallinity can increase the dimensional stability of non-woven materials made from the multicomponent fibers during subsequent processing.

Another advantage of the multicomponent extrudate is that it can be melt drawn to a multicomponent fiber having an as-spun denier of less than 6 deniers per filament. Other ranges of multicomponent fiber sizes include an as-spun denier of less than 4 deniers per filament and less than 2.5 deniers per filament.

Therefore, in another embodiment of the invention, a multicomponent extrudate having a shaped cross section, comprising:
(A) at least one water dispersible sulfopolyester; and
(B) a plurality of domains comprising one or more water non-dispersible polymers immiscible with the sulfopolyester, wherein the domains are substantially isolated from each other by the sulfopolyester intervening between the domains, wherein the extrudate is capable of being melt drawn at a speed of at least about 2000 m/min.

The multicomponent fiber comprises a plurality of segments or domains of one or more water non-dispersible polymers immiscible with the sulfopolyester in which the segments or domains are substantially isolated from each other by the sulfopolyester intervening between the segments or domains. The term "substantially isolated", as used herein, is intended to mean that the segments or domains are set apart from each other to permit the segments domains to form individual fibers upon removal of the sulfopolyester. For example, the segments or domains may be touching each others as in, for example, a segmented pie configuration but can be split apart by impact or when the sulfopolyester is removed.

The ratio by weight of the sulfopolyester to water non-dispersible polymer component in the multicomponent fiber of the invention is generally in the range of about 60:40 to about 2:98 or, in another example, in the range of about 50:50 to about 5:95. Typically, the sulfopolyester comprises 50% by weight or less of the total weight of the multicomponent fiber.

The segments or domains of multicomponent fiber may comprise one or more water non-dispersible polymers. Examples of water non-dispersible polymers which may be used in segments of the multicomponent fiber include, but are not limited to, polyolefins, polyesters, polyamides, polylactides, polycaprolactone, polycarbonate, polyurethane, cellulose ester, and polyvinyl chloride. For example, the water non-dispersible polymer may be polyester such as poly(ethylene) terephthalate, poly(butylene) terephthalate, poly(cyclohexylene) cyclohexanedicarboxylate, poly(cyclohexylene) terephthalate, poly(trimethylene) terephthalate, and the like. In another example, the water non-dispersible polymer can be biodistintegratable as determined by DIN Standard 54900 and/or biodegradable as determined by ASTM Standard Method, D6340-98. Examples of biodegradable polyesters and polyester blends are disclosed in U.S. Pat. Nos. 5,599,858; 5,580,911; 5,446,079; and 5,559,171. The term "biodegradable", as used herein in reference to the water non-dispersible polymers of the present invention, is understood to mean that the polymers are degraded under environmental influences such as, for example, in a composting environment, in an appropriate and demonstrable time span as defined, for example, by ASTM Standard Method, D6340-98, entitled "Standard Test Methods for Determining Aerobic Biodegradation of Radiolabeled Plastic Materials in an Aqueous or Compost Environment". The water non-dispersible polymers of the present invention also may be "biodisintegratable", meaning that the polymers are easily fragmented in a composting environment as defined, for example, by DIN Standard 54900. For example, the biodegradable polymer is initially reduced in molecular weight in the environment by the action of heat, water, air, microbes and other factors. This reduction in molecular weight results in a loss of physical properties (tenacity) and often in fiber breakage. Once the molecular weight of the polymer is sufficiently low, the monomers and oligomers are then assimilated by the microbes. In an aerobic environment, these monomers or oligomers are ultimately oxidized to $CO_2$, $H_2O$, and new cell biomass. In an anaerobic environment, the monomers or oligomers are ultimately converted to $CO_2$, $H_2$, acetate, methane, and cell biomass.

For example, water non-dispersible polymer may be an aliphatic-aromatic polyester, abbreviated herein as "AAPE".

The term "aliphatic-aromatic polyester", as used herein, means a polyester comprising a mixture of residues from aliphatic or cycloaliphatic dicarboxylic acids or diols and aromatic dicarboxylic acids or diols. The term "non-aromatic", as used herein with respect to the dicarboxylic acid and diol monomers of the present invention, means that carboxyl or hydroxyl groups of the monomer are not connected through an aromatic nucleus. For example, adipic acid contains no aromatic nucleus in its backbone, i.e., the chain of carbon atoms connecting the carboxylic acid groups, thus is "non-aromatic". By contrast, the term "aromatic" means the dicarboxylic acid or diol contains an aromatic nucleus in the backbone such as, for example, terephthalic acid or 2,6-naphthalene dicarboxylic acid. "Non-aromatic", therefore, is intended to include both aliphatic and cycloaliphatic structures such as, for example, diols and dicarboxylic acids, which contain as a backbone a straight or branched chain or cyclic arrangement of the constituent carbon atoms which may be saturated or paraffinic in nature, unsaturated, i.e., containing non-aromatic carbon-carbon double bonds, or acetylenic, i.e., containing carbon-carbon triple bonds. Thus, in the context of the description and the claims of the present invention, non-aromatic is intended to include linear and branched, chain structures (referred to herein as "aliphatic") and cyclic structures (referred to herein as "alicyclic" or "cycloaliphatic"). The term "non-aromatic", however, is not intended to exclude any aromatic substituents which may be attached to the backbone of an aliphatic or cycloaliphatic diol or dicarboxylic acid. In the present invention, the difunctional carboxylic acid typically is a aliphatic dicarboxylic acid such as, for example, adipic acid, or an aromatic dicarboxylic acid such as, for example, terephthalic acid. The difunctional hydroxyl compound may be cycloaliphatic diol such as, for example, 1,4-cyclohexanedimethanol, a linear or branched aliphatic diol such as, for example, 1,4-butanediol, or an aromatic diol such as, for example, hydroquinone.

The AAPE may be a linear or branched random copolyester and/or chain extended copolyester comprising diol residues which comprise the residues of one or more substituted or unsubstituted, linear or branched, diols selected from aliphatic diols containing 2 to about 8 carbon atoms, polyalkylene ether glycols containing 2 to 8 carbon atoms, and cycloaliphatic diols containing about 4 to about 12 carbon atoms. The substituted diols, typically, will comprise 1 to about 4 substituents independently selected from halo, $C_6$-$C_{10}$ aryl, and $C_1$-$C_4$ alkoxy. Examples of diols which may be used include, but are not limited to, ethylene glycol, diethylene glycol, propylene glycol, 1,3-propanediol, 2,2-dimethyl-1,3-propanediol, 1,3-butanediol, 1,4-butanediol, 1,5-pentanediol, 1,6-hexanediol, polyethylene glycol, diethylene glycol, 2,2,4-trimethyl-1,6-hexanediol, thiodiethanol, 1,3-cyclohexanedimethanol, 1,4-cyclo-hexanedimethanol, 2,2,4,4-tetramethyl-1,3-cyclobutanediol, triethylene glycol, and tetraethylene glycol with the preferred diols comprising one or more diols selected from 1,4-butanediol; 1,3-propanediol; ethylene glycol; 1,6-hexanediol; diethylene glycol; or 1,4-cyclohexanedimethanol. The AAPE also comprises diacid residues which contain about 35 to about 99 mole %, based on the total moles of diacid residues, of the residues of one or more substituted or unsubstituted, linear or branched, non-aromatic dicarboxylic acids selected from aliphatic dicarboxylic acids containing 2 to about 12 carbon atoms and cycloaliphatic acids containing about 5 to about 10 carbon atoms. The substituted non-aromatic dicarboxylic acids will typically contain 1 to about 4 substituents selected from halo, $C_6$-$C_{10}$ aryl, and $C_1$-$C_4$ alkoxy. Non-limiting examples of non-aromatic diacids include malonic, succinic, glutaric, adipic, pimelic, azelaic, sebacic, fumaric, 2,2-dimethyl glutaric, suberic, 1,3-cyclopentanedicarboxylic, 1,4-cyclohexanedicarboxylic, 1,3-cyclohexanedicarboxylic, diglycolic, itaconic, maleic, and 2,5-norbornane-dicarboxylic. In addition to the non-aromatic dicarboxylic acids, the AAPE comprises about 1 to about 65 mole %, based on the total moles of diacid residues, of the residues of one or more substituted or unsubstituted aromatic dicarboxylic acids containing 6 to about 10 carbon atoms. In the case where substituted aromatic dicarboxylic acids are used, they will typically contain 1 to about 4 substituents selected from halo, $C_6$-$C_{10}$ aryl, and $C_1$-$C_4$ alkoxy. Non-limiting examples of aromatic dicarboxylic acids which may be used in the AAPE of our invention are terephthalic acid, isophthalic acid, salts of 5-sulfoisophthalic acid, and 2,6-naphthalenedicarboxylic acid. More preferably, the non-aromatic dicarboxylic acid will comprise adipic acid, the aromatic dicarboxylic acid will comprise terephthalic acid, and the diol will comprise 1,4-butanediol.

Other possible compositions for the AAPE's of our invention are those prepared from the following diols and dicarboxylic acids (or polyester-forming equivalents thereof such as diesters) in the following mole % ages, based on 100 mole % of a diacid component and 100 mole % of a diol component:

(1) glutaric acid (about 30 to about 75%); terephthalic acid (about 25 to about 70%); 1,4-butanediol (about 90 to 100%); and modifying diol (0 about 10%);
(2) succinic acid (about 30 to about 95%); terephthalic acid (about 5 to about 70%); 1,4-butanediol (about 90 to 100%); and modifying diol (0 to about 10%); and
(3) adipic acid (about 30 to about 75%); terephthalic acid (about 25 to about 70%); 1,4-butanediol (about 90 to 100%); and modifying diol (0 to about 10%).

The modifying diol preferably is selected from 1,4-cyclohexanedimethanol, triethylene glycol, polyethylene glycol and neopentyl glycol. The most preferred AAPE's are linear, branched or chain extended copolyesters comprising about 50 to about 60 mole % adipic acid residues, about 40 to about 50 mole % terephthalic acid residues, and at least 95 mole % 1,4-butanediol residues. Even more preferably, the adipic acid residues comprise about 55 to about 60 mole %, the terephthalic acid residues comprise about 40 to about 45 mole %, and the diol residues comprise about 95 mole % 1,4-butanediol residues. Such compositions are commercially available under the trademark EASTAR BIO® copolyester from Eastman Chemical Company, Kingsport, Tenn., and under the trademark ECOFLEX® from BASF Corporation.

Additional, specific examples of preferred AAPE's include a poly(tetra-methylene glutarate-co-terephthalate) containing (a) 50 mole percent glutaric acid residues, 50 mole percent terephthalic acid residues, and 100 mole percent 1,4-butanediol residues, (b) 60 mole percent glutaric acid residues, 40 mole percent terephthalic acid residues, and 100 mole percent 1,4-butanediol residues or (c) 40 mole percent glutaric acid residues, 60 mole percent terephthalic acid residues, and 100 mole percent 1,4-butanediol residues; a poly(tetramethylene succinate-co-terephthalate) containing (a) 85 mole percent succinic acid residues, 15 mole percent terephthalic acid residues, and 100 mole percent 1,4-butanediol residues or (b) 70 mole percent succinic acid residues, 30 mole percent terephthalic acid residues, and 100 mole percent 1,4-butanediol residues; a poly(ethylene succinate-co-terephthalate) containing 70 mole percent succinic acid residues, 30 mole percent terephthalic acid residues, and 100 mole percent ethylene glycol residues; and a poly(tetramethylene adipate-co-terephthalate) containing (a) 85 mole percent adipic acid residues, 15 mole percent terephthalic acid residues, and 100 mole percent 1,4-butanediol residues; or (b) 55 mole percent adipic acid residues, 45 mole percent terephthalic acid residues, and 100 mole percent 1,4-butanediol residues.

The AAPE preferably comprises from about 10 to about 1,000 repeating units and preferably, from about 15 to about 600 repeating units. The AAPE may have an inherent viscosity of about 0.4 to about 2.0 dL/g, or more preferably about 0.7 to about 1.6 dL/g, as measured at a temperature of 25° C. using a concentration of 0.5 gram copolyester in 100 ml of a 60/40 by weight solution of phenol/tetrachloroethane.

The AAPE, optionally, may contain the residues of a branching agent. The mole % age ranges for the branching agent are from about 0 to about 2 mole %, preferably about 0.1 to about 1 mole %, and most preferably about 0.1 to about 0.5 mole % based on the total moles of diacid or diol residues (depending on whether the branching agent contains carboxyl or hydroxyl groups). The branching agent preferably has a weight average molecular weight of about 50 to about 5000, more preferably about 92 to about 3000, and a functionality of about 3 to about 6. The branching agent, for example, may be the esterified residue of a polyol having 3 to 6 hydroxyl groups, a polycarboxylic acid having 3 or 4 carboxyl groups (or ester-forming equivalent groups) or a hydroxy acid having a total of 3 to 6 hydroxyl and carboxyl groups. In addition, the AAPE may be branched by the addition of a peroxide during reactive extrusion.

Each segment of the water non-dispersible polymer may be different from others in fineness and may be arranged in any shaped or engineered cross-sectional geometry known to persons skilled in the art. For example, the sulfopolyester and a water non-dispersible polymer may be used to prepare a bicomponent fiber having an engineered geometry such as, for example, a side-by-side, "islands-in-the-sea", segmented pie, sheath/core, ribbon (stripped), or other configurations known to persons skilled in the art. Other multicomponent configurations are also possible. Subsequent removal of a side, the "sea", or a portion of the "pie" can result in very fine fibers. The process of preparing bicomponent fibers also is well known to persons skilled in the art. In a bicomponent fiber, the sulfopolyester fibers of this invention may be present in amounts of about 10 to about 90 weight % and will generally be used in the sheath portion of sheath/core fibers. Typically, when a water-insoluble or water non-dispersible polymer is used, the resulting bicomponent or multicomponent fiber is not completely water-dispersible. Side by side combinations with significant differences in thermal shrinkage can be utilized for the development of a spiral crimp. If crimping is desired, a saw tooth or stuffer box crimp is generally suitable for many applications. If the second polymer component is in the core of a sheath/core configuration, such a core optionally may be stabilized.

The sulfopolyesters are particularly useful for fibers having an "islands-in-the-sea" or "segmented pie" cross section as they only requires neutral or slightly acidic (i.e., "soft" water) to disperse, as compared to the caustic-containing solutions that are sometimes required to remove other water dispersible polymers from multicomponent fibers. The term "soft water" as used in this disclosure means that the water has up to 5 grains per gallon as $CaCO_3$ (1 grain of $CaCO_3$ per gallon is equivalent to 17.1 ppm).

Another aspect of our invention is a multicomponent fiber, comprising:
(A) a water dispersible sulfopolyester having a glass transition temperature (Tg) of at least 57° C., the sulfopolyester comprising:

(i) about 50 to about 96 mole % of one or more residues of isophthalic acid or terephthalic acid, based on the total acid residues;
(ii) about 4 to about 30 mole %, based on the total acid residues, of a residue of sodiosulfoisophthalic acid;
(iii) one or more diol residues wherein at least 25 mole %, based on the total diol residues, is a poly(ethylene glycol) having a structure

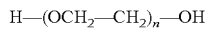

wherein n is an integer in the range of 2 to about 500;
(iv) 0 to about 20 mole %, based on the total repeating units, of residues of a branching monomer having 3 or more functional groups wherein the functional groups are hydroxyl, carboxyl, or a combination thereof; and
(B) a plurality of segments comprising one or more water non-dispersible polymers immiscible with the sulfopolyester, wherein the segments are substantially isolated from each other by the sulfopolyester intervening between the segments.

In one embodiment, the multicomponent fiber has an islands-in-the-sea or segmented pie cross section and contains less than 10 weight % of a pigment or filler, based on the total weight of the fiber.

The dicarboxylic acids, diols, sulfopolyester, sulfomonomers, branching monomers residues, and water non-dispersible polymers are as described previously. For multicomponent fibers, it is advantageous that sulfopolyester have a Tg of at least 57° C. The sulfopolyester may be a single sulfopolyester or a blend of one or more sulfopolyester polymers. Further examples of glass transition temperatures that may be exhibited by the sulfopolyester or sulfopolyester blends are at least 65° C., at least 70° C., at least 75° C., at least 85° C., and at least 90° C. For example, the sulfopolyester may comprise about 75 to about 96 mole % of one or more residues of isophthalic acid or terephthalic acid and about 25 to about 95 mole % of a residue of diethylene glycol. As described hereinabove, examples of the water non-dispersible polymers are polyolefins, polyesters, polyamides, polylactides, polycaprolactones, polycarbonates, polyurethanes, cellulose esters, and polyvinyl chlorides. In addition, the water non-dispersible polymer may be biodegradable or biodisintegratable. For example, the water non-dispersible polymer may be an aliphatic-aromatic polyester as described previously.

Our novel multicomponent fiber may be prepared by any number of methods known to persons skilled in the art. The present invention thus provides a process for a multicomponent fiber having a shaped cross section comprising: spinning a water dispersible sulfopolyester having a glass transition temperature (Tg) of at least 57° C. and one or more water non-dispersible polymers immiscible with the sulfopolyester into a fiber, the sulfopolyester comprising:
(A) residues of one or more dicarboxylic acids;
(B) about 4 to about 40 mole %, based on the total repeating units, of residues of at least one sulfomonomer having 2 functional groups and one or more sulfonate groups attached to an aromatic or cycloaliphatic ring wherein the functional groups are hydroxyl, carboxyl, or a combination thereof;
(C) one or more diol residues wherein at least 25 mole %, based on the total diol residues, is a poly(ethylene glycol) having a structure

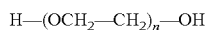

wherein n is an integer in the range of 2 to about 500; and
(D) 0 to about 25 mole %, based on the total repeating units, of residues of a branching monomer having 3 or more functional groups wherein the functional groups are hydroxyl, carboxyl, or a combination thereof;
wherein the fiber has a plurality of segments comprising the water non-dispersible polymers and the segments are substantially isolated from each other by the sulfopolyester intervening between the segments. In one embodiment, the fiber contains less than 10 weight % of a pigment or filler, based on the total weight of the fiber. For example, the multicomponent fiber may be prepared by melting the sulfopolyester and one or more water non-dispersible polymers in separate extruders and directing the individual polymer flows into one spinneret or extrusion die with a plurality of distribution flow paths such that the water non-dispersible polymer component form small segments or thin strands which are substantially isolated from each other by the intervening sulfopolyester. The cross section of such a fiber may be, for example, a segmented pie arrangement or an islands-in-the-sea arrangement. In another example, the sulfopolyester and one or more water non-dispersible polymers are separately fed to the spinneret orifices and then extruded in sheath-core form in which the water non-dispersible polymer forms a "core" that is substantially enclosed by the sulfopolyester "sheath" polymer. In the case of such concentric fibers, the orifice supplying the "core" polymer is in the center of the spinning orifice outlet and flow conditions of core polymer fluid are strictly controlled to maintain the concentricity of both components when spinning. Modifications in spinneret orifices enable different shapes of core and/or sheath to be obtained within the fiber cross-section. In yet another example, a multicomponent fiber having a side-by-side cross section or configuration may be produced (1) by coextruding the water dispersible sulfopolyester and water non-dispersible polymer through orifices separately and converging the separate polymer streams at substantially the same speed to merge side-by-side as a combined stream below the face of the spinneret; or (2) by feeding the two polymer streams separately through orifices, which converge at the surface of the spinneret, at substantially the same speed to merge side-by-side as a combined stream at the surface of the spinneret. In both cases, the velocity of each polymer stream, at the point of merge, is determined by its metering pump speed, the number of orifices, and the size of the orifice.

The dicarboxylic acids, diols, sulfopolyester, sulfomonomers, branching monomers residues, and water non-dispersible polymers are as described previously. The sulfopolyester has a glass transition temperature of at least 57° C. Further examples of glass transition temperatures that may be exhibited by the sulfopolyester or sulfopolyester blend are at least 65° C., at least 70° C., at least 75° C., at least 85° C., and at least 90° C. In one example, the sulfopolyester may comprise about 50 to about 96 mole % of one or more residues of isophthalic acid or terephthalic acid, based on the total acid residues; and about 4 to about 30 mole %, based on the total acid residues, of a residue of sodiosulfoisophthalic acid; and 0 to about 20 mole %, based on the total repeating units, of residues of a branching monomer having 3 or more functional groups wherein the functional groups are hydroxyl, carboxyl, or a combination thereof. In another example, the sulfopolyester may comprise about 75 to about 96 mole % of one or more residues of isophthalic acid or terephthalic acid and about 25 to about 95 mole % of a residue of diethylene glycol. As described hereinabove, examples of the water non-dispersible polymers are polyolefins, polyesters, polyamides, polylactides, polycaprolactone, polycarbonate, polyurethane, and polyvinyl chloride. In addition, the water non-dispersible polymer may be biodegradable or biodisintegratable. For example, the water non-dispersible polymer may be an aliphatic-aromatic polyester as described previously. Examples of shaped cross sections include, but are not limited to, islands-in-the-sea, side-by-side, sheath-core, segmented pie, or ribbon (stripped) configurations.

In another embodiment of the invention, a process for making a multicomponent fiber having a shaped cross section is provided comprising: spinning at least one water dispersible sulfopolyester and one or more water non-dispersible polymers immiscible with the sulfopolyester to produce a multicomponent fiber, wherein the multicomponent fiber has a plurality of domains comprising the water non-dispersible polymers and the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprising less than about 25 mole % of residues of at least one sulfomonomer, based on the total moles of diacid or diol residues. In another embodiment, the multicomponent fiber has an as-spun denier of less than about 6 denier per filament.

The sulfopolyester utilized in these multicomponent fiber and the water non-dispersible polymers were discussed previously in this disclosure.

In another embodiment of this invention, a process for making a multicomponent fiber having a shaped cross section is provided comprising:
(A) extruding at least one water dispersible sulfopolyester and one or more water non-dispersible polymers immiscible with the sulfopolyester to produce a multicomponent extrudate, wherein the multicomponent extrudate has a plurality of domains comprising the water non-dispersible polymers and the domains are substantially isolated from each other by the sulfopolyester intervening between the domains; and
(B) melt drawing the multicomponent extrudate at a speed of at least about 2000 m/min to produce the multicomponent fiber.

It is also a feature of this embodiment of the invention that the process includes the step of melt drawing the multicomponent extrudate at a speed of at least about 2000 m/min, at least about 3000 m/min, or at least 4500 m/min.

Typically, upon exiting the spinneret, the fibers are quenched with a cross flow of air whereupon the fibers solidify. Various finishes and sizes may be applied to the fiber at this stage. The cooled fibers, typically, are subsequently drawn and wound up on a take up spool. Other additives may be incorporated in the finish in effective amounts like emulsifiers, antistatics, antimicrobials, antifoams, lubricants, thermostabilizers, UV stabilizers, and the like.

Optionally, the drawn fibers may be textured and wound-up to form a bulky continuous filament. This one-step technique is known in the art as spin-draw-texturing. Other embodiments include flat filament (non-textured) yarns, or cut staple fiber, either crimped or uncrimped.

The sulfopolyester may be later removed by dissolving the interfacial layers or pie segments and leaving the smaller filaments or microdenier fibers of the water non-dispersible polymer(s). Our invention thus provides a process for microdenier fibers comprising:
(A) spinning a water dispersible sulfopolyester having a glass transition temperature (Tg) of at least 57° C. and one or more water non-dispersible polymers immiscible with the sulfopolyester into multicomponent fibers, the sulfopolyester comprising:
(i) about 50 to about 96 mole % of one or more residues of isophthalic acid or terephthalic acid, based on the total acid residues;
(ii) about 4 to about 30 mole %, based on the total acid residues, of a residue of sodiosulfoisophthalic acid;
(iii) one or more diol residues wherein at least 25 mole %, based on the total diol residues, is a poly(ethylene glycol) having a structure

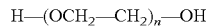

H—(OCH$_2$—CH$_2$)$_n$—OH wherein n is an integer in the range of 2 to about 500; and
(iv) 0 to about 20 mole %, based on the total repeating units, of residues of a branching monomer having 3 or more functional groups wherein the functional groups are hydroxyl, carboxyl, or a combination thereof;
wherein the fibers have a plurality of segments comprising the water non-dispersible polymers wherein the segments are substantially isolated from each other by the sulfopolyester intervening between the segments; and
(B) contacting the multicomponent fibers with water to remove the sulfopolyester thereby forming microdenier fibers.

In another embodiment, the multicomponent fibers contain less than 10 weight % of a pigment or filler, based on the total weight of the fibers.

Typically, the multicomponent fiber is contacted with water at a temperature in a range of about 25° C. to about 100° C. or in a range of about 50° C. to about 80° C. for a time period of from about 10 to about 600 seconds whereby the sulfopolyester is dissipated or dissolved. After removal of the sulfopolyester, the remaining water non-dispersible polymer microfibers typically will have an average fineness of 1 d/f or less, typically, 0.5 d/f or less, or more typically, 0.1 d/f or less.

Typical applications of these remaining water non-dispersible polymer microfibers include nonwoven fabrics, such as, for example, artificial leathers, suedes, wipes, and filter media. Filter media produce from these microfibers can be utilized to filter air or liquids. Filter media for liquids include, but are not limited to, water, bodily fluids, solvents, and hydrocarbons. The ionic nature of sulfopolyesters also results in advantageously poor "solubility" in saline media, such as body fluids. Such properties are desirable in personal care products and cleaning wipes that are flushable or otherwise disposed in sanitary sewage systems. Selected sulfopolyesters have also been utilized as dispersing agents in dye baths and soil redeposition preventative agents during laundry cycles.

In another embodiment of the present invention, a process for making microdenier fibers is provided comprising spinning at least one water dispersible sulfopolyester and one or more water non-dispersible polymers immiscible with the water dispersible sulfopolyester into multicomponent fibers, wherein the multicomponent fibers have a plurality of domains comprising the water non-dispersible polymers wherein the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprising less than about 25 mole % of residues of at least one sulfomonomer, based on the total moles of diacid or diol residues; and contacting the multicomponent fibers with water to remove the water dispersible sulfopolyester thereby forming microdenier fibers. In one embodiment, the multicomponent fiber has an as-spun denier of less than about 6 denier per filament.

In another embodiment of the invention, a process for making microdenier fibers is provided comprising:

(A) extruding at least one water dispersible sulfopolyester and one or more water non-dispersible polymers immiscible with the water dispersible sulfopolyester to produce multicomponent extrudates, wherein the multicomponent extrudates have a plurality of domains comprising the water non-dispersible polymers wherein the domains are substantially isolated from each other by the sulfopolyester intervening between the domains;

(B) melt drawing the multicomponent extrudates at a speed of at least about 2000 m/min to form multicomponent fibers; and (C) contacting the multicomponent fibers with water to remove the water dispersible sulfopolyester thereby forming microdenier fibers.

The multicomponent extrudates can be drawn at a speed of at least about 2000 m/min, at least about 3000 m/min, or at least 4500 m/min.

Such sulfomonomers and sulfopolyesters suitable for use in accordance with the invention are described above.

In one embodiment, that the water used to remove the sulfopolyester from the multicomponent fibers is above room temperature. In other embodiments, the water used to remove the sulfopolyester is at least about 45° C., at least about 60° C., or at least about 80° C.

In another embodiment of this invention, another process is provided to produce cut water non-dispersible polymer microfibers. The process comprises:

(A) cutting a multicomponent fiber into cut multicomponent fibers;

(B) contacting a fiber-containing feedstock with water to produce a fiber mix slurry; wherein the fiber-containing feedstock comprises cut multicomponent fibers;

(C) heating the fiber mix slurry to produce a heated fiber mix slurry;

(D) optionally, mixing the fiber mix slurry in a shearing zone;

(E) removing at least a portion of the sulfopolyester from the cut multicomponent fiber to produce a slurry mixture comprising a sulfopolyester dispersion and the water non-dispersible polymer microfibers; and (F) separating the water non-dispersible polymer microfibers from the slurry mixture.

The multicomponent fiber can be cut into any length that can be utilized to produce nonwoven articles. In one embodiment of the invention, the multicomponent fiber is cut into lengths ranging from about 1 mm to about 50 mm. In other embodiments, the multicomponent fiber can be cut into lengths ranging from about 1 mm to about 25 mm, from about 1 mm to about 20 mm, from about 1 mm to about 15 mm, from about 1 mm to about 10 mm, from about 1 mm to about 6 mm, from about 1 mm to about 5 mm, from about 1 mm to about 5 mm. In another embodiment, the cut multicomponent fiber is cut into lengths of less than about 25 mm, less than about 20 mm, less than about 15 mm, less than about 10 mm, or less than about 5 mm. In another aspect of the invention, the multicomponent fiber can be cut into a mixture of different lengths.

As used in this disclosure, the term "staple fiber" is used to define fiber cut into lengths of greater than 25 mm to about 50 mm. The term "short-cut fiber" is used to define fiber cut to lengths of about 25 mm or less.

The fiber-containing feedstock can comprise any other type of fiber that is useful in the production of nonwoven articles. In one embodiment, the fiber-containing feedstock further comprises at least one fiber selected from the group consisting of cellulosic fiber pulp, glass fiber, polyester fibers, nylon fibers, polyolefin fibers, rayon fibers and cellulose ester fibers.

The fiber-containing feedstock is mixed with water to produce a fiber mix slurry. Preferably, to facilitate the removal of the water-dispersible sulfopolyester, the water utilized can be soft water or deionized water. Soft water has been previously defined in this disclosure. In one embodiment of this invention, at least one water softening agent may be used to facilitate the removal of the water-dispersible sulfopolyester from the multicomponent fiber. Any water softening agent known in the art can be utilized. In one embodiment, the water softening agent is a chelating agent or calcium ion sequestrant. Applicable chelating agents or calcium ion sequestrants are compounds containing a plurality of carboxylic acid groups per molecule where the carboxylic groups in the molecular structure of the chelating agent are separated by 2 to 6 atoms. Tetrasodium ethylene diamine tetraacetic acid (EDTA) is an example of the most common chelating agent, containing four carboxylic acid moieties per molecular structure with a separation of 3 atoms between adjacent carboxylic acid groups. Poly acrylic acid, sodium salt is an example of a calcium sequestrant containing carboxylic acid groups separated by two atoms between carboxylic groups. Sodium salts of maleic acid or succinic acid are examples of the most basic chelating agent compounds. Further examples of applicable chelating agents include compounds which have in common the presence of multiple carboxylic acid groups in the molecular structure where the carboxylic acid groups are separated by the required distance (2 to 6 atom units) which yield a favorable steric interaction with di- or multi-valent cations such as calcium which cause the chelating agent to preferentially bind to di- or multi valent cations. Such compounds include, but are not limited to, diethylenetriaminepentaacetic acid; diethylenetriamine-N,N,N',N',N"-pentaacetic acid; pentetic acid; N,N-bis(2-(bis-(carboxymethyl)amino)ethyl)-glycine; diethylenetriamine pentaacetic acid; [[(carboxymethyl)imino]bis(ethylenenitrilo)]-tetra-acetic acid; edetic acid; ethylenedinitrilotetraacetic acid; EDTA, free base; EDTA free acid; ethylenediamine-N,N,N',N'-tetraacetic acid; hampene; versene; N,N'-1,2-ethane diylbis-(N-(carboxymethyl)glycine); ethylenediamine tetra-acetic acid; N,N-bis(carboxymethyl)glycine; triglycollamic acid; trilone A; alpha,alpha',alpha"-trimethylaminetricarboxylic acid; tri (carboxymethyl)amine; aminotriacetic acid; hampshire NTA acid; nitrilo-2,2',2"-triacetic acid; titriplex i; nitrilotriacetic acid; and mixtures thereof.

The amount of water softening agent needed depends on the hardness of the water utilized in terms of $Ca^{++}$ and other multivalent ions.

The fiber mix slurry is heated to produce a heated fiber mix slurry. The temperature is that which is sufficient to remove a portion of the sulfopolyester from the multicomponent fiber. In one embodiment of the invention, the fiber mix slurry is heated to a temperature ranging from about 50° C. to about 100° C. Other temperature ranges are from about 70° C. to about 100° C., about 80° C. to about 100° C., and about 90° C. to about 100° C.

Optionally, the fiber mix slurry is mixed in a shearing zone. The amount of mixing is that which is sufficient to disperse and remove a portion of the water dispersible sulfopolyester from the multicomponent fiber and separate the water non-dispersible polymer microfibers. In one embodiment of the invention, 90% of the sulfopolyester is removed. In another embodiment, 95% of the sulfopolyester is removed, and in yet another embodiment, 98% or greater of the sulfopolyester is removed. The shearing zone can comprise any type of equipment that can provide shearing action necessary to disperse and remove a portion of the water dispersible sulfopolyester from the multicomponent fiber and separate the water non-dispersible polymer microfibers. Examples of such equipment include, but is not limited to, pulpers and refiners.

The water dispersible sulfopolyester in the multicomponent fiber after contact with water and heating will disperse and separate from the water non-dispersible polymer fiber to produce a slurry mixture comprising a sulfopolyester dispersion and the water non-dispersible polymer microfibers. The water non-dispersible polymer microfibers can then be separated from the sulfopolyester dispersion by any means known in the art. For examples, the slurry mixture can be routed through separating equipment, such as for example, screens and filters. Optionally, the water non-dispersible polymer microfibers may be washed once or numerous times to remove more of the water-dispersible sulfopolyester.

The removal of the water-dispersible sulfopolyester can be determined by physical observation of the slurry mixture. The water utilized to rinse the water non-dispersible polymer microfibers is clear if the water-dispersible sulfopolyester has been mostly removed. If the water-dispersible sulfopolyester is still being removed, the water utilized to rinse the water non-dispersible polymer microfibers can be milky. Further, if water-dispersible sulfopolyester remains on the water non-dispersible polymer microfibers, the microfibers can be somewhat sticky to the touch.

The water-dispersible sulfopolyester can be recovered from the sulfopolyester dispersion by any method known in the art.

In another embodiment of this invention, a water non-dispersible polymer microfiber is provided comprising at least one water non-dispersible polymer wherein the water non-dispersible polymer microfiber has an equivalent diameter of less than 5 microns and length of less than 25 millimeters. This water non-dispersible polymer microfiber is produced by the processes previously described to produce microfibers. In another aspect of the invention, the water non-dispersible polymer microfiber has an equivalent diameter of less than 3 microns and length of less than 25 millimeters. In other embodiments of the invention, the water non-dispersible polymer microfiber has an equivalent diameter of less than 5 microns or less than 3 microns. In other embodiments of the invention, the water non-dispersible polymer microfiber can have lengths of less than 12 millimeters; less than 10 millimeters, less than 6.5 millimeters, and less than 3.5 millimeters. The domains or segments in the multicomponent fiber once separated yield the water non-dispersible polymer microfibers.

The instant invention also includes a fibrous article comprising the water-dispersible fiber, the multicomponent fiber, microdenier fibers, or water non-dispersible polymer microfibers described hereinabove. The term "fibrous article" is understood to mean any article having or resembling fibers. Non-limiting examples of fibrous articles include multifilament fibers, yarns, cords, tapes, fabrics, wet-laid webs, dry-laid webs, melt blown webs, spunbonded webs, thermo-bonded webs, hydroentangled webs, nonwoven webs and fabrics, and combinations thereof; items having one or more layers of fibers, such as, for example, multilayer nonwovens, laminates, and composites from such fibers, gauzes, bandages, diapers, training pants, tampons, surgical gowns and masks, feminine napkins; and the like. In addition, the water non-dispersible microfibers can be utilized in filter media for air filtration, liquid filtration, filtration for food preparation, filtration for medical applications, and for paper making processes and paper products. Further, the fibrous articles may include replacement inserts for various personal hygiene and cleaning products. The fibrous article of the present invention may be bonded, laminated, attached to, or used in conjunction with other materials which may or may not be water-dispersible. The fibrous article, for example, a nonwoven fabric layer, may be bonded to a flexible plastic film or backing of a water non-dispersible material, such as polyethylene. Such an assembly, for example, could be used as one component of a disposable diaper. In addition, the fibrous article may result from overblowing fibers onto another substrate to form highly assorted combinations of engineered melt blown, spunbond, film, or membrane structures.

The fibrous articles of the instant invention include nonwoven fabrics and webs. A nonwoven fabric is defined as a fabric made directly from fibrous webs without weaving or knitting operations. The Textile Institute defines nonwovens as textile structures made directly from fiber rather than yarn. These fabrics are normally made from continuous filaments or from fibre webs or bans strengthened by bonding using various techniques, which include, but are not limited to, adhesive bonding, mechanical interlocking by needling or fluid jet entanglement, thermal bonding, and stitch bonding. For example, the multicomponent fiber of the present invention may be formed into a fabric by any known fabric forming process. The resulting fabric or web may be converted into a microdenier fiber web by exerting sufficient force to cause the multicomponent fibers to split or by contacting the web with water to remove the sulfopolyester leaving the remaining microdenier fibers behind.

In another embodiment of the invention, a process is provided for producing a microdenier fiber web, comprising:
(A) spinning a water dispersible sulfopolyester having a glass transition temperature (Tg) of at least 57° C. and one or more water non-dispersible polymers immiscible with the sulfopolyester into multicomponent fibers, the sulfopolyester comprising:
(i) about 50 to about 96 mole % of one or more residues of isophthalic acid or terephthalic acid, based on the total acid residues;
(ii) about 4 to about 30 mole %, based on the total acid residues, of a residue of sodiosulfoisophthalic acid;
(iii) one or more diol residues wherein at least 25 mole %, based on the total diol residues, is a poly(ethylene glycol) having a structure

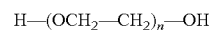

wherein n is an integer in the range of 2 to about 500; and
(iv) 0 to about 20 mole %, based on the total repeating units, of residues of a branching monomer having 3 or more functional groups wherein the functional groups are hydroxyl, carboxyl, or a combination thereof.
wherein the multicomponent fibers have a plurality of segments comprising the water non-dispersible polymers wherein the segments are substantially isolated from each other by the sulfopolyester intervening between the segments;
(B) overlapping and collecting the multicomponent fibers of Step A to form a nonwoven web; and
(C) contacting the nonwoven web with water to remove the sulfopolyester thereby forming a microdenier fiber web.

In another embodiment of the invention, the multicomponent fiber utilized contains less than 10 weight % of a pigment or filler, based on the total weight of the fiber.

In another embodiment of the invention, a process for a microdenier fiber web is provided which comprises:
(A) spinning at least one water dispersible sulfopolyester and one or more water non-dispersible polymers immiscible with the sulfopolyester into multicomponent fibers, the multicomponent fibers have a plurality of domains comprising the water non-dispersible polymers wherein the domains are substantially isolated from each other by the sulfopolyester intervening between the domains; wherein the water dispersible sulfopolyester exhibits a melt viscosity of less than about 12,000 poise measured at 240° C. at a strain rate of 1 rad/sec, and wherein the sulfopolyester comprising less than about 25 mole % of residues of at least one sulfomonomer, based on the total moles of diacid or diol residues;

(B) collecting the multicomponent fibers of Step A) to form a non-woven web; and (C) contacting the non-woven web with water to remove the sulfopolyester thereby forming a microdenier fiber web. In another embodiment, the multicomponent fiber utilized has an as-spun denier of less than about 6 denier per filament.

In another embodiment of the invention, a process for a microdenier fiber web is provided which comprises:

(A) extruding at least one water dispersible sulfopolyester and one or more water non-dispersible polymers immiscible with the water dispersible sulfopolyester into multicomponent extrudates, the multicomponent extrudates have a plurality of domains comprising the water non-dispersible polymers wherein the domains are substantially isolated from each other by the water dispersible sulfopolyester intervening between the domains;

(B) melt drawing the multicomponent extrudates at a speed of at least about 2000 m/min to produce multicomponent fibers;

(C) collecting the multicomponent fibers of Step (B) to form a non-woven web; and (D) contacting the non-woven web with water to remove the sulfopolyester thereby forming a microdenier fiber web.

Prior to Step (C), the process can further comprise the step of hydroentangling the multicomponent fibers of the nonwoven web. In one embodiment of the invention, the hydroentangling step results in a loss of less than about 20 weight % of the sulfopolyester contained in the multicomponent fibers, or less than 15 weight %, or less than 10 weight %. In furtherance of the goal of reducing the loss of sulfopolyester during hydroentanglement, the water used during this process can have a temperature of less than about 45° C., less than about 35° C., or less than about 30° C. In one embodiment of the invention, to minimize loss of sulfopolyester from the multicomponent fibers, the water used during hydroentanglement is as close to room temperature as possible. Conversely, removal of the sulfopolyester polymer during Step (D) can be carried out using water having a temperature of at least about 45° C., at least about 60° C., or at least about 80° C.

After hydroentanglement and prior to Step (D), the nonwoven web may under go a heat setting step comprising heating the non-woven web to a temperature of at least about 100° C. or at least about 120° C. The heat setting step relaxes out internal fiber stresses and aids in producing a dimensionally stable fabric product. In other embodiments of the invention, when the heat set material is reheated to the temperature to which it was heated during the heat setting step that it exhibits surface area shrinkage of less than about 5% of its original surface area, less than about 2% of the original surface area, or less than about 1% of its original surface area.

The sulfopolyester used in the multicomponent fiber can be any of those described herein. In one embodiment, the sulfopolyester has a melt viscosity of less than about 6000 poise measured at 240° C. at a strain rate of 1 rad/sec and comprises less than about 12 mole %, based on the total repeating units, of residues of at least one sulfomonomer. These types of sulfopolyesters are previously described herein.

Furthermore, the inventive method can comprise the step of drawing the multicomponent fiber at a fiber velocity of at least 2000 m/min, at least about 3000 m/min, at least about 4000 m/min, or at least about 5000 m/min.

In another embodiment of this invention, nonwoven articles comprising water non-dispersible polymer microfibers can be produced. The nonwoven article comprises water non-dispersible polymer microfibers and is produced by a process selected from the group consisting of a dry-laid process and a wet-laid process. Multicomponent fibers and processes for producing water non-dispersible polymer microfibers were previously disclosed in the specification.

In one embodiment of the invention, at least 1% of the water non-dispersible polymer microfiber is contained in the nonwoven article. Other amounts of water non-dispersible polymer microfiber contained in the nonwoven article are at least 10%, at least 25%, and at least 50%.

In another aspect of the invention, the nonwoven article can further comprise at least one other fiber. The other fiber can be any that is known in the art depending on the type of nonwoven article to be produced. In one embodiment of the invention, the other fiber can be selected from the group consisting cellulosic fiber pulp, glass fiber, polyester fibers, nylon fibers, polyolefin fibers, rayon fibers cellulose ester fibers, and mixtures thereof.

The nonwoven article can also further comprise at least one additive. Additives include, but are not limited to, starches, fillers, and binders. Other additives are discussed in other sections of this disclosure.

Generally, manufacturing processes to produce these nonwoven articles from water non-dispersible microfibers produced from multicomponent fibers can be split into the following groups: dry-laid webs, wet-laid webs, and combinations of these processes with each other or other nonwoven processes.

Generally, dry-laid nonwoven articles are made with staple fiber processing machinery which is designed to manipulate fibers in the dry state. These include mechanical processes, such as, carding, aerodynamic, and other air-laid routes. Also included in this category are nonwoven articles made from filaments in the form of tow, and fabrics composed of staple fibers and stitching filaments or yards i.e. stitchbonded nonwovens. Carding is the process of disentangling, cleaning, and intermixing fibers to make a web for further processing into a nonwoven article. The process predominantly aligns the fibers which are held together as a web by mechanical entanglement and fiber-fiber friction. Cards are generally configured with one or more main cylinders, roller or stationary tops, one or more doffers, or various combinations of these principal components. One example of a card is a roller card. The carding action is the combing or working of the cut multicomponent fibers or the water non-dispersible polymer microfibers between the points of the card on a series of interworking card rollers. Other types of cards include woolen, cotton, and random cards. Garretts can also be used to align these fibers.

The cut multicomponent fibers or water non-dispersible polymer microfibers in the dried-laid process can also be aligned by air-laying. These fibers are directed by air current onto a collector which can be a flat conveyor or a drum.

Extrusion-formed webs can also be produced from the multicomponents fibers of this invention. Examples include spunbonded and melt-blown. Extrusion technology is used to produce spunbond, meltblown, and porous-film nonwoven articles. These nonwoven articles are made with machinery associated with polymer extrusion methods such as melt spinning, film casting, and extrusion coating. The nonwoven article is then contacted with water to remove the water dispersible sulfopolyester thus producing a nonwoven article comprising water non-dispersible polymer microfibers.

In the spunbond process, the water dispersible sulfopolyester and water non-dispersible polymer are transformed directly to fabric by extruding multicomponent filaments, orienting them as bundles or groupings, layering them on a conveying screen, and interlocking them. The interlocking can be conducted by thermal fusion, mechanical entanglement, hydroentangling, chemical binders, or combinations of these processes.

Meltblown fabrics are also made directly from the water dispersible sulfopolyester and the water non-dispersible polymer. The polymers are melted and extruded. When the melt passes through the extrusion orifice, it is blown with air at high temperature. The air stream attenuates and solidifies the molten polymers. The multicomponent fibers can then be separated from the air stream as a web and compressed between heated rolls.

Combined spunbond and meltbond processes can also be utilized to produce nonwoven articles.

Wet laid processes involve the use of papermaking technology to produce nonwoven articles. These nonwoven articles are made with machinery associated with pulp fiberizing, such as hammer mills, and paperforming. For example, slurry pumping onto continuous screens which are designed to manipulate short fibers in a fluid.

In one embodiment of the wet laid process, water non-dispersible polymer microfibers are suspended in water, brought to a forming unit where the water is drained off through a forming screen, and the fibers are deposited on the screen wire.

In another embodiment of the wet laid process, water non-dispersible polymer microfibers are dewatered on a sieve or a wire mesh which revolves at the beginning of hydraulic formers over dewatering modules (suction boxes, foils and curatures) at high speeds of up to 1500 meters per minute. The sheet is then set on this wire mesh or sieve and dewatering proceeds to a solid content of approximately 20-30 weight %. The sheet can then be pressed and dried.

In another embodiment of the wet-laid process, a process is provided comprising:
  (A) optionally, rinsing the water non-dispersible polymer microfibers with water;
  (B) adding water to the water non-dispersible polymer microfibers to produce a water non-dispersible polymer microfiber slurry;
  (C) optionally, adding other fibers and/or additives to the water non-dispersible polymer microfibers or slurry; and
  (D) transferring the water non-dispersible polymer microfibers containing slurry to a wet-laid nonwoven zone to produce the nonwoven article.

In Step a), the number of rinses depends on the particular use chosen for the water non-dispersible polymer microfibers. In Step b), sufficient water is added to the microfibers to allow them to be routed to the wet-laid nonwoven zone.

The wet-laid nonwoven zone comprises any equipment known in the art to produce wet-laid nonwoven articles. In one embodiment of the invention, the wet-laid nonwoven zone comprises at least one screen, mesh, or sieve in order to remove the water from the water non-dispersible polymer microfiber slurry.

In another embodiment of the wet laid process, a process is provided comprising:
  (A) contacting a cut multicomponent fiber with water to remove a portion of the water dispersible sulfopolyester to produce a water non-dispersible polymer microfiber slurry; wherein the water non-dispersible polymer microfiber slurry comprises water non-dispersible polymer microfibers and water dispersible sulfopolyester;
  (B) optionally, rinsing the water non-dispersible polymer microfibers with water;
  (C) optionally, adding other fibers and/or additives to the water non-dispersible polymer slurry; and
  (D) transferring the water non-dispersible polymer microfibers containing slurry to a wet-laid nonwoven zone to produce the nonwoven article.

In another embodiment of the invention, the water non-dispersible polymer microfiber slurry is mixed prior to transferring to the wet-laid nonwoven zone.

Web-bonding processes can also be utilized to produce nonwoven articles. These can be split into chemical and physical processes. Chemical bonding refers to the use of water-based and solvent-based polymers to bind together the fibers and/or fibrous webs. These binders can be applied by saturation, impregnation, spraying, printing, or application as a foam. Physical bonding processes include thermal processes such as calendaring and hot air bonding, and mechanical processes such as needling and hydroentangling. Needling or needle-punching processes mechanically interlock the fibers by physically moving some of the fibers from a near-horizontal to a near-vertical position. Needle-punching can be conducted by a needleloom. A needleloom generally contains a web-feeding mechanism, a needle beam which comprises a needleboard which holds the needles, a stripper plate, a bed plate, and a fabric take-up mechanism.

Stitchbonding is a mechanical bonding method that uses knitting elements, with or without yarn, to interlock the fiber webs. Examples of stitchbonding machines include, but are not limited to, Maliwatt, Arachne, Malivlies, and Arabeva.

The nonwoven article can be held together by 1) mechanical fiber cohesion and interlocking in a web or mat; 2) various techniques of fusing of fibers, including the use of binder fibers, utilizing the thermoplastic properties of certain polymers and polymer blends; 3) use of a binding resin such as starch, casein, a cellulose derivative, or a synthetic resin, such as an acrylic latex or urethane; 4) powder adhesive binders; or 5) combinations thereof. The fibers are often deposited in a random manner, although orientation in one direction is possible, followed by bonding using one of the methods described above.

The fibrous articles of our invention also may comprise one or more layers of water-dispersible fibers, multicomponent fibers, or microdenier fibers. The fiber layers may be one or more nonwoven fabric layers, a layer of loosely bound overlapping fibers, or a combination thereof. In addition, the fibrous articles may include personal and health care products such as, but not limited to, child care products, such as infant diapers; child training pants; adult care products, such as adult diapers and adult incontinence pads; feminine care products, such as feminine napkins, panty liners, and tampons; wipes; fiber-containing cleaning products; medical and surgical care products, such as medical wipes, tissues, gauzes, examination bed coverings, surgical masks, gowns, bandages, and wound dressings; fabrics; elastomeric yarns, wipes, tapes, other protective barriers, and packaging material. The fibrous articles may be used to absorb liquids or may be pre-moistened with various liquid compositions and used to deliver these compositions to a surface. Non-limiting examples of liquid compositions include detergents; wetting agents; cleaning agents; skin care products, such as cosmetics, ointments, medications, emollients, and fragrances. The fibrous articles also may include various powders and particulates to improve absorbency or as delivery vehicles. Examples of powders and particulates include, but are not limited to, talc, starches, various water absorbent, water-dispersible, or water swellable polymers, such as super absorbent polymers, sulfopolyesters, and poly(vinylalcohols), silica, pigments, and microcapsules. Additives may also be present, but are not required, as needed for specific applications. Examples of additives include, but are not limited to, oxidative stabilizers, UV absorbers, colorants, pigments, opacifiers (delustrants), optical brighteners, fillers, nucleating agents, plasticizers, viscosity modifiers, surface modifiers, antimicrobials, disinfectants, cold flow inhibitors, branching agents, and catalysts.

In addition to being water-dispersible, the fibrous articles described above may be flushable. The term "flushable" as used herein means capable of being flushed in a conventional toilet, and being introduced into a municipal sewage or residential septic system, without causing an obstruction or blockage in the toilet or sewage system.

The fibrous article may further comprise a water-dispersible film comprising a second water-dispersible polymer. The second water-dispersible polymer may be the same as or different from the previously described water-dispersible polymers used in the fibers and fibrous articles of the present invention. In one embodiment, for example, the second water-dispersible polymer may be an additional sulfopolyester which, in turn, comprises:

(A) about 50 to about 96 mole % of one or more residues of isophthalic acid or terephthalic acid, based on the total acid residues;
(B) about 4 to about 30 mole %, based on the total acid residues, of a residue of sodiosulfoisophthalic acid;
(C) one or more diol residues wherein at least 15 mole %, based on the total diol residues, is a poly(ethylene glycol) having a structure

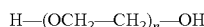

wherein n is an integer in the range of 2 to about 500;
(D) 0 to about 20 mole %, based on the total repeating units, of residues of a branching monomer having 3 or more functional groups wherein the functional groups are hydroxyl, carboxyl, or a combination thereof. The additional sulfopolyester may be blended with one or more supplemental polymers, as described hereinabove, to modify the properties of the resulting fibrous article. The supplemental polymer may or may not be water-dispersible depending on the application. The supplemental polymer may be miscible or immiscible with the additional sulfopolyester.

The additional sulfopolyester may contain other concentrations of isophthalic acid residues, for example, about 60 to about 95 mole %, and about 75 to about 95 mole %. Further examples of isophthalic acid residue concentrations ranges are about 70 to about 85 mole %, about 85 to about 95 mole % and about 90 to about 95 mole %. The additional sulfopolyester also may comprise about 25 to about 95 mole % of the residues of diethylene glycol. Further examples of diethylene glycol residue concentration ranges include about 50 to about 95 mole %, about 70 to about 95 mole %, and about 75 to about 95 mole %. The additional sulfopolyester also may include the residues of ethylene glycol and/or 1,4-cyclohexanedimethanol. Typical concentration ranges of CHDM residues are about 10 to about 75 mole %, about 25 to about 65 mole %, and about 40 to about 60 mole %. Typical concentration ranges of ethylene glycol residues are about 10 to about 75 mole %, about 25 to about 65 mole %, and about 40 to about 60 mole %. In another embodiment, the additional sulfopolyester comprises is about 75 to about 96 mole % of the residues of isophthalic acid and about 25 to about 95 mole % of the residues of diethylene glycol.

According to the invention, the sulfopolyester film component of the fibrous article may be produced as a monolayer or multilayer film. The monolayer film may be produced by conventional casting techniques. The multilayered films may be produced by conventional lamination methods or the like. The film may be of any convenient thickness, but total thickness will normally be between about 2 and about 50 mil.

The film-containing fibrous articles may include one or more layers of water-dispersible fibers as described above. The fiber layers may be one or more nonwoven fabric layers, a layer of loosely bound overlapping fibers, or a combination thereof. In addition, the film-containing fibrous articles may include personal and health care products as described hereinabove.

As described previously, the fibrous articles also may include various powders and particulates to improve absorbency or as delivery vehicles. Thus, in one embodiment, our fibrous article comprises a powder comprising a third water-dispersible polymer that may be the same as or different from the water-dispersible polymer components described previously herein. Other examples of powders and particulates include, but are not limited to, talc, starches, various water absorbent, water-dispersible, or water swellable polymers, such as poly(acrylonitriles), sulfopolyesters, and poly(vinyl alcohols), silica, pigments, and microcapsules.

Our novel fiber and fibrous articles have many possible uses in addition to the applications described above. One novel application involves the melt blowing a film or nonwoven fabric onto flat, curved, or shaped surfaces to provide a protective layer. One such layer might provide surface protection to durable equipment during shipping. At the destination, before putting the equipment into service, the outer layers of sulfopolyester could be washed off. A further embodiment of this general application concept could involve articles of personal protection to provide temporary barrier layers for some reusable or limited use garments or coverings. For the military, activated carbon and chemical absorbers could be sprayed onto the attenuating filament pattern just prior to the collector to allow the melt blown matrix to anchor these entities on the exposed surface. The chemical absorbers can even be changed in the forward operations area as the threat evolves by melt blowing on another layer.

A major advantage inherent to sulfopolyesters is the facile ability to remove or recover the polymer from aqueous dispersions via flocculation or precipitation by adding ionic moieties (i.e., salts). Other methods, such as pH adjustment, adding nonsolvents, freezing, and so forth may also be employed. Therefore, fibrous articles, such as outer wear protective garments, after successful protective barrier use and even if the polymer is rendered as hazardous waste, can potentially be handled safely at much lower volumes for disposal using accepted protocols, such as incineration.

Undissolved or dried sulfopolyesters are known to form strong adhesive bonds to a wide array of substrates, including, but not limited to fluff pulp, cotton, acrylics, rayon, lyocell, PLA (polylactides), cellulose acetate, cellulose acetate propionate, poly(ethylene) terephthalate, poly(butylene) terephthalate, poly(trimethylene) terephthalate, poly(cyclohexylene) terephthalate, copolyesters, polyamides (nylons), stainless steel, aluminum, treated polyolefins, PAN (poly-acrylonitriles), and polycarbonates. Thus, our nonwoven fabrics may be used as laminating adhesives or binders that may be bonded by known techniques, such as thermal, radio frequency (RF), microwave, and ultrasonic methods. Adaptation of sulfopolyesters to enable RF activation is disclosed in a number of recent patents. Thus, our novel nonwoven fabrics may have dual or even multifunctionality in addition to adhesive properties. For example, a disposable baby diaper could be obtained where a nonwoven of the present invention serves as both an water-responsive adhesive as well as a fluid managing component of the final assembly.

Our invention also provides a process for water-dispersible fibers comprising:
(A) heating a water-dispersible polymer composition to a temperature above its flow point, wherein the polymer composition comprises:
  (i) residues of one or more dicarboxylic acids;
  (ii) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof; and
  (iii) one or more diol residues wherein at least 20 mole %, based on the total diol residues, is a poly(ethylene glycol) having a structure

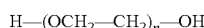

wherein n is an integer in the range of 2 to about 500; (iv) 0 to about 25 mole based on the total repeating units, of residues of a branching monomer having 3 or more functional groups wherein the functional groups are hydroxyl, carboxyl, or a combination thereof; wherein the polymer composition contains less than 10 weight % of a pigment or filler, based on the total weight of the polymer composition; and (II) melt spinning filaments. As described hereinabove, a water-dispersible polymer, optionally, may be blended with the sulfopolyester. In addition, a water non-dispersible polymer, optionally, may be blended with the sulfopolyester to form a blend such that blend is an immiscible blend. The term "flow point", as used herein, means the temperature at which the viscosity of the polymer composition permits extrusion or other forms of processing through a spinneret or extrusion die. The dicarboxylic acid residue may comprise from about 60 to about 100 mole % of the acid residues depending on the type and concentration of the sulfomonomer. Other examples of concentration ranges of dicarboxylic acid residues are from about 60 mole % to about 95 mole % and about 70 mole % to about 95 mole %. The preferred dicarboxylic acid residues are isophthalic, terephthalic, and 1,4-cyclohexanedicarboxylic acids or if diesters are used, dimethyl terephthalate, dimethyl isophthalate, and dimethyl-1,4-cyclohexane-dicarboxylate with the residues of isophthalic and terephthalic acid being especially preferred.

The sulfomonomer may be a dicarboxylic acid or ester thereof containing a sulfonate group, a diol containing a sulfonate group, or a hydroxy acid containing a sulfonate group. Additional examples of concentration ranges for the sulfomonomer residues are about 4 to about 25 mole %, about 4 to about 20 mole %, about 4 to about 15 mole %, and about 4 to about 10 mole % , based on the total repeating units. The cation of the sulfonate salt may be a metal ion such as Li$^+$, Na$^+$, K$^+$, Mg$^{++}$, $^{Ca++}$, Ni$^{++}$, Fe$^{++}$, and the like. Alternatively, the cation of the sulfonate salt may be non-metallic such as a nitrogenous base as described previously. Examples of sulfomonomer residues which may be used in the process of the present invention are the metal sulfonate salt of sulfophthalic acid, sulfoterephthalic acid, sulfoisophthalic acid, or combinations thereof. Another example of sulfomonomer which may be used is 5-sodiosulfoisophthalic acid or esters thereof. If the sulfomonomer residue is from 5-sodiosulfoisophthalic acid, typical sulfomonomer concentration ranges are about 4 to about 35 mole %, about 8 to about 30 mole %, and about 10 to 25 mole %, based on the total acid residues.

The sulfopolyester of our includes one or more diol residues which may include aliphatic, cycloaliphatic, and aralkyl glycols. The cycloaliphatic diols, for example, 1,3- and 1,4-cyclohexanedimethanol, may be present as their pure cis or trans isomers or as a mixture of cis and trans isomers. Non-limiting examples of lower molecular weight polyethylene glycols, e.g., wherein n is from 2 to 6, are diethylene glycol, triethylene glycol, and tetraethylene glycol. Of these lower molecular weight glycols, diethylene and triethylene glycol are most preferred. The sulfopolyester may optionally include a branching monomer. Examples of branching monomers are as described hereinabove. Further examples of branching monomer concentration ranges are from 0 to about 20 mole % and from 0 to about 10 mole %. The sulfopolyester of our novel process has a Tg of at least 25° C. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

The water-dispersible fibers can be prepared by a melt blowing process. The polymer is melted in an extruder and forced through a die. The extrudate exiting the die is rapidly attenuated to ultrafine diameters by hot, high velocity air. The orientation, rate of cooling, glass transition temperature ($T_g$), and rate of crystallization of the fiber are important because they affect the viscosity and processing properties of the polymer during attenuation. The filament is collected on a renewable surface, such as a moving belt, cylindrical drum, rotating mandrel, and so forth. Predrying of pellets (if needed), extruder zone temperature, melt temperature, screw design, throughput rate, air temperature, air flow (velocity), die air gap and set back, nose tip hole size, die temperature, die-to-collector (DCP) distance, quenching environment, collector speed, and post treatments are all factors that influence product characteristics such as filament diameters, basis weight, web thickness, pore size, softness, and shrinkage. The high velocity air also may be used to move the filaments in a somewhat random fashion that results in extensive interlacing. If a moving belt is passed under the die, a nonwoven fabric can be produced by a combination of over-lapping laydown, mechanical cohesiveness, and thermal bonding of the filaments. Overblowing onto another substrate, such as a spunbond or backing layer, is also possible. If the filaments are taken up on an rotating mandrel, a cylindrical product is formed. A water-dispersible fiber lay-down can also be prepared by the spunbond process.

The instant invention, therefore, further provides a process for water-dispersible, nonwoven fabric comprising:
(A) heating a water-dispersible polymer composition to a temperature above its flow point, wherein the polymer composition comprises:
  (i) residues of one or more dicarboxylic acids;
  (ii) about 4 to about 40 mole %, based on the total repeating units, of residues of at least one sulfomonomer having 2 functional groups and one or more metal sulfonate groups attached to an aromatic or cycloaliphatic ring wherein the functional groups are hydroxyl, carboxyl, or a combination thereof;
(iii) one or more diol residues wherein at least 20 mole %, based on the total diol residues, is a poly(ethylene glycol) having a structure

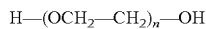

wherein n is an integer in the range of 2 to about 500;
(iv) 0 to about 25 mole %, based on the total repeating units, of residues of a branching monomer having 3 or more functional groups wherein the functional groups are hydroxyl, carboxyl, or a combination thereof; wherein the sulfopolyester has a glass transition temperature (Tg) of at least 25° C.; wherein the polymer composition contains less than 10 weight % of a pigment or filler, based on the total weight of the polymer composition;
(B) melt-spinning filaments; and
(C) overlapping and collecting the filaments of Step (B) to form a nonwoven fabric. As described hereinabove, a water-dispersible polymer, optionally, may be blended with the sulfopolyester. In addition, a water non-dispersible polymer, optionally, may be blended with the sulfopolyester to form a blend such that blend is an immiscible blend. The dicarboxylic acid, sulfomonomer, and branching monomer residues are as described previously. The sulfopolyester has a Tg of at least 25° C. Further examples of glass transition temperatures exhibited by the sulfopolyester are at least 30° C., at least 35° C., at least 40° C., at least 50° C., at least 60° C., at least 65° C., at least 80° C., and at least 90° C. Although other Tg's are possible, typical glass transition temperatures of the dry sulfopolyesters our invention are about 30° C., about 48° C., about 55° C., about 65° C., about 70° C., about 75° C., about 85° C., and about 90° C.

In certain embodiments of the present invention, the water-wet microfibrous product (wet lap) produced after the multicomponent fibers have been cut, washed, and drained of excess water can be directly used (i.e., without further drying) in a wet-laid nonwoven process. Direct use of the wet lap product in a wet-laid nonwoven process avoids the need for complete drying of the wet lap, thereby saving significant energy and equipment costs. When the wet lap production facility is located remotely from the facility for making wet-laid nonwovens, the wet lap can be packaged and transported from the wet lap production location to the nonwoven production location. Such a wet lap composition is described in further detail immediately below.

One embodiment of the present invention is directed to a wet lap composition comprising water and a plurality of synthetic fibers. Water can make up at least 50, 55, or 60 weight % and/or not more than 90, 85, or 80 weight % of the wet lap composition. The synthetic fibers can make up at least 10, 15, or 20 weight % and/or not more than 50, 45, or 40 weight % of the wet lap composition. The water and the synthetic fibers in combination make up at least 95, 98, or 99 weight % of the wet lap composition. The synthetic fibers can have a length of at least 0.25, 0.5, or 1 millimeter and/or not more than 25, 10, or 2 millimeters. The synthetic fibers can have a minimum transverse dimension at least 0.1, 0.5, or 0.75 microns and/or not more than 10, 5, or 2 microns.

Figure 1B:
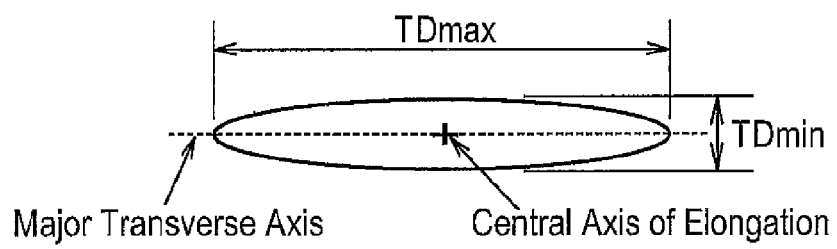
Figure 1C:
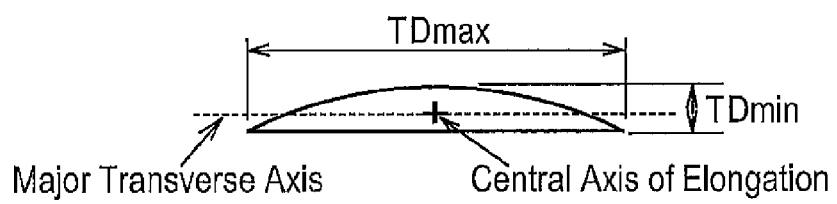

As used herein, "minimum transverse dimension" denotes the minimum dimension of a fiber measured perpendicular to the axis of elongation of the fiber by an external caliper method. As used herein, "maximum transverse dimension" is the maximum dimension of a fiber measured perpendicular to the axis of elongation of the fiber by the external caliper. FIGS. 1a, 1b, and 1c depict how these dimensions may be measured in various fiber cross-sections. In FIGS. 1a, 1a, and 1c, "TDmin" is the minimum transverse dimension and "TDmax" is the maximum transverse dimension. As used herein, "external caliper method" denotes a method of measuring an outer dimension of a fiber where the measured dimension is the distance separating two coplanar parallel lines between which the fiber is located and where each of the parallel lines touches the external surface of the fiber on generally opposite sides of the fiber. All fiber dimensions provided herein (e.g., length, minimum transverse dimension, and maximum transverse dimension) are the average dimensions of the fibers belonging to the specified group.

The wet lap composition can further comprise a fiber finishing composition in an amount of at least 10, 50, or 100 ppmw and/or not more than 1,000, 500, 250 ppmw. In one embodiment, the fiber finishing composition can comprise an oil, a wax, and/or a fatty acid. In another embodiment, the fiber finishing composition can comprise a naturally-derived fatty acid and/or a naturally-derived oil. In yet another embodiment, the wherein the fiber finishing composition comprises mineral oil, stearate esters, sorbitan esters, and/or neatsfoot oil. In still another embodiment, the fiber finishing composition comprises mineral oil.

The wet lap composition can further comprise a water dispersible polymer in an amount of at least 0.001, 0.01, or 0.1 and/or not more than 5, 2, or 1 weight %. In one embodiment the water dispersible polymer comprises at least one sulfopolyester. Sulfopolyesters were previously described in this disclosure.

The sulfopolyester can comprise:
(A) about 50 to about 96 percent, based on the total acid residues, of residues of one or more dicarboxylic acids, wherein the one or more dicarboxylic acids comprise terephthalic acid and isophthalic acid,
(B) about 4 to about 40 mole %, based on the total acid residues, of residues of at least one sulfomonomer having two functional groups and one or more sulfonate groups attached to an aromatic or cycloaliphatic ring wherein the functional groups are hydroxyl, carboxyl, or a combination thereof, and
(C) one or more diol residues, The sulfopolyester can have a glass transition temperature (Tg) of at least 40° C. or at least 50° C., an inherent viscosity of at least 0.2 dL/g measured in a 60/40 parts by weight solution of phenol/tetrachloroethane solvent at 40° C. and at a concentration of 0.5 grams of sulfopolyester in 100 mL of solvent, and a melt viscosity of less than about 12,000, 8,000, or 6,000 poise measured at 240° C. at a strain rate of 1 rad/sec.

The water non-dispersible synthetic polymer of the wet lap composition can be selected from the group consisting of polyolefins, polyesters, copolyesters, polyamides, polylactides, polycaprolactones, polycarbonates, polyurethanes, cellulose esters, acrylics, polyvinyl chlorides, and blends thereof. In one embodiment, the water non-dispersible synthetic polymer is selected from the group consisting of polyethylene terephthalate homopolymer, polyethylene terephthalate copolymers, polybutylene terephthalate, polypropylene terephthalate, nylon 6, nylon 66, and blends thereof.

The wet-lap composition can be made by a process comprising the following steps:
(A) producing multicomponent fibers comprising at least one water dispersible sulfopolyester and one or more water non-dispersible synthetic polymers immiscible with the water dispersible sulfopolyester, wherein the multicomponent fibers have an as-spun denier of less than 15 dpf;

(B) cutting the multicomponent fibers into cut multicomponent fibers having a length of less than 25 millimeters;

(C) contacting the cut multicomponent fibers with wash water to remove the water dispersible sulfopolyester thereby forming a slurry of synthetic fibers in a sulfopolyester dispersion, wherein the sulfopolyester dispersion comprises water and at least a portion of the sulfopolyester; and (D) removing at least a portion of the sulfopolyester dispersion from the slurry to thereby producing a wet lap composition.

As discussed above, the wet lap composition can be used directly in a wet-laid process to make a nonwoven articles. In order to use the wet lap in a wet-laid process, the wet lap composition is transferred from its place of production to a wet-laid nonwoven zone. The wet lap composition can be combined with additional fibers in the wet-laid nonwoven zone and/or immediately upstream of the wet-laid nonwoven zone. The additional fibers can be selected from a group consisting of cellulosic fiber pulp, inorganic fibers, polyester fibers, nylon fibers, lyocell fibers, polyolefin fibers, rayon fibers, cellulose ester fibers, and combinations thereof.

As part of the wet-laid process, the wet lap composition can be combined with dilution water in the wet-laid nonwoven zone and/or immediately upstream of the wet-laid nonwoven zone. The dilution water and wet lap can be combined in amounts such that at least 50, 75, 90, or 95 parts by weight of the dilution water is used per one part of the wetlap.

In other embodiments of the invention, as shown in FIGS. 2, 3a, 3b, and 4, processes for producing a microfiber product stream are provided. Multicomponent fibers were previously discussed in this disclosure. Further disclosures concerning multicomponent fibers are provided in the following patents and patents applications: U.S. Pat. Nos. 6,989,193; 7,635,745; 7,902,094; 7,892,993; 7,687,143; and U.S. patent application Ser. Nos. 12/199,304; 12/909,574; 13/273,692; 13/273,648; 13/273,710; 13/273,720; 13/273,929; 13/273,937; 13/273,727, 13/273,737; 13/273,745; 13/273,749; 12/966,502; 12/966,507; 12/975,450; 12/975,452; 12/975,456; 13/053,615; 13/352,362; 13/433,812; 13/433,854; 61/471,259; 61/472,964; and 61/558,744, which are all hereby incorporated by reference to the extent they do not contradict the statements herein.

The terms "wet lap" and "microfiber product stream" will be used interchangeably in this disclosure.

Figure 2:
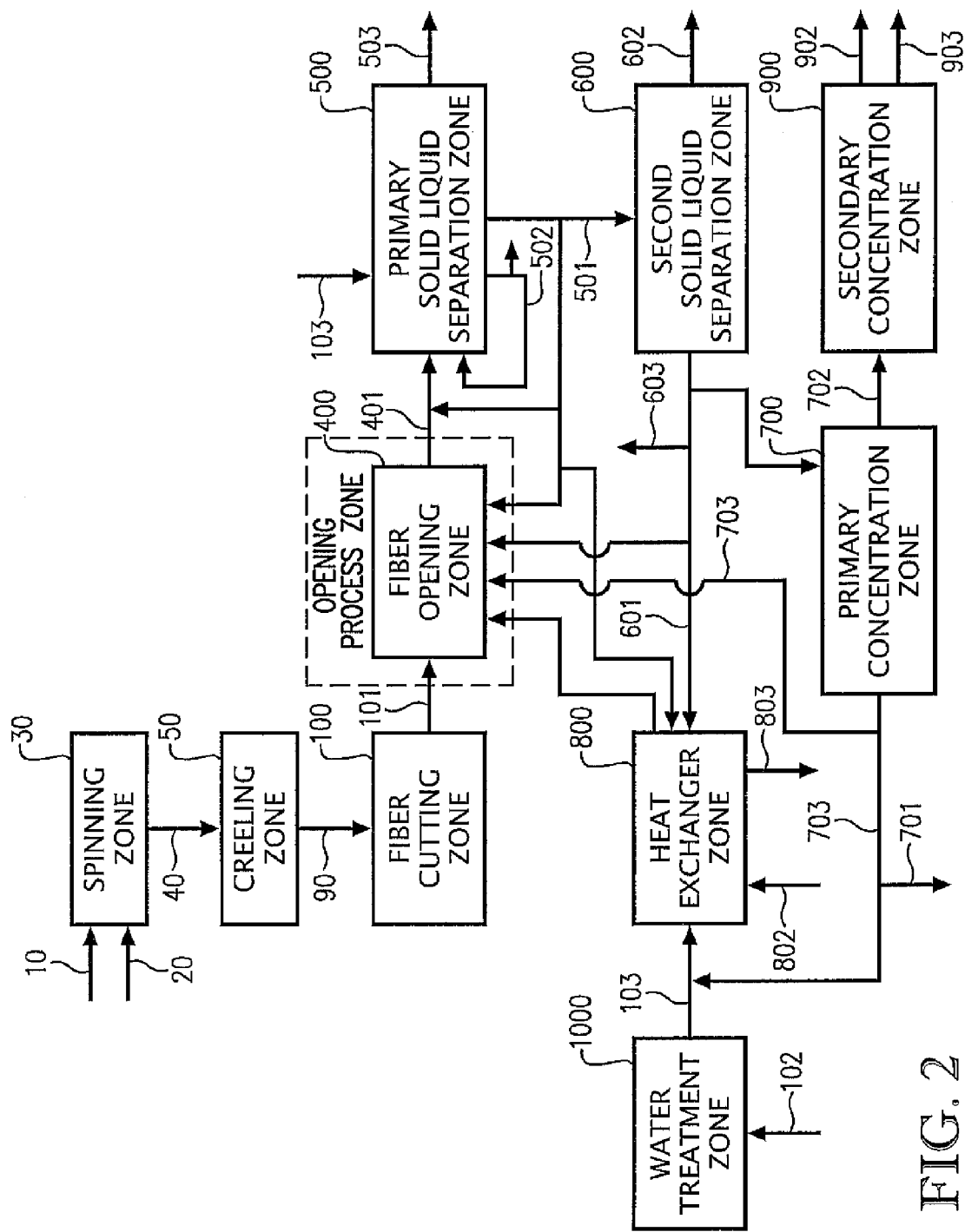
FIG. 2 illustrates an embodiment of the invention wherein the microfiber product stream is produced in a one step opening zone.

In one embodiment of the invention as shown in FIG. 2, a process for producing a microfiber product stream is provided. The process comprises:

(A) contacting short cut multicomponent fibers 101 having a length of less than 25 millimeters with a heated aqueous stream 801 in a fiber opening zone 400 to remove a portion of the water dispersible sulfopolyester to produce an opened microfiber slurry 401; wherein the short cut multicomponent fibers comprise at least one water dispersible sulfopolyester and at least one water non-dispersible synthetic polymer immiscible with the water dispersible sulfopolyester; wherein the heated aqueous stream 801 is at a temperature of at least 40° C.; wherein the opened microfiber slurry 401 comprises water, microfiber, and water dispersible sulfopolyester; and (B) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

Figure 4:
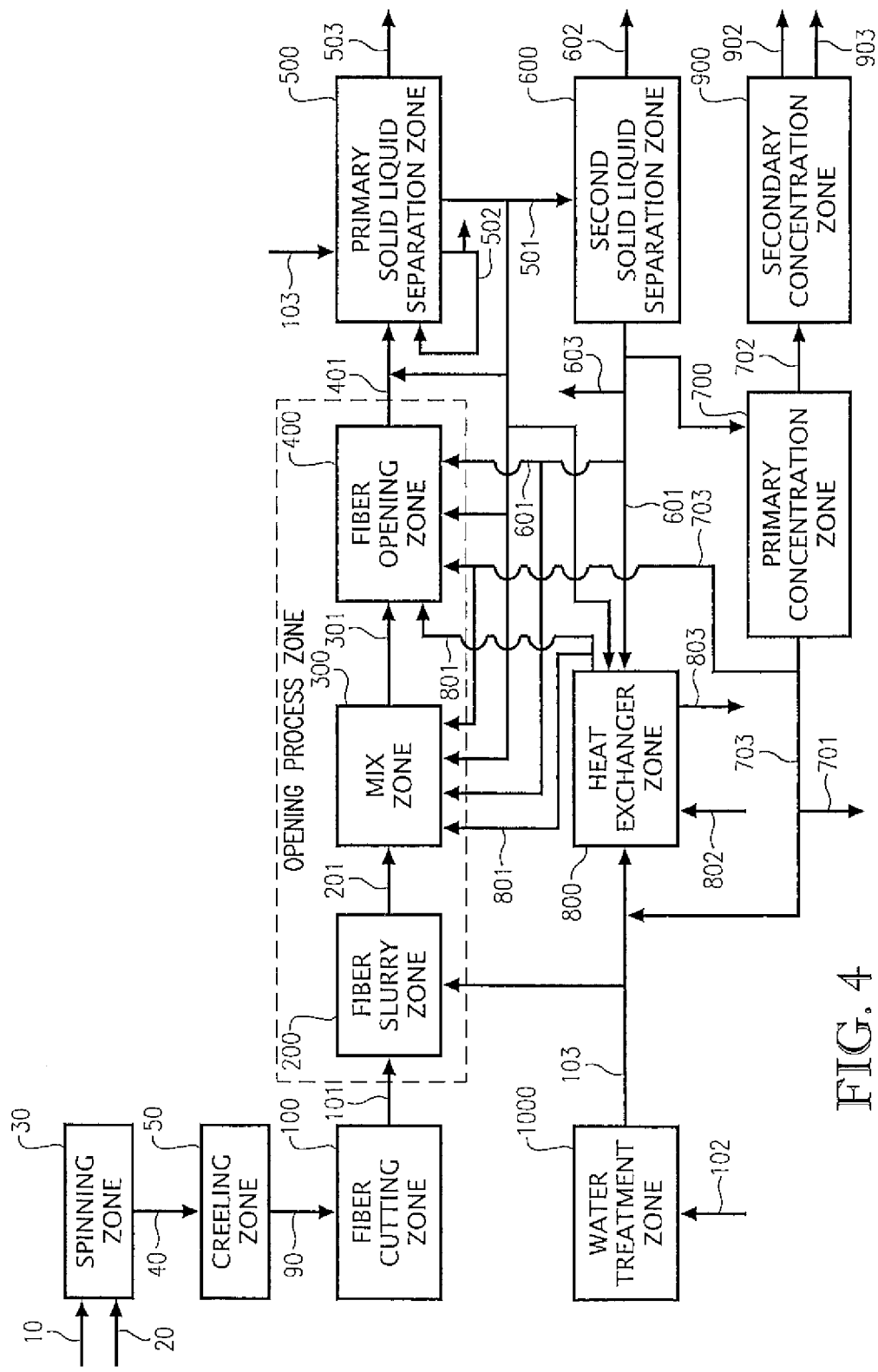
FIG. 4 illustrates an embodiment of the invention wherein the microfiber product stream is produced in a three step opening zone.

In this embodiment of the invention, the fiber slurry zone 200, mix zone 300, and the fiber opening zone 400 as shown in FIG. 4 have been combined into one unit operation in the opening process zone 1100. The opening process zone 1100 comprises a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800 to produce a heated aqueous stream. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, a portion of the primary recovered water stream 703, a portion of the first mother liquor stream 501, and a portion the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800. The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the heated treated aqueous stream 801 are routed to a fiber opening zone 400 to generate opened microfiber slurry 401. One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Figure 5:
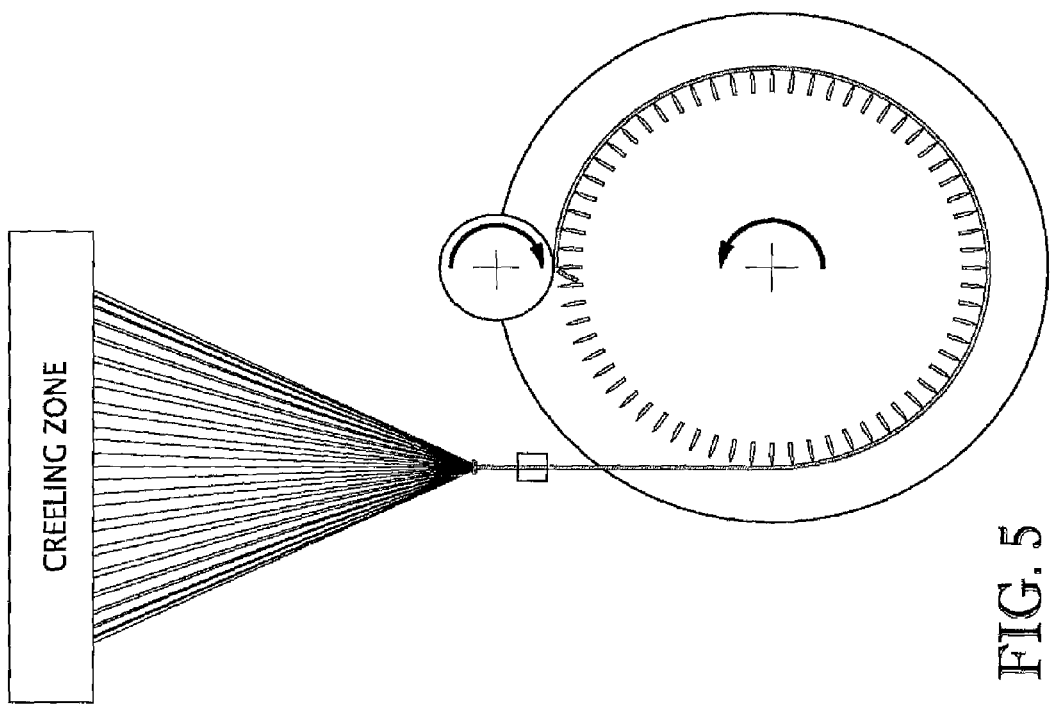
FIG. 5 illustrates an embodiment of the process for cutting multicomponent fibers to produce short cut multicomponent fibers.

In this embodiment of the invention, fiber slurry zone 200, mix zone 300, and fiber opening zone 400 as shown in FIG. 4 are combined and accomplished in a single unit operation as shown in FIG. 2. In this embodiment, the cut multicomponent fiber stream 101 is routed directly to single unit operation where it mixed with the heated aqueous stream 801 within fiber opening zone 400. For example, a batch mixing device where the opening or washing of the cut multicomponent fibers is accomplished in a single batch mixing device wherein cut multicomponent fiber stream 101 and the heated aqueous stream 801 are added directly to the in the fiber opening zone 400. The fiber opening zone can comprise at least one mix tank. In this embodiment, the combined functions of zones 200, 300 and 400 may be accomplished in a continuous stirred tank reactor as shown in FIGS. 5b and 5c. In this embodiment, the combined functions of zones 200, 300 and 400 may be accomplished in any batch or continuous mixing device capable of achieving the functional requirements of residence time, temperature, and mixing shear forces required for proper function of zones 200, 300, and 400.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Figure 6A:
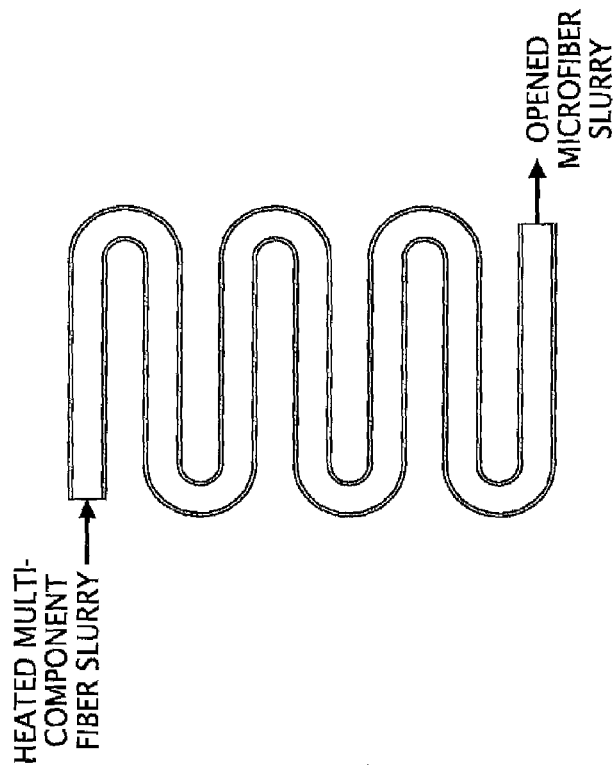
FIG. 6a illustrates an embodiment of the opening zone wherein the opening zone comprises a pipe.
Figure 6C:
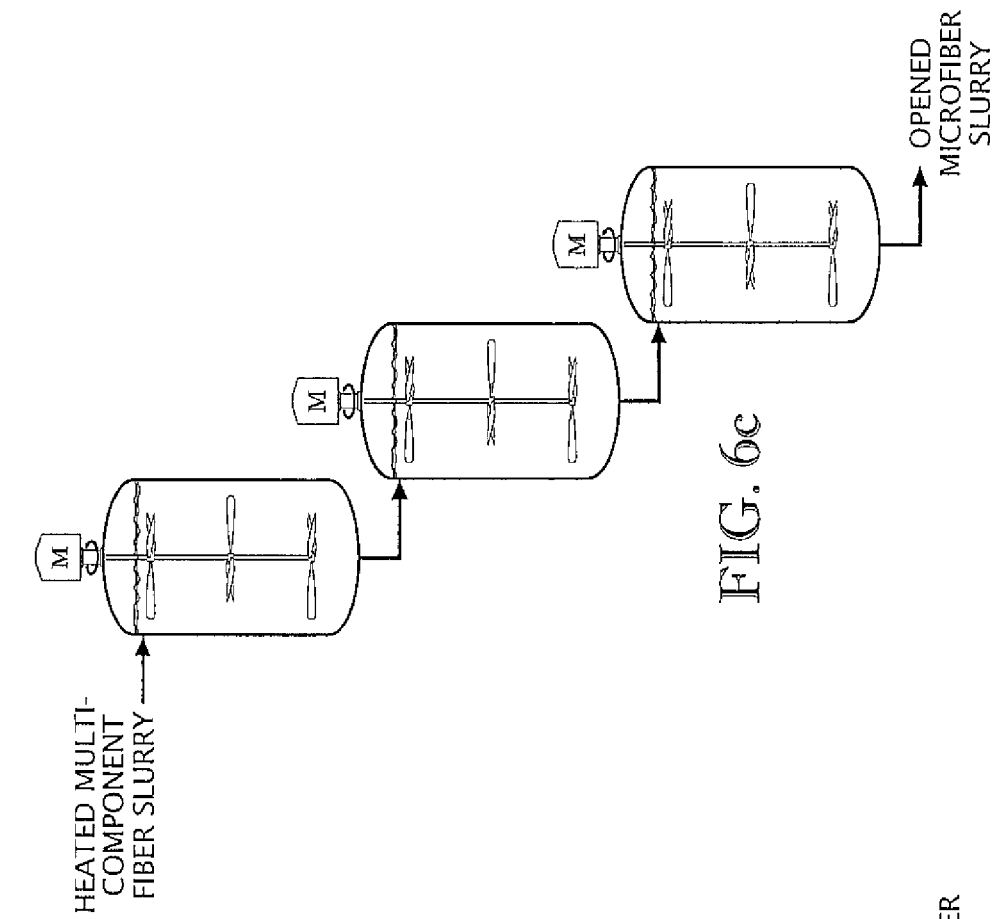
FIG. 6c illustrates an embodiment of the opening zone wherein the opening zone comprises more than one continuous stirred tanks.
Figure 6B:
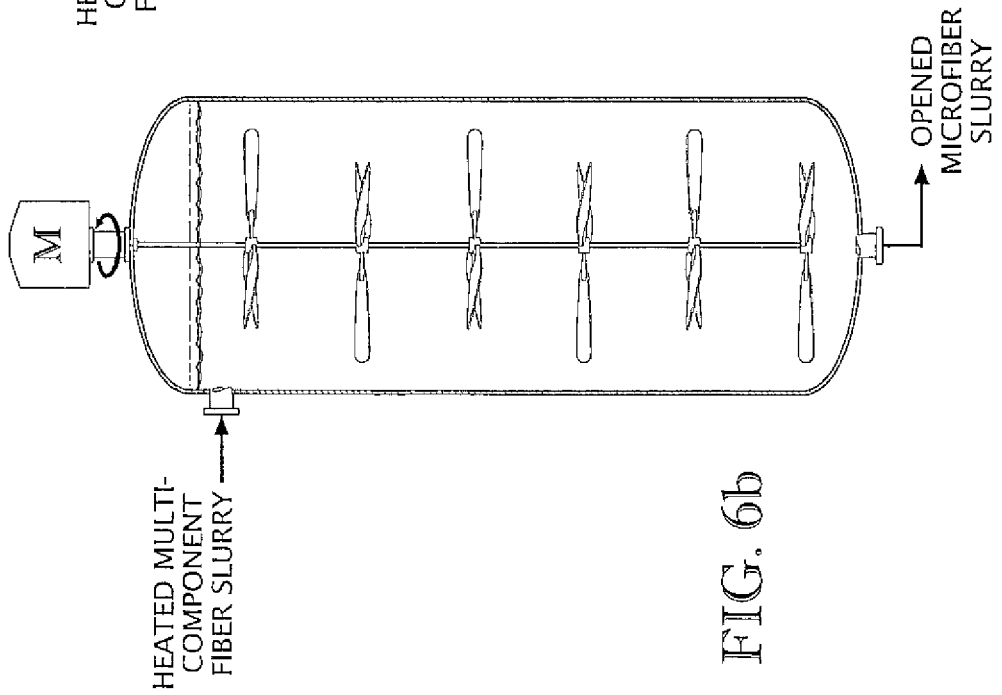
FIG. 6b illustrates an embodiment of the opening zone wherein the opening zone comprises a continuous stirred tank.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6b and 6c, and a pipe with sufficient flow to minimize solids from settling out of the slurry as shown in FIG. 6a. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{v} = \frac{Q D_H}{v A}$$

Where:
$D_H$ is the hydraulic diameter of the pipe; L, (m).
Q is the volumetric flow rate (m³/s).
A is the pipe cross-sectional area (m²).

V is the mean velocity of the object relative to the fluid (SI units: m/s).

μ is the dynamic viscosity of the fluid (Pa·s or N·s/m² or kg/(m·s)).

ν is the kinematic viscosity (ν=μ/ρ) (m²/s)

ρ is the density of the fluid (kg/m³).

For flow in a pipe of diameter D, experimental observations show that for fully developed flow, laminar flow occurs when $Re_D$<2000, and turbulent flow occurs when $Re_D$>4000. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. A portion up to 100 weight % of wash liquor stream 502 can be routed to a second solid liquid separation zone 600. Wash liquor stream 502 can contain microfiber. In one embodiment, the grams of microfiber mass breaking though the filter media with openings up to 2000 microns in the primary solid liquid separation zone 500 ranges from about 1 to 2 grams/cm² of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber slurry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one set of pressure rollers.

In other embodiments of the invention, the force exerted by mechanical dewatering for each set of pressure rollers can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

Figure 7A:
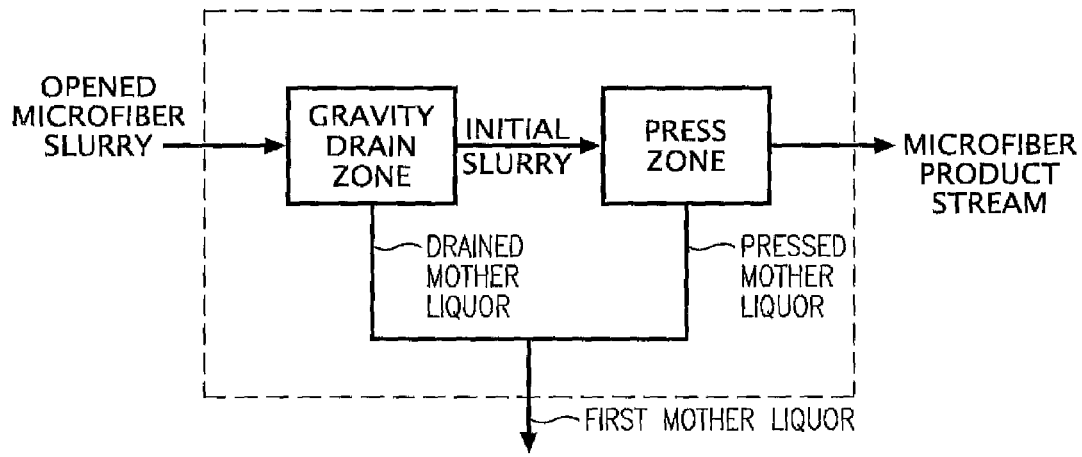
FIGS. 7a and 7b illustrate an embodiment of the primary solid liquid separation zone.
Figure 7B:
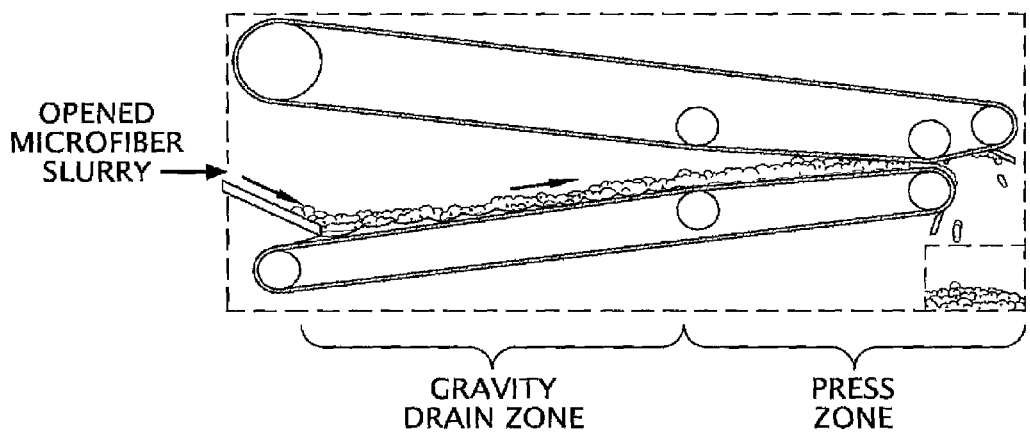

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6b. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquid stream 501 can be recycled to the fiber opening zone 400, or the heat exchanger zone 800 prior to being routed to Zone 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm$^2$ of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function. \

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber opening zone 400, or the heat exchanger zone 800 prior to being routed to Zone 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone is subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be recycled to the fiber opening zone 400, or the heat exchanger zone 800 prior to being routed to Zone 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Water can be removed from the second mother liquor stream 601 by any method know in the art in the primary concentration zone 700 to produce the primary polymer concentrate stream 702. In one embodiment, removal of water involves an evaporative process by boiling water away in batch or continuous evaporative equipment. For example, at least one thin film evaporator can be used for this application. In another embodiment, membrane technology comprising nanofiltration media can be used to generate the primary polymer concentrate stream 702. In another embodiment, a process comprising extraction equipment may be used to extract water dispersible polymer from the second mother liquor stream 601 and generate the primary polymer concentrate stream 702. It is understood than any combination of evaporation, membrane, and extraction steps may be used to separate the water dispersible sulfopolyester from the second mother liquor stream 601 and generate the primary polymer concentrate stream 702. The primary polymer concentration stream 702 may then exit the process.

In one embodiment, the primary polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

Figure 3A:
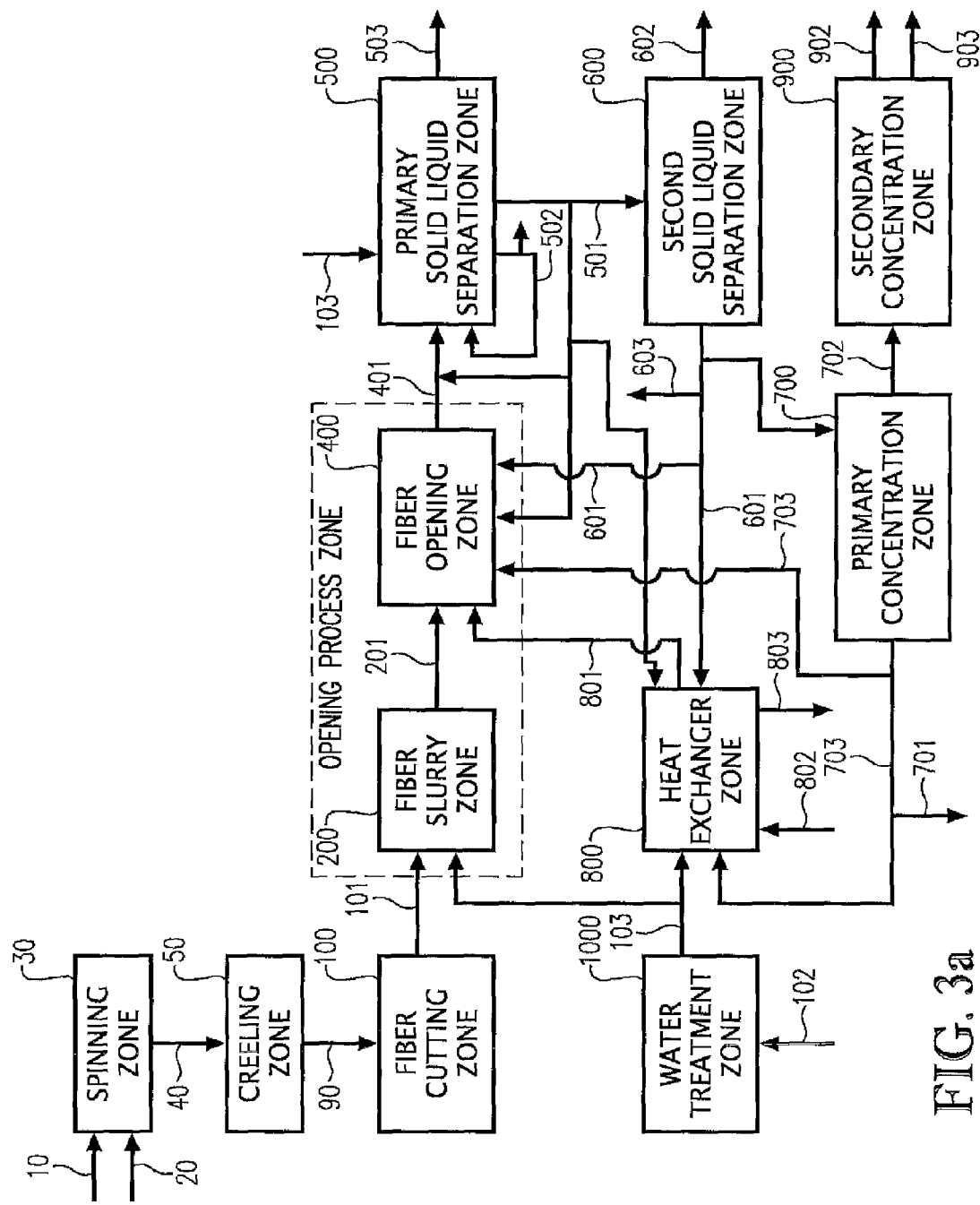
FIGS. 3a and 3b illustrate an embodiment of the invention wherein the microfiber product stream is produced in a two step opening zone.

In another embodiment of the invention, as shown in FIG. 3a, a process for producing a microfiber product stream is provided. The process comprises:
(A) contacting short cut multicomponent fibers 101 having a length of less than 25 millimeters with a treated aqueous stream 103 in a fiber slurry zone 200 to produce a short cut multicomponent fiber slurry 201; wherein the short cut multicomponent fibers 101 comprise at least one water dispersible sulfopolyester and at least one water non-dispersible synthetic polymer immiscible with the water dispersible sulfopolyester; and wherein the treated aqueous stream 103 is at a temperature of less than 40° C.;
(B) contacting the short cut multicomponent fiber slurry 201 and a heated aqueous stream 801 in a fiber opening zone 400 to remove a portion of the water dispersible sulfopolyester to produce an opened microfiber slurry 401; wherein the opened microfiber slurry comprises water non-dispersible polymer microfiber, water dispersible sulfopolyester, and water; and
(C) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

In this embodiment of the invention, the mix zone 300 and the fiber opening zone 400 as shown in FIG. 4 have been combined into one unit operation in the opening process zone 1100. The opening process zone 1100 comprises a fiber slurry zone 200 and a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800. In another embodiment, at least a portion of treated aqueous stream 103 is routed to a fiber slurry zone 200. In another embodiment, at least a portion of the treated aqueous stream 103 is routed to heat exchanger zone 800 and at least a portion of the treated aqueous stream 103 is routed to the fiber slurry zone 200. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, the primary recovered water stream 703, the first mother liquor stream 501, and the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800. The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the treated aqueous stream 103 are routed to a fiber slurry zone 200 to generate a cut multicomponent fiber slurry 201 comprising water and cut multicomponent fibers. In one embodiment, the weight % of cut multicomponent fibers in the cut multicomponent fiber slurry 201 can range from about 35 weight % to about 1% weight %, from about 25 weight % to about 1 weight %, from about 15 weight % to about 1 weight %, or from about 7 weight % to about 1 weight %.

The temperature of the cut multicomponent fiber slurry 201 can range from about 5 degrees centigrade to about 45 degrees centigrade, from about 10 degrees centigrade to about 35 degrees centigrade, or from about 10 degrees centigrade to about 25 degrees centigrade. In one embodiment, fiber slurry zone 200 comprises a tank with sufficient agitation to generate a suspension of cut multicomponent fiber in a continuous aqueous phase.

Any equipment known in the art suitable for mixing a solid with water and maintaining the resulting suspension of cut multicomponent fibers in the continuous phase may be used in the fiber slurry zone 200. The fiber slurry zone 200 can comprise batch or continuous mixing devices operated in continuous or batch mode. Suitable devices for use in the fiber slurry zone 200 include, but are not limited to, a hydro-pulper, a continuous stirred tank reactor, a tank with agitation operated in batch mode.

The cut multicomponent fiber slurry 201 can then be routed to a fiber opening zone 400. One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6b and 6c, and a pipe with sufficient flow to minimize solids from settling out of the slurry as shown in FIG. 6a. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{\nu} = \frac{Q D_H}{\nu A}$$

Where:
$D_H$ is the hydraulic diameter of the pipe; L, (m).
Q is the volumetric flow rate ($m^3/s$).
A is the pipe cross-sectional area ($m^2$).
V is the mean velocity of the object relative to the fluid (SI units: m/s).
$\mu$ is the dynamic viscosity of the fluid (Pa·s or N·s/$m^2$ or kg/(m·s)).
$\nu$ is the kinematic viscosity ($\nu=\mu/\rho$) ($m^2/s$).
$\rho$ is the density of the fluid (kg/$m^3$).

For flow in a pipe of diameter D, experimental observations show that for fully developed flow, laminar flow occurs when $Re_D<2000$, and turbulent flow occurs when $Re_D>4000$. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. A portion up to 100 weight % of wash liquor stream 502 can be routed to a second solid liquid separation zone 600. Wash liquor stream 502 can contain microfiber. In one embodiment, the grams of microfiber mass breaking though the filter media with openings up to 2000 microns in the primary solid liquid separation zone 500 ranges from about 1 to 2 grams/cm$^2$ of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber slurry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one set of pressure rollers.

In other embodiments of the invention, the force exerted by mechanical dewatering for each set of pressure rollers can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6b. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquid stream 501 can be recycled to the fiber slurry zone 200, the fiber opening zone 400, or the heat exchanger zone 800 prior to being routed to Zones 200 and/or 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm$^2$ of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function.

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber slurry zone 200, the fiber opening zone 400, or the heat exchanger zone 800 prior to being routed to Zones 200 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone is subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be recycled to the fiber slurry zone 200, the fiber opening zone 400, or the heat exchanger zone 800 prior to being routed to Zones 200 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Water can be removed from the second mother liquor stream 601 by any method know in the art in the primary concentration zone 700 to produce the primary polymer concentrate stream 702. In one embodiment, removal of water involves an evaporative process by boiling water away in batch or continuous evaporative equipment. For example, at least one thin film evaporator can be used for this application. In another embodiment, membrane technology comprising nanofiltration media can be used to generate the primary polymer concentrate stream 702. In another embodiment, a process comprising extraction equipment may be used to extract water dispersible polymer from the second mother liquor stream 601 and generate the primary polymer concentrate stream 702. It is understood than any combination of evaporation, membrane, and extraction steps may be used to separate the water dispersible sulfopolyester from the second mother liquor stream 601 and generate the primary polymer concentrate stream 702. The primary polymer concentrate stream 702 may then exit the process.

In one embodiment, the primary polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

Figure 3B:
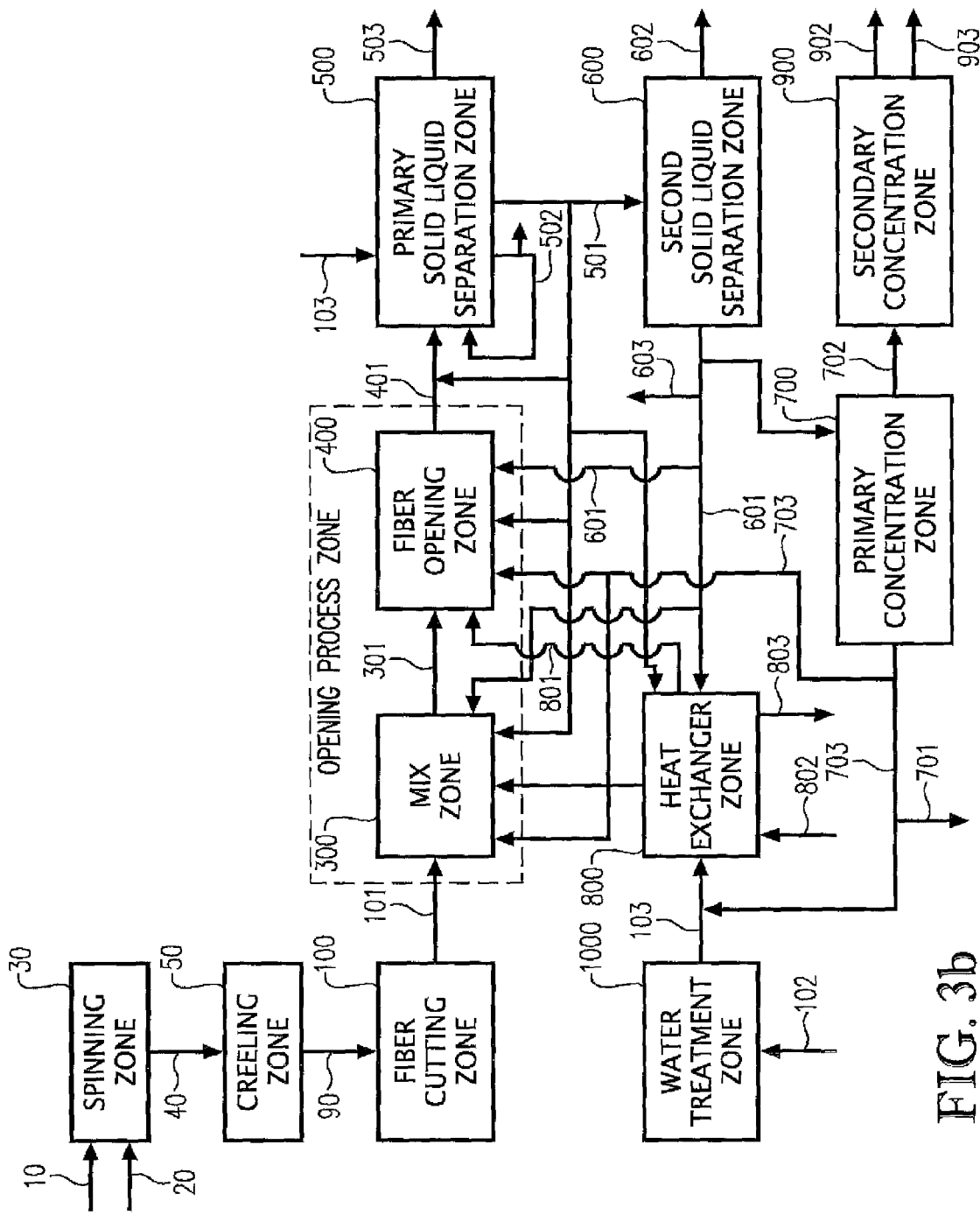

In another embodiment of the invention, as shown in FIG. 3b, a process for producing a microfiber product stream is provided. The process comprises:

(A) contacting short cut multicomponent fibers 101 having a length of less than 25 millimeters with a heated aqueous stream 801 in a mix zone to produce a short cut multicomponent fiber slurry 301; wherein the short cut multicomponent fibers 101 comprise at least one water dispersible sulfopolyester and at least one water non-dispersible polymer immiscible with the water dispersible sulfopolyester; and wherein the heated aqueous stream 801 is at a temperature of 40° C. or greater;

(B) routing the short cut multicomponent fiber slurry 301 and optionally, a heated aqueous stream 801, to a fiber opening zone 400 to remove a portion of the water dispersible sulfopolyester to produce an opened microfiber slurry 401; wherein the opened microfiber slurry 401 comprises water non-dispersible polymer microfiber, water dispersible sulfopolyester, and water; and (C) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

In this embodiment of the invention as shown in FIG. 3b, the fiber slurry zone 200 and the fiber mix zone 300 have been combined into one unit operation in the opening process zone 1100. The opening process zone 1100 comprises a mix zone 200 and a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800. In another embodiment, at least a portion of treated aqueous stream 103 is routed to a mix zone 300. In another embodiment, at least a portion of the treated aqueous stream 103 is routed to heat exchanger zone 800 and at least a portion of the treated aqueous stream 103 is routed to the mix zone 300. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, the primary recovered water stream 703, the first mother liquor stream 501, and the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800. The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the heated aqueous stream 801 are routed to a mix zone 300 to generate a heated multicomponent fiber slurry 301 comprising water and cut multicomponent fibers The temperature of the heated multicomponent fiber slurry 301 influences the separation of the water dispersible sulfopolyester portion of the cut multicomponent fiber from the water non-dispersible polymer portion of the cut multicomponent fiber in fiber opening zone 400. In other embodiments of the invention, the temperature of the heated multicomponent fiber slurry 301 can range from about 55 degrees centigrade to about 100 degrees centigrade, from about 60 degrees centigrade to about 90 degrees centigrade, or from about 65 degrees centigrade to about 80 degrees centigrade.

The weight % of cut multicomponent fiber in the heated multicomponent fiber slurry 301 can be controlled. In other embodiments, the weight % of cut multicomponent fibers in the heated multicomponent fiber slurry 301 can range from about 10 weight % to about 0.1% weight %, from about 5 weight % to about 0.2 weight %, from about 3 weight % to about 0.3 weight %, or from about 2 weight % to about 0.4 weight %.

Any device known in the art capable of mixing the heated aqueous stream 801 with the cut multicomponent fibers 101 may be used in mix zone 300. Suitable devices include both continuous and batch mixing devices. In one embodiment, a suitable mixing device for mix zone 300 comprises a tank and an agitator. In another embodiment, a suitable mixing device comprises a pipe or conduit.

In other embodiments, a suitable mixing device in mix zone 300 comprises a pipe or conduit with a diameter such that the speed in the conduit is sufficient to mix the cut multicomponent fiber slurry 201 and the heated aqueous stream 801 wherein less than about 2 weight %, less than about 1 weight %, or less than about 0.5 weight of cut multicomponent mass entering the conduit per minute settles out and accumulates in the conduit.

The heated multicomponent fiber slurry 301 can then be routed to a fiber opening zone 400. One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6b and 6c, and a pipe with sufficient flow to minimize solids from settling out of the slurry as shown in FIG. 6a. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{v} = \frac{Q D_H}{v A}$$

Where:
$D_H$ is the hydraulic diameter of the pipe; L, (m).
Q is the volumetric flow rate (m$^3$/s).
A is the pipe cross-sectional area (m$^2$).
V is the mean velocity of the object relative to the fluid (SI units: m/s).
$\mu$ is the dynamic viscosity of the fluid (Pa·s or N·s/m$^2$ or kg/(m·s)).
$v$ is the kinematic viscosity ($v=\mu/\rho$) (m$^2$/s)
$\rho$ is the density of the fluid (kg/m$^3$).

For flow in a pipe of diameter D, experimental observations show that for fully developed flow, laminar flow occurs when $Re_D<2000$, and turbulent flow occurs when $Re_D>4000$. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. A portion up to 100 weight % of wash liquor stream 502 can be routed to a second solid liquid separation zone 600. Wash liquor stream 502 can contain microfiber. In one embodiment, the grams of microfiber mass breaking though the filter media with openings up to 2000 microns in the primary solid liquid separation zone 500 ranges from about 1 to 2 grams/cm$^2$ of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber slurry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one pressure roller and a fixed surface.

In other embodiments of the invention, the force exerted by mechanical dewatering can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6b. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquor stream 501 can be recycled to the mix zone 300, the fiber opening zone 400, or the heat exchanger zone 800 prior to being routed to Zones 200, 300 and/or 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm² of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function.

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber slurry zone 200, the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone is subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Water can be removed from the second mother liquor stream 601 by any method know in the art in the primary concentration zone 700 to produce the primary polymer concentrate stream 702. In one embodiment, removal of water involves an evaporative process by boiling water away in batch or continuous evaporative equipment. For example, at least one thin film evaporator can be used for this application. In another embodiment, membrane technology comprising nanofiltration media can be used to generate the primary polymer concentrate stream 702. In another embodiment, a process comprising extraction equipment may be used to extract water dispersible polymer from the second mother liquor stream 601 and generate the primary polymer concentrate stream 702. It is understood than any combination of evaporation, membrane, and extraction steps may be used to separate the water dispersible sulfopolyester from the second mother liquor stream 601 and generate the primary polymer concentrate stream 702. The primary polymer concentrate stream 702 may then exit the process.

In one embodiment, the primary polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

In another embodiment of the invention, as shown in FIG. 4, a process for producing a microfiber product stream is provided. The process comprises:

(A) contacting short cut multicomponent fibers 101 having a length of less than 25 millimeters with a treated aqueous stream 103 in a fiber slurry zone 200 to produce a short cut multicomponent fiber slurry 201; wherein the short cut multicomponent fibers 101 comprise at least one water dispersible sulfopolyester and at least one water non-dispersible synthetic polymer immiscible with the water dispersible sulfopolyester; and wherein the treated aqueous stream 103 is at a temperature of less than 40° C.;

(B) contacting the short cut multicomponent fiber slurry 201 with a heated aqueous stream 801 in a mix zone 300 to produce a heated multicomponent fiber slurry 301;

(C) routing the heated multicomponent fiber slurry 301 to a fiber opening zone 400 to remove a portion of the water dispersible sulfopolyester to produce an opened microfiber slurry 401; and (D) routing the opened microfiber slurry 401 to a primary solid liquid separation zone 500 to produce the microfiber product stream 503 and a first mother liquor stream 501; wherein the first mother liquor stream 501 comprises water and the water dispersible sulfopolyester.

In this embodiment of the invention as shown in FIG. 4, the opening process zone 1100 comprises a fiber slurry zone 200, mix zone 300 and a fiber opening zone 400.

A treated aqueous stream 103 for use in the process can be produced by routing an aqueous stream 102 to an aqueous treatment zone 1000 to produce a treated aqueous stream 103. The aqueous stream comprises water. In embodiments of the invention, the concentration of monovalent metal cations in the treated aqueous stream 103 can be less than about 1000 ppm by weight, less than about 500 ppm by weight, less than about 100 ppm by weight, or less than about 50 ppm by weight. Removal of divalent and multivalent metal cations from the aqueous stream 102 is one function of the aqueous treatment zone 1000. In other embodiments of the invention, the concentration of divalent and multivalent cations is less than about 50 ppm by weight, less than about 25 ppm by weight, less than about 10 ppm by weight, or less than about 5 ppm by weight. The temperature of stream 103 can range from ground water temperature to about 40° C.

The treatment of the aqueous stream 102 in the aqueous treatment zone 1000 can be accomplished in any way know in the art. In one embodiment, aqueous treatment zone 1000 comprises distillation equipment wherein water vapor is generated and condensed to produce the treated aqueous stream 103. In another embodiment, water is routed to a reverse osmosis membrane separation capable of separating monovalent and divalent metal cations from water to produce the treated aqueous stream 103. In another embodiment, water is routed to an ion exchange resin to generate the treated aqueous stream 103 with acceptably low concentration of metal cations. In yet another embodiment, water can be routed to a commercial water softening apparatus to generate the treated aqueous stream 103 with an acceptably low concentration of divalent and multivalent metal cations. It is understood that any combinations of these water treatment options may be employed to achieve the required treated water characteristics.

The treated aqueous stream 103 may be routed to any location in the process where it is needed. In one embodiment, a portion of stream 103 is routed to a primary solid liquid separation zone 500 to serve as a cloth wash and/or a wash for solids contained in the primary solid liquid separation zone 500.

In one embodiment, at least a portion of the treated aqueous stream 103 is routed to heat exchanger zone 800. In another embodiment, at least a portion of treated aqueous stream 103 is routed to a fiber slurry zone 200. In another embodiment, at least a portion of the treated aqueous stream 103 is routed to heat exchanger zone 800 and at least a portion of the treated aqueous stream 103 is routed to the fiber slurry zone 200. One function of heat exchanger zone 800 is to generate a heated aqueous stream 801 at a specific and controlled temperature.

In one embodiment, streams that can feed heat exchanger zone 800 are the treated aqueous stream 103 and the second mother liquor stream 601. In another embodiment, streams that can feed heat exchanger zone 800 comprise the treated aqueous stream 103, the primary recovered water stream 703, the first mother liquor stream 501, and the second mother liquor stream 601.

Any equipment know in the art for controlling the temperature of stream 801 may be used including, but not limited to, any heat exchanger with steam used to provide a portion of the required energy, any heat exchanger with a heat transfer fluid used to provide a portion of the required energy, any heat exchanger with electrical heating elements used to provide a portion of the required energy, and any vessel or tank with direct steam injection wherein the steam condenses and the condensate mixes with the water feeds to heat exchanger zone 800.

The multicomponent fiber stream 90 is routed to fiber cutting zone 100 to generate cut multicomponent fiber stream 101. The multicomponent fiber can be of any multicomponent structure known in the art. The multicomponent fiber comprises a water dispersible sulfopolyester and a water non-dispersible polymer as previously discussed in this disclosure.

Any equipment know in the art may be used to cut multicomponent fiber stream 90 to generate cut multicomponent fiber stream 101. In one embodiment, the length of the cut fibers in the cut multicomponent fiber stream 101 is less than about 50 mm. In other embodiments, the length of cut fibers in the cut multicomponent fiber stream 101 is less than about 25 mm, less than about 20 mm, less than about 15 mm, less than about 10 mm, less than about 5 mm, or less than 2.5 mm.

The cut multicomponent fiber stream 101 and a portion of the treated aqueous stream 103 are routed to a fiber slurry zone 200 to generate a cut multicomponent fiber slurry 201 comprising water and cut multicomponent fibers. In one embodiment, the weight % of cut multicomponent fibers in the cut multicomponent fiber slurry 201 can range from about 35 weight % to about 1% weight %, from about 25 weight % to about 1 weight %, from about 15 weight % to about 1 weight %, or from about 7 weight % to about 1 weight %.

The temperature of the cut multicomponent fiber slurry 201 can range from about 5 degrees centigrade to about 45 degrees centigrade, from about 10 degrees centigrade to about 35 degrees centigrade, or from about 10 degrees centigrade to about 25 degrees centigrade. In one embodiment, fiber slurry zone 200 comprises a tank with sufficient agitation to generate a suspension of cut multicomponent fiber in a continuous aqueous phase.

Any equipment known in the art suitable for mixing a solid with water and maintaining the resulting suspension of cut multicomponent fibers in the continuous phase may be used in the fiber slurry zone 200. The fiber slurry zone 200 can comprise batch or continuous mixing devices operated in continuous or batch mode. Suitable devices for use in the fiber slurry zone 200 include, but are not limited to, a hydro-pulper, a continuous stirred tank reactor, a tank with agitation operated in batch mode.

The cut multicomponent fiber slurry 201 and a heated aqueous stream 801 are routed to a mix zone 300 and combined to generate a heated multicomponent fiber slurry 301. The temperature of the heated multicomponent fiber slurry 301 influences the separation of the water dispersible sulfopolyester portion of the cut multicomponent fiber from the water non-dispersible polymer portion of the cut multicomponent fiber in fiber opening zone 400. In other embodiments of the invention, the temperature of the heated multicomponent fiber slurry 301 can range from about 55 degrees centigrade to about 100 degrees centigrade, from about 60 degrees centigrade to about 90 degrees centigrade, or from about 65 degrees centigrade to about 80 degrees centigrade.

The weight % of cut multicomponent fiber in the heated multicomponent fiber slurry 301 can be controlled. In other embodiments, the weight % of cut multicomponent fibers in the heated multicomponent fiber slurry 301 can range from about 10 weight % to about 0.1% weight %, from about 5 weight % to about 0.2 weight %, from about 3 weight % to about 0.3 weight %, or from about 2 weight % to about 0.4 weight %.

Any device known in the art capable of mixing the heated aqueous stream 801 with the cut multicomponent fiber slurry 201 may be used in mix zone 300. Suitable devices include both continuous and batch mixing devices. In one embodiment, a suitable mixing device for mix zone 300 comprises a tank and an agitator. In another embodiment, a suitable mixing device comprises a pipe or conduit.

In other embodiments, a suitable mixing device in mix zone 300 comprises a pipe or conduit with a diameter such that the speed in the conduit is sufficient to mix the cut multicomponent fiber slurry 201 and the heated aqueous stream 801 wherein less than about 2 weight %, less than about 1 weight %, or less than about 0.5 weight % of cut multicomponent mass entering the conduit per minute settles out and accumulates in the conduit.

The heated multicomponent fiber slurry 301 can then be routed to a fiber opening zone 400. One function of fiber opening zone 400 is to separate the water dispersible polymer from the cut multicomponent fiber such that at least a portion of the water non-dispersible polymer microfibers separate from the cut multicomponent fiber and become suspended in the opened microfiber slurry 401. In another embodiment of the invention, from about 50 weight % to about 100 weight % of water non-dispersible polymer microfiber contained in the cut multicomponent fiber slurry 201 becomes suspended in the opened microfiber slurry 401 as water non-dispersible polymer microfibers and is no longer a part of the cut multicomponent fiber. In other embodiments, from about 75 weight % to about 100 weight %, from about 90 weight % to about 100 weight %, or from about 95 weight % to about 100 weight % of the water non-dispersible polymer microfiber contained in the cut multicomponent fiber stream 201 becomes suspended in the opened microfiber slurry 401 as water non-dispersible polymer microfibers and are no longer a part of a cut multicomponent fiber.

The diameter or denier of the starting cut multicomponent fiber in stream 201 impacts the extent of separation of the water dispersible sulfopolyester from the cut multicomponent fiber in the fiber opening zone 400. Typical multicomponent fiber types generally have a diameter in the range from about 12 microns to about 20 microns. Useful multicomponent fibers can have larger starting diameters to a size of about 40 microns diameter or more. The time required to separate a desired amount of water dispersible sulfopolyester from the cut multicomponent fiber increases as the diameter of the cut multicomponent fiber in stream 201 increases.

Residence time, temperature, and shear forces in the fiber opening zone 400 also influence the extent of separation of the water dispersible sulfopolyester from the cut multicomponent fiber. The conditions influencing the opening process in fiber opening zone 400 comprise residence time, slurry temperature, and shear forces where the ranges of water temperature, residence time in the fiber opening zone 400, and amount of applied shear are dictated by the need to separate the water dispersible sulfopolyester from the starting multicomponent fiber to a sufficient degree to result in water non-dispersible polymer microfibers becoming separated and suspended in the continuous aqueous phase of the opened microfiber slurry 401.

Residence time, temperature, and shear forces in fiber opening zone 400 influence the extent of separation of the water dispersible sulfopolyester from the cut multicomponent fiber. The temperature of the fiber opening zone 400 can range from about 55 degrees centigrade to about 100 degrees centigrade, from about 60 degrees centigrade to about 90 degrees centigrade, or from about 65 degrees centigrade to about 80 degrees centigrade. The residence time in the fiber opening zone 400 can range from about 5 minutes to about 10 seconds, from about 3 minutes to about 20 seconds, or from about 2 minutes to about 30 seconds. Sufficient mixing is maintained in fiber opening zone 400 to maintain a suspension of cut water non-dispersible polymer microfibers such that the settling of the cut microfibers is minimal. In other embodiments of the invention, the mass per unit time of cut water non-dispersible microfibers settling in the fiber opening zone 400 is less than about 5% of the mass per unit time of cut water non-dispersible polymer microfibers entering the zone 400, less than about 3% of the mass per unit time of cut water non-dispersible polymer microfibers entering zone 400, or less than about 1% of the mass per unit time of cut water non-dispersible polymer microfibers entering the fiber opening zone 400.

Fiber opening in fiber opening zone 400 may be accomplished in any equipment capable of allowing for acceptable ranges of residence time, temperature, and mixing. Examples of suitable equipment include, but are not limited to, an agitated batch tank, a continuous stirred tank reactor, as shown in FIGS. 6b and 6c, and a pipe with sufficient flow to minimize solids from settling out of the slurry as shown in FIG. 6a. One example of a unit operation to accomplish fiber opening in fiber opening zone 400 is a plug flow reactor where the heated multicomponent fiber slurry 301 is routed to zone 400 plug flow device, typically a circular pipe or conduit. The residence time of material in a plug flow device is calculated by dividing the filled volume within the device by the volumetric flow rate in the device. Velocity of the mass in the device is defined by the cross sectional area of the flow channel divided by the volumetric flow of the liquid through the device.

In other embodiments of the invention, the fiber opening zone 400 can comprise a pipe or conduit wherein the velocity of mass flowing in the pipe can range from 0.1 ft/second to about 20 feet/second, from 0.2 ft/sec to about 10 ft/sec, or from about 0.5 ft/sec to about 5 ft/sec. For flow of a fluid or slurry in a pipe or conduit, the Reynolds number Re is a dimensionless number useful for describing the turbulence or motion of fluid eddy currents that are irregular with respect both to direction and time. For flow in a pipe or tube, the Reynolds number is generally defined as:

$$Re = \frac{\rho v D_H}{\mu} = \frac{v D_H}{v} = \frac{Q D_H}{v A}$$

Where:
$D_H$ is the hydraulic diameter of the pipe; L, (m).
Q is the volumetric flow rate (m$^3$/s).
A is the pipe cross-sectional area (m$^2$).
V is the mean velocity of the object relative to the fluid (SI units: m/s).
$\mu$ is the dynamic viscosity of the fluid (Pa·s or N·s/m$^2$ or kg/(m·s)).
$v$ is the kinematic viscosity ($v=\mu/\rho$) (m$^2$/s).
$\rho$ is the density of the fluid (kg/m$^3$).

For flow in a pipe of diameter D, experimental observations show that for fully developed flow, laminar flow occurs when $Re_D<2000$, and turbulent flow occurs when $Re_D>4000$. In the interval between 2300 and 4000, laminar and turbulent flows are possible ('transition' flows), depending on other factors, such as, pipe roughness and flow uniformity.

Fiber opening zone 400 can comprise a pipe or conduit to facilitate the opening process, and the Reynolds number for flow through the pipe or conduit in fiber opening zone 400 can range from about 2,100 to about 6,000, from about 3,000 to about 6,000, or from about 3,500 to about 6,000. In other embodiments, the fiber opening zone 400 can comprise a pipe or conduit to facilitate the opening process, and the Reynolds number for flow through the pipe or conduit is at least 2,500, at least about 3,500, or at least about 4,000.

Fiber opening zone 400 can be achieved in a pipe or conduit containing a mixing device inserted within the pipe or conduit. The device can comprise an in-line mixing device. The in-line mixing device can be a static mixer with no moving parts. In another embodiment, the in-line mixing device comprises moving parts. Without being limiting, such an element is a mechanical device for the purpose of imparting more mixing energy to the heated multicomponent fiber slurry 301 than achieved by the flow through the pipe. The device can be inserted at the beginning of the pipe section used as the fiber opening zone, at the end of the pipe section, or at any location within the pipe flow path.

The opened fiber slurry stream 401 comprising water non-dispersible polymer microfiber, water, and water dispersible sulfopolyester can be routed to a primary solid liquid separation zone 500 to generate a microfiber product stream 503 comprising microfiber and a first mother liquor stream 501. In one embodiment, the first mother liquor stream 501 comprises water and water dispersible sulfopolyester.

The weight % of solids in the opened microfiber slurry 401 can range from about 0.1 weight % to about 20 weight %, from about 0.3 weight % to about 10 weight %, from about 0.3 weight % to about 5 weight %, or from about 0.3 weight % to about 2.5 weight %.

The weight % of solids in the microfiber product stream 503 can range from about 10 weight % to about 65 weight %, from about 15 weight % to about 50 weight %, from about 25 weight % to about 45 weight %, or from about 30 weight % to about 40 weight %.

Separation of the microfiber product stream 503 from the opened microfiber slurry 401 can be accomplished by any method known in the art. In one embodiment, wash stream 103 comprising water is routed to the primary solid liquid separation zone 500. Wash stream 103 can be used to wash the microfiber product stream in the primary solid liquid separation zone 500 and/or the filter cloth media in the primary solid liquid separation zone 500 to generate wash liquor stream 502. A portion up to 100 weight % of wash liquor stream 502 can be combined with the opened microfiber slurry 401 prior to entering the primary solid liquid separation zone 500. Wash liquor stream 502 can contain microfiber. In one embodiment, the grams of microfiber mass breaking though the filter media with openings up to 2000 microns in the primary solid liquid separation zone 500 ranges from about 1 to 2 grams/cm$^2$ of filter area. In other embodiments of the invention, the filter openings in the filter media in the primary solid liquid separation zone 500 can range from about 43 microns to 3000 microns, from about 100 microns to 2000 microns, or from about 500 microns to about 2000 microns.

Separation of the microfiber product stream from the opened microfiber slurry in primary solid liquid separation zone 500 may be accomplished by a single or multiple solid liquid separation devices. Separation in the primary solid liquid separation zone 500 may be accomplished by a solid liquid separation device or devices operated in batch and or continuous fashion. Suitable solid liquid separation devices in the primary solid liquid separation zone 500 can include, but is not limited to, at least one of the following: perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, dewatering conveyor belts, and the like.

In one embodiment, the primary solid liquid separation zone 500 comprises a twin wire dewatering device wherein the opened microfiber slurry 401 is routed to a tapering gap between a pair of traveling filter cloths traveling in the same direction. In the first zone of the twin wire dewatering device, water drains from the opened microfiber slurry 401 due to gravity and the every narrowing gap between the two moving filter cloths. In a downstream zone of the twin wire dewatering device, the two filter cloths and the microfiber mass between the two filter cloths are compressed one or more times to mechanically reduce moisture in the microfiber mass. In one embodiment, mechanical dewatering is accomplished by passing the two filter cloths and contained microfiber mass through at least one set of rollers that exert a compressive force on the two filter cloths and microfiber mass between. In another embodiment, mechanical dewatering is accomplished by passing the two filter cloths and microfiber mass between at least one pressure roller and a fixed surface.

In other embodiments of the invention, the force exerted by mechanical dewatering can range from about 25 to about 300 lbs/linear inch of filter media width, from about 50 to about 200 lbs/linear inch of filter media width, or from about 70 to about 125 lbs/linear inch of filter media width. The microfiber product stream 503 is discharged from the twin wire water dewatering device as the two filter cloths separate and diverge at the solids discharge zone of the device. The thickness of the discharged microfiber mass can range from about 0.2 inches to about 1.5 inches, from about 0.3 inches to about 1.25 inches, or from about 0.4 inches to about 1 inch. In one embodiment, a wash stream comprising water is continuously applied to the filter media. In another embodiment, a wash stream comprising water is periodically applied to the filter media.

In another embodiment, the primary solid liquid separation zone 500 comprises a belt filter device comprising a gravity drainage zone and a pressure dewatering zone as illustrated in FIG. 7. Opened microfiber slurry 401 is routed to a tapering gap between a pair of moving filter cloths traveling in the same direction which first pass through a gravity drainage zone and then pass through a pressure dewatering zone or press zone comprising a convoluted arrangement of rollers as illustrated in FIG. 6b. As the belts are fed through the rollers, water is squeezed out of the solids. When the belts pass through the final pair of rollers in the process, the filter cloths are separated and the solids exit the belt filter device.

In another embodiment of the invention, at least a portion of the water contained in the first mother liquor stream 501 comprising water and water dispersible sulfopolyester polymer is recovered and recycled. The first mother liquor stream 501 can be recycled to the primary solid liquid separation zone 500. Depending on the efficiency of the primary liquid separation zone in the removal of the water non-dispersible microfiber, the first mother liquid stream 501 can be recycled to the fiber slurry zone 200, the mix zone 300, the fiber opening zone 400, or the heat exchanger zone 800 prior to being routed to Zones 200, 300 and/or 400. The first mother liquor stream 501 can contain a small amount of solids comprising water non-dispersible polymer microfiber due to breakthrough and cloth wash. In one embodiment, the grams of water non-dispersible polymer microfiber mass breaking though filter media in the primary solid liquid separation zone with openings up to 2000 microns ranges from about 1 to about 2 grams/cm$^2$ of filter area. It is desirable to minimize the water non-dispersible polymer microfiber solids in the first mother liquor stream 501 prior to routing stream 501 to the primary concentration zone 700 and heat exchange zone 800 where water non-dispersible polymer microfiber solids can collect and accumulate in the zones having a negative impact on their function.

A secondary solid liquid separation zone 600 can serve to remove at least a portion of water non-dispersible polymer microfiber solids present in the first mother liquor stream 501 to generate a secondary wet cake stream 602 comprising water non-dispersible microfiber and a second mother liquor stream 601 comprising water and water dispersible sulfopolyester.

In one embodiment, the second mother liquor stream 601 can be routed to a primary concentration zone 700 and or heat exchanger zone 800 wherein the weight % of the second mother liquor stream 601 routed to the primary concentration zone 700 can range from 0% to 100% with the balance of the stream being routed to heat exchanger zone 800. The second mother liquor stream 601 can be recycled to the fiber slurry zone 200, the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Any portion of the second mother liquor 601 routed to primary concentration zone is subjected to a separation process to generate a primary recovered water stream 703 and a primary polymer concentrate stream 702 enriched in water dispersible sulfopolyester wherein the weight % of water dispersible sulfopolyester in the primary polymer concentrate stream 702 can range from about 5 weight % to about 85%, from about 10 weight % to about 65 weight %, or from about 15 weight % to about 45 weight %. The primary recovered water stream 703 can be recycled to the fiber slurry zone 200, the mix zone 300, the fiber opening zone 400, or the heat exchanger zone 800 prior to being routed to Zones 200, 300 and/or 400. The amount of the water dispersible sulfopolyester in the second mother liquor stream routed to the fiber opening zone 400 can range from about 0.01 weight % to about 7 weight %, based on the weight % of the second mother liquor stream, or from about 0.1 weight % to about 7 weight %, from about 0.2 weight % to about 5 weight %, or from about 0.3 weight % to about 3 weight %.

Water can be removed from the second mother liquor stream 601 by any method know in the art in the primary concentration zone 700 to produce the primary polymer concentrate stream 702. In one embodiment, removal of water involves an evaporative process by boiling water away in batch or continuous evaporative equipment. For example, at least one thin film evaporator can be used for this application. In another embodiment, membrane technology comprising nanofiltration media can be used to generate the primary polymer concentrate stream 702. In another embodiment, a process comprising extraction equipment may be used to extract water dispersible polymer from the second mother liquor stream 601 and generate the primary polymer concentrate stream 702. It is understood than any combination of evaporation, membrane, and extraction steps may be used to separate the water dispersible sulfopolyester from the second mother liquor stream 601 and generate the primary polymer concentrate stream 702. The primary polymer concentration stream 702 may then exit the process.

In one embodiment, the primary polymer concentrate stream 702 can be routed to a secondary concentration zone 900 to generate a melted polymer stream 903 comprising water dispersible sulfopolyester wherein the weight % of polymer ranges from about 95% to about 100% and a vapor stream 902 comprising water. In one embodiment, the 903 comprises water dispersible sulfopolyester. Equipment suitable for the secondary concentration zone 900 includes any equipment known in the art capable of being fed an aqueous dispersion of water dispersible polymer and generating a 95% to 100% water dispersible polymer stream 903. This embodiment comprises feeding an aqueous dispersion of water dispersible sulfopolyester polymer to a secondary concentration zone 902. The temperature of feed stream is typically below 100° C.

In one embodiment, the secondary concentration zone 900 comprises at least one device characterized by a jacketed tubular shell containing a rotating convey screw wherein the convey screw is heated with a heat transfer fluid or steam and comprises both convey and high shear mixing elements. The jacket or shell is vented to allow for vapor to escape. The shell jacket may be zoned to allow for different temperature set points along the length of the device. During continuous operation, the primary polymer concentrate stream 702 comprises water and water dispersible sulfopolyester and is continuously fed to the secondary concentration zone 900. Within the device, during steady state, mass exists in at least three distinct and different forms. Mass first exists in the device as an aqueous dispersion of water dispersible sulfopolyester polymer. As the aqueous dispersion of sulfopolyester polymer moves through the device, water is evaporated due to the heat of the jacket and internal screw. When sufficient water is evaporated, the mass becomes a second form comprising a viscous plug at a temperature less than the melt temperature of the sulfopolyester polymer. The aqueous dispersion cannot flow past this viscous plug and is confined to the first aqueous dispersion zone of the device. Due to the heat of the jacket, heat of the internally heated screw, and the heat due to mixing shear forces of this high viscosity plug mass, substantially all the water present at this location evaporates, and the temperature rises until the melt temperature of the sulfopolyester is reached resulting in the third and final physical form of mass in the device comprising melted sulfopolyester polymer. The melted sulfopolyester polymer then exits the device through an extrusion dye and is typically cooled and cut into pellets by any fashion know in the art. It is understood that the device for secondary concentration zone 900 described above may also be operated in batch fashion wherein the three physical forms of mass described above occur throughout the length of the device but at different times in sequential order beginning with the aqueous dispersion, the viscous plug mass, and finally the sulfopolyester melt.

In one embodiment, vapor generated in the secondary concentration zone 900 may be condensed and routed to heat exchanger zone 800, discarded, and/or routed to wash stream 103. In another embodiment, condensed vapor stream 902 comprising water vapor can be routed to heat exchanger zone 800 to provide at least part of the energy required for generating the required temperature for stream 801. The melted polymer stream 903 comprising water dispersible polymer comprising sulfopolyester in the melt phase can be cooled and chopped into pellets by any method known in the art.

Impurities can enter the process and concentrated in water recovered and recycled. One or more purge streams (603 and 701) can be utilized to control the concentration of impurities in the second mother liquor 601 and primary recovered water stream 701 to acceptable levels. In one embodiment, a portion of the second mother liquor stream 601 can be isolated and purged from the process. In one embodiment, a portion of the primary recovered water stream 701 can be isolated and purged from the process.

The invention is further illustrated by the following examples.

EXAMPLES

All pellet samples were predried under vacuum at room temperature for at least 12 hours. The dispersion times shown in Table 3 are for either complete dispersion or dissolution of the nonwoven fabric samples. The abbreviation "CE", used in Tables 2 and 3 mean "comparative example".

Example 1

A sulfopolyester containing 76 mole %, isophthalic acid, 24 mole % of sodio-sulfoisophthalic acid, 76 mole % diethylene glycol, and 24 mole % 1,4-cyclohexane-dimethanol with an Ih.V. of 0.29 and a Tg of 48° C. was meltblown through a nominal 6-inch die (30 holes/inch in the nosepiece) onto a cylindrical collector using the conditions shown in Table 1. Interleafing paper was not required. A soft, handleable, flexible web was obtained that did not block during the roll winding operation. Physical properties are provided in Table 2. A small piece (1"×3") of the nonwoven fabric was easily dispersed in both room temperature (RT) and 50° C. water with slight agitation as shown by data in Table 3.

TABLE 1

Melt Blowing Conditions

| Operating Condition | Typical Value |
|---|---|
| Die Configuration | |
| Die tip hole diameter | 0.0185 inches |
| Number of holes | 120 |
| Air gap | 0.060 inches |
| Set back | 0.060 inches |
| Extruder Barrel Temperatures (° F.) | |
| Zone 1 | 350 |
| Zone 2 | 510 |
| Zone 3 | 510 |
| Die Temperatures (° F.) | |
| Zone 4 | 510 |
| Zone 5 | 510 |
| Zone 6 | 510 |
| Zone 7 | 510 |
| Zone 8 | 510 |
| Air Temperatures (° F.) | |
| Furnace exit 1 | 350 |
| Furnace exit 2 | 700 |
| Furnace exit 3 | 700 |
| Die | 530-546 |
| Extrusion Conditions | |
| Air pressure | 3.0 psi |
| Melt pressure after pump | 99-13 psi |
| Take Up Conditions | |
| Throughput | 0.3 g/hole/min |
| | 0.5 g/hole/min |
| Basis weight | 36 g/m$^2$ |
| Collector speed | 20 ft/min |
| Collector distance | 12 inches |

TABLE 2

Physical Properties of Nonwovens

| | Filament Diameter (μm) | | | IhV | Tg/Tm (° C.) |
|---|---|---|---|---|---|
| Example | Minimum | Maximum | Average | (before/after) | (sulfopoly./PP) |
| 1 | 5 | 18 | 8.7 | 0.29/0.26 | 39/not applicable |
| 2 | 3 | 11 | 7.7 | 0.40/0.34 | 36/not applicable |
| CE 1 | 2 | 20 | 8 | Not measured | 36/163 |
| CE 2 | 4 | 10 | 7 | Not measured | 36/164 |
| CE 3 | 4 | 11 | 6 | Not measured | 35/161 |

TABLE 3

Dispersability of Nonwovens

| Example | Water Temperature (° C.) | Initial Disintegration (minutes) | Significant Disintegration (minutes) | Complete Dispersion (minutes) |
|---|---|---|---|---|
| 1 | 23 | <0.25 | 1 | 2 |
| | 50 | <0.17 | 0.5 | 1 |
| 2 | 23 | 8 | 14 | 19 |
| | 50 | <0.5 | 5 | 8 |
| | 80 | <0.5 | 2 | 5 |
| CE 1 | 23 | 0.5 | >15 | No dispersion of PP |
| | 50 | 0.5 | >15 | No dispersion of PP |
| CE 2 | 23 | 0.5 | >15 | No dispersion of PP |
| | 50 | 0.5 | >15 | No dispersion of PP |
| CE 3 | 23 | <0.5 | 6 | No dispersion of PP |
| | 50 | <0.5 | 4 | No dispersion of PP |

Example 2

A sulfopolyester containing 89 mole %, isophthalic acid, 11 mole % of sodiosulfoisophthalic acid, 72 mole % diethylene glycol, and 28 mole % ethylene glycol with an Ih.V. of 0.4 and a Tg of 35° C. was meltblown through a 6-inch die using conditions similar to those in Table 1. A soft, handleable, flexible web was obtained that did not block during a roll winding operation. Physical properties are provided in Table 2. A small piece (1"×2") of the nonwoven fabric was easily and completely dispersed at 50° C. and 80° C.; at RT (23° C.), the fabric required a longer period of time for complete dispersion as shown by the data in Table 3.

It was found that the compositions in Examples 1 and 2 can be overblown onto other nonwoven substrates. It is also possible to condense and wrap shaped or contoured forms that are used instead of conventional web collectors. Thus, it is possible to obtain circular "roving" or plug forms of the webs.

Comparative Examples 1-3

Pellets of a sulfopolyester containing 89 mole %, isophthalic acid, 11 mole % of sodiosulfoisophthalic acid, 72 mole % diethylene glycol, and 28 mole % ethylene glycol with an Ih.V. of 0.4 and a Tg of 35° C. were combined with polypropylene (Basell PF 008) pellets in bicomponent ratios (by weight %) of:
  75 PP:25 sulfopolyester (Example 3)
  50 PP:50 sulfopolyester (Example 4)
  25 PP:75 sulfopolyester (Example 5)

The PP had a MFR (melt flow rate) of 800. A melt blowing operation was performed on a line equipped with a 24-inch wide die to yield handleable, soft, flexible, but nonblocking webs with the physical properties provided in Table 2. Small pieces (1"×4") of nonwoven fabric readily disintegrated as reported in Table 3. None of the fibers, however, were completely water-dispersible because of the insoluble polypropylene component.

Example 3

A circular piece (4" diameter) of the nonwoven produced in Example 2 was used as an adhesive layer between two sheets of cotton fabric. A Hannifin melt press was used to fuse the two sheets of cotton together by applying a pressure 35 psig at 200° C. for 30 seconds. The resultant assembly exhibited exceptionally strong bond strength. The cotton substrate shredded before adhesive or bond failure. Similar results have also been obtained with other cellulosics and with PET polyester substrates. Strong bonds were also produced by ultrasonic bonding techniques.

Comparative Example 4

A PP (Exxon 3356G) with a 1200 MFR was melt blown using a 24" die to yield a flexible nonwoven fabric that did not block and was easily unwound from a roll. Small pieces (1"×4") did not show any response (i.e., no disintegration or loss in basis weight) to water when immersed in water at RT or 50° C. for 15 minutes.

Example 4

Unicomponent fibers of a sulfopolyester containing 82 mole % isophthalic acid, 18 mole % of sodiosulfoisophthalic acid, 54 mole % diethylene glycol, and 46 mole % 1,4-cyclohexanedimethanol with a Tg of 55° C. were melt spun at melt temperatures of 245° C. (473° F.) on a lab staple spinning line. As-spun denier was approximately 8 d/f. Some blocking was encountered on the take-up tubes, but the 10-filament strand readily dissolved within 10-19 seconds in unagitated, demineralized water at 82° C. and a pH between 5 and 6.

Example 5

Unicomponent fibers obtained from a blend (75:25) of a sulfopolyester containing 82 mole % isophthalic acid, 18 mole % of sodiosulfoisophthalic acid, 54 mole % diethylene glycol, and 46 mole % 1,4-cyclohexanedimethanol (Tg of 55° C.) and a sulfopolyester containing 91 mole % isophthalic acid, 9 mole % of sodiosulfoisophthalic acid, 25 mole % diethylene glycol, and 75 mole % 1,4-cyclohexanedimethanol (Tg of 65° C.), respectively, were melt spun on a lab staple spinning line. The blend has a Tg of 57° C. as calculated by taking a weighted average of the Tg's of the component sulfopolyesters. The 10-filament strands did not show any blocking on the take-up tubes, but readily dissolved within 20-43 seconds in unagitated, demineralized water at 82° C. and a pH between 5 and 6.

Example 6

The blend described in Example 5 was co-spun with PET to yield bicomponent islands-in-the-sea fibers. A configuration was obtained where the sulfopolyester "sea" is 20 weight % of the fiber containing 80 weight % of PET "islands". The spun yarn elongation was 190% immediately after spinning. Blocking was not encountered as the yarn was satisfactorily unwound from the bobbins and processed a week after spinning. In a subsequent operation, the "sea" was dissolved by passing the yarn through an 88° C. soft water bath leaving only fine PET filaments.

Example 7

This prophetic example illustrates the possible application of the multicomponent and microdenier fibers of the present invention to the preparation of specialty papers. The blend described in Example 5 is co-spun with PET to yield bicomponent islands-in-the-sea fibers. The fiber contains approximately 35 weight % sulfopolyester "sea" component and approximately 65 weight % of PET "islands". The uncrimped fiber is cut to ⅛ inch lengths. In simulated papermaking, these short-cut bicomponent fibers are added to the refining operation. The sulfopolyester "sea" is removed in the agitated, aqueous slurry thereby releasing the microdenier PET fibers into the mix. At comparable weights, the microdenier PET fibers ("islands") are more effective to increase paper tensile strength than the addition of coarse PET fibers.

Comparative Example 8

Bicomponent fibers were made having a 108 islands in the sea structure on a spunbond line using a 24" wide bicomponent spinneret die from Hills Inc., Melbourne, Fla., having a total of 2222 die holes in the die plate. Two extruders were connected to melt pumps which were in turn connected to the inlets for both components in the fiber spin die. The primary extruder (A) was connected to the inlet which metered a flow of Eastman F61HC PET polyester to form the island domains in the islands in the sea fiber cross-section structure. The extrusion zones were set to melt the PET entering the die at a temperature of 285° C. The secondary extruder (B) processed Eastman AQ 55S sulfopolyester polymer from Eastman Chemical Company, Kingsport, Tenn. having an inherent viscosity of about 0.35 and a melt viscosity of about 15,000 poise, measured at 240° C. and 1 rad/sec sheer rate and 9,700 poise measured at 240° C. and 100 rad/sec sheer rate in a Rheometric Dynamic Analyzer RDAII (Rheometrics Inc. Piscataway, N.J.) rheometer. Prior to performing a melt viscosity measurement, the sample was dried for two days in a vacuum oven at 60° C. The viscosity test was performed using a 25 mm diameter parallel-plate geometry at 1 mm gap setting. A dynamic frequency sweep was run at a strain rate range of 1 to 400 rad/sec and 10% strain amplitude. Then, the viscosity was measured at 240° C. and strain rate of 1 rad/sec. This procedure was followed in determining the viscosity of the sulfopolyester materials used in the subsequent examples. The secondary extruder was set to melt and feed the AQ 55S polymer at a melt temperature of 255° C. to the spinnerette die. The two polymers were formed into bicomponent extrudates by extrusion at a throughput rate of 0.6 g/hole/min. The volume ratio of PET to AQ 55S in the bicomponent extrudates was adjusted to yield 60/40 and 70/30 ratios.

An aspirator device was used to melt draw the bicomponent extrudates to produce the bicomponent fibers. The flow of air through the aspirator chamber pulled the resultant fibers down. The amount of air flowing downward through the aspirator assembly was controlled by the pressure of the air entering the aspirator. In this example, the maximum pressure of the air used in the aspirator to melt draw the bicomponent extrudates was 25 psi. Above this value, the airflow through the aspirator caused the extrudates to break during this melt draw spinning process as the melt draw rate imposed on the bicomponent extrudates was greater than the inherent ductility of the bicomponent extrudates. The bicomponent fibers were laid down into a non-woven web having a fabric weight of 95 grams per square meter (gsm). Evaluation of the bicomponent fibers in this nonwoven web by optical microscopy showed that the PET was present as islands in the center of the fiber structure, but the PET islands around the outer periphery of the bicomponent fiber nearly coalesced together to form a nearly continuous ring of PET polymer around the circumference of the fibers which is not desirable. Microscopy found that the diameter of the bicomponent fibers in the nonwoven web was generally between 15-19 microns, corresponding to an average fiber as-spun denier of about 2.5 denier per filament (dpf). This represents a melt drawn fiber speed of about 2160 meters per minute. As-spun denier is defined as the denier of the fiber (weight in grams of 9000 meters length of fiber) obtained by the melt extrusion and melt drawing steps. The variation in bicomponent fiber diameter indicated non-uniformity in spun-drawing of the fibers.

The non-woven web samples were conditioned in a forced-air oven for five minutes at 120° C. The heat treated web exhibited significant shrinkage with the area of the nonwoven web being decreased to only about 12% of the initial area of the web before heating. Although not intending to be bound by theory, due to the high molecular weight and melt viscosity of the AQ 55S sulfopolyester used in the fiber, the bicomponent extrudates could not be melt drawn to the degree required to cause strain induced crystallization of the PET segments in the fibers. Overall, the AQ 55S sulfopolyester having this specific inherent viscosity and melt viscosity was not acceptable as the bicomponent extrudates could not be uniformly melt drawn to the desired fine denier.

Example 8

A sulfopolyester polymer with the same chemical composition as commercial Eastman AQ55S polymer was produced, however, the molecular weight was controlled to a lower value characterized by an inherent viscosity of about 0.25. The melt viscosity of this polymer was 3300 poise measured at 240° C. and 1 rad/sec shear rate.

Example 9

Bicomponent extrudates having a 16-segment segmented pie structure were made using a bicomponent spinneret die from Hills Inc., Melbourne, Fla., having a total of 2222 die holes in the 24 inch wide die plate on a spunbond equipment. Two extruders were used to melt and feed two polymers to this spinnerette die. The primary extruder (A) was connected to the inlet which fed Eastman F61HC PET polyester melt to form the domains or segment slices in the segmented pie cross-section structure. The extrusion zones were set to melt the PET entering the spinnerette die at a temperature of 285° C. The secondary extruder (B) melted and fed the sulfopolyester polymer of Example 8. The secondary extruder was set to extrude the sulfopolyester polymer at a melt temperature of 255° C. into the spinnerette die. Except for the spinnerette die used and melt viscosity of the sulfopolyester polymer, the procedure employed in this example was the same as in Comparative Example 8. The melt throughput per hole was 0.6 gm/min. The volume ratio of PET to sulfopolyester in the bicomponent extrudates was set at 70/30 which represents a weight ratio of about 70/30.

The bicomponent extrudates were melt drawn using the same aspirator used in Comparative Example 8 to produce the bicomponent fibers. Initially, the input air to the aspirator was set to 25 psi and the fibers had as-spun denier of about 2.0 with the bicomponent fibers exhibiting a uniform diameter profile of about 14-15 microns. The air to the aspirator was increased to a maximum available pressure of 45 psi without breaking the melt extrudates during melt drawing. Using 45 psi air, the bicomponent extrudates were melt drawn down to a fiber as-spun denier of about 1.2 with the bicomponent fibers exhibiting a diameter of 11-12 microns when viewed under a microscope. The speed during the melt draw process was calculated to be about 4500 m/min. Although not intending to be bound by theory, at melt draw rates approaching this speed, it is believed that strain induced crystallization of the PET during the melt drawing process begins to occur. As noted above, it is desirable to form some oriented crystallinity in the PET fiber segments during the fiber melt draw process so that the nonwoven web will be more dimensionally stable during subsequent processing.

The bicomponent fibers using 45 psi aspirator air pressure were laid down into a nonwoven web with a weight of 140 grams per square meter (gsm). The shrinkage of the non-woven web was measured by conditioning the material in a forced-air oven for five minutes at 120° C. This example represents a significant reduction in shrinkage compared to the fibers and fabric of Comparative Example 8.

This nonwoven web having 140 gsm fabric weight was soaked for five minutes in a static deionized water bath at various temperatures. The soaked nonwoven web was dried, and the percent weight loss due to soaking in deionized water at the various temperatures was measured as shown in Table 4.

TABLE 4

| Soaking Temperature | 25° C. | 33° C. | 40° C. | 72° C. |
|---|---|---|---|---|
| Nonwoven Web Weight Loss (%) | 3.3 | 21.7 | 31.4 | 31.7 |

The sulfopolyester dissipated very readily into deionized water at a temperature of about 25° C. Removal of the sulfopolyester from the bicomponent fibers in the nonwoven web is indicated by the % weight loss. Extensive or complete removal of the sulfopolyester from the bicomponent fibers were observed at temperatures at or above 33° C. If hydroentanglement is used to produce a nonwoven web of these bicomponent fibers comprising the present sulfopolyester polymer of Example 8, it would be expected that the sulfopolyester polymer would be extensively or completely removed by the hydroentangling water jets if the water temperature was above ambient. If it is desired that very little sulfopolyester polymer be removed from these bicomponent fibers during the hydroentanglement step, low water temperature, less than about 25° C., should be used.

Example 10

A sulfopolyester polymer was prepared with the following diacid and diol composition: diacid composition (71 mole % terephthalic acid, 20 mole % isophthalic acid, and 9 mole % 5-(sodiosulfo) isophthalic acid) and diol composition (60 mole % ethylene glycol and 40 mole % diethylene glycol). The sulfopolyester was prepared by high temperature polyesterification under vacuum. The esterification conditions were controlled to produce a sulfopolyester having an inherent viscosity of about 0.31. The melt viscosity of this sulfopolyester was measured to be in the range of about 3000-4000 poise at 240° C. and 1 rad/sec shear rate.

Example 11

The sulfopolyester polymer of Example 10 was spun into bicomponent segmented pie fibers and nonwoven web according to the same procedure described in Example 9. The primary extruder (A) fed Eastman F61HC PET polyester melt to form the larger segment slices in the segmented pie structure. The extrusion zones were set to melt the PET entering the spinnerette die at a temperature of 285° C. The secondary extruder (B) processed the sulfopolyester polymer of Example 10 which was fed at a melt temperature of 255° C. into the spinnerette die. The melt throughput rate per hole was 0.6 gm/min. The volume ratio of PET to sulfopolyester in the bicomponent extrudates was set at 70/30 which represents the weight ratio of about 70/30. The cross-section of the bicomponent extrudates had wedge shaped domains of PET with sulfopolyester polymer separating these domains.

The bicomponent extrudates were melt drawn using the same aspirator assembly used in Comparative Example 8 to produce the bicomponent fiber. The maximum available pressure of the air to the aspirator without breaking the bicomponent fibers during drawing was 45 psi. Using 45 psi air, the bicomponent extrudates were melt drawn down to bicomponent fibers with as-spun denier of about 1.2 with the bicomponent fibers exhibiting a diameter of about 11-12 microns when viewed under a microscope. The speed during the melt drawing process was calculated to be about 4500 m/min.

The bicomponent fibers were laid down into nonwoven webs having weights of 140 gsm and 110 gsm. The shrinkage of the webs was measured by conditioning the material in a forced-air oven for five minutes at 120° C. The area of the nonwoven webs after shrinkage was about 29% of the webs' starting areas.

Microscopic examination of the cross section of the melt drawn fibers and fibers taken from the nonwoven web displayed a very good segmented pie structure where the individual segments were clearly defined and exhibited similar size and shape. The PET segments were completely separated from each other so that they would form eight separate PET monocomponent fibers having a pie-slice shape after removal of the sulfopolyester from the bicomponent fiber.

The nonwoven web, having 110 gsm fabric weight, was soaked for eight minutes in a static deionized water bath at various temperatures. The soaked nonwoven web was dried and the percent weight loss due to soaking in deionized water at the various temperatures was measured as shown in Table 5.

TABLE 5

| Soaking Temperature | 36° C. | 41° C. | 46° C. | 51° C. | 56° C. | 72° C. |
|---|---|---|---|---|---|---|
| Nonwoven Web Weight Loss (%) | 1.1 | 2.2 | 14.4 | 25.9 | 28.5 | 30.5 |

The sulfopolyester polymer dissipated very readily into deionized water at temperatures above about 46° C., with the removal of the sulfopolyester polymer from the fibers being very extensive or complete at temperatures above 51° C. as shown by the weight loss. A weight loss of about 30% represented complete removal of the sulfopolyester from the bicomponent fibers in the nonwoven web. If hydroentanglement is used to process this non-woven web of bicomponent fibers comprising this sulfopolyester, it would be expected that the polymer would not be extensively removed by the hydroentangling water jets at water temperatures below 40° C.

Example 12

The nonwoven webs of Example 11 having basis weights of both 140 gsm and 110 gsm were hydroentangled using a hydroentangling apparatus manufactured by Fleissner, GmbH, Egelsbach, Germany. The machine had five total hydroentangling stations wherein three sets of jets contacted the top side of the nonwoven web and two sets of jets contacted the opposite side of the nonwoven web. The water jets comprised a series of fine orifices about 100 microns in diameter machined in two-feet wide jet strips. The water pressure to the jets was set at 60 bar (Jet Strip #1), 190 bar (Jet Strips #2 and 3), and 230 bar (Jet Strips #4 and 5). During the hydroentanglement process, the temperature of the water to the jets was found to be in the range of about 40-45° C. The nonwoven fabric exiting the hydroentangling unit was strongly tied together. The continuous fibers were knotted together to produce a hydroentangled nonwoven fabric with high resistance to tearing when stretched in both directions.

Next, the hydroentangled nonwoven fabric was fastened onto a tenter frame comprising a rigid rectangular frame with a series of pins around the periphery thereof. The fabric was fastened to the pins to restrain the fabric from shrinking as it was heated. The frame with the fabric sample was placed in a forced-air oven for three minutes at 130° C. to cause the fabric to heat set while being restrained. After heat setting, the conditioned fabric was cut into a sample specimen of measured size, and the specimen was conditioned at 130° C. without restraint by a tenter frame. The dimensions of the hydroentangled nonwoven fabric after this conditioning were measured and only minimal shrinkage (<0.5% reduction in dimension) was observed. It was apparent that heat setting of the hydroentangled nonwoven fabric was sufficient to produce a dimensionally stable nonwoven fabric.

The hydroentangled nonwoven fabric, after being heat set as described above, was washed in 90° C. deionized water to remove the sulfopolyester polymer and leave the PET monocomponent fiber segments remaining in the hydroentangled fabric. After repeated washings, the dried fabric exhibited a weight loss of approximately 26%. Washing the nonwoven web before hydroentangling demonstrated a weight loss of 31.3%. Therefore, the hydroentangling process removed some of the sulfopolyester from the nonwoven web, but this amount was relatively small. In order to lessen the amount of sulfopolyester removed during hydroentanglement, the water temperature of the hydroentanglement jets should be lowered to below 40° C.

The sulfopolyester of Example 10 was found to give segmented pie fibers having good segment distribution where the water non-dispersable polymer segments formed individual fibers of similar size and shape after removal of the sulfopolyester polymer. The rheology of the sulfopolyester was suitable to allow the bicomponent extrudates to be melt drawn at high rates to achieve fine denier bicomponent fibers with as-spun denier as low as about 1.0. These bicomponent fibers are capable of being laid down into a non-woven web which could be hydroentangled without experiencing significant loss of sulfopolyester polymer to produce the nonwoven fabric. The nonwoven fabric produced by hydroentangling the non-woven web exhibited high strength and could be heat set at temperatures of about 120° C. or higher to produce nonwoven fabric with excellent dimensional stability. The sulfopolyester polymer was removed from the hydroentangled nonwoven fabric in a washing step. This resulted in a strong nonwoven fabric product with lighter fabric weight and much greater flexibility and softer hand. The monocomponent PET fibers in this nonwoven fabric product were wedge shaped and exhibited an average denier of about 0.1.

Example 13

A sulfopolyester polymer was prepared with the following diacid and diol composition: diacid composition (69 mole % terephthalic acid, 22.5 mole % isophthalic acid, and 8.5 mole % 5-(sodiosulfo) isophthalic acid) and diol composition (65 mole % ethylene glycol and 35 mole % diethylene glycol). The sulfopolyester was prepared by high temperature polyesterification under vacuum. The esterification conditions were controlled to produce a sulfopolyester having an inherent viscosity of about 0.33. The melt viscosity of this sulfopolyester was measured to be in the range of about 3000-4000 poise at 240° C. and 1 rad/sec shear rate.

Example 14

The sulfopolyester polymer of Example 13 was spun into bicomponent islands-in-sea cross-section configuration with 16 islands on a spunbond line. The primary extruder (A) fed Eastman F61HC PET polyester melt to form the islands in the islands-in-sea structure. The extrusion zones were set to melt the PET entering the spinnerette die at a temperature of about 290° C. The secondary extruder (B) processed the sulfopolyester polymer of Example 13 which was fed at a melt temperature of about 260° C. into the spinnerette die. The volume ratio of PET to sulfopolyester in the bicomponent extrudates was set at 70/30 which represents the weight ratio of about 70/30. The melt throughput rate through the spinneret was 0.6 g/hole/minute. The cross-section of the bicomponent extrudates had round shaped island domains of PET with sulfopolyester polymer separating these domains.

The bicomponent extrudates were melt drawn using an aspirator assembly. The maximum available pressure of the air to the aspirator without breaking the bicomponent fibers during melt drawing was 50 psi. Using 50 psi air, the bicomponent extrudates were melt drawn down to bicomponent fibers with as-spun denier of about 1.4 with the bicomponent fibers exhibiting a diameter of about 12 microns when viewed under a microscope. The speed during the drawing process was calculated to be about 3900 m/min.

Example 15

The sulfopolyester polymer of Example 13 was spun into bicomponent islands-in-the-sea cross-section fibers with 64 islands fibers using a bicomponent extrusion line. The primary extruder fed Eastman F61HC polyester melt to form the islands in the islands-in-the-sea fiber cross-section structure. The secondary extruder fed the sulfopolyester polymer melt to form the sea in the islands-in-sea bicomponent fiber. The inherent viscosity of polyester was 0.61 dL/g while the melt viscosity of dry sulfopolyester was about 7000 poise measured at 240° C. and 1 rad/sec strain rate using the melt viscosity measurement procedure described earlier. These islands-in-sea bicomponent fibers were made using a spinneret with 198 holes and a throughput rate of 0.85 gms/minute/hole. The polymer ratio between "islands" polyester and "sea" sulfopolyester was 65% to 35%. These bicomponent fibers were spun using an extrusion temperature of 280° C. for the polyester component and 260° C. for the sulfopolyester component. The bicomponent fiber contains a multiplicity of filaments (198 filaments) and was melt spun at a speed of about 530 meters/minute, forming filaments with a nominal denier per filament of about 14. A finish solution of 24 weight % PT 769 finish from Goulston Technologies was applied to the bicomponent fiber using a kiss roll applicator. The filaments of the bicomponent fiber were then drawn in line using a set of two godet rolls, heated to 90° C. and 130° C. respectively, and the final draw roll operating at a speed of about 1750 meters/minute, to provide a filament draw ratio of about 3.3× forming the drawn islands-in-sea bicomponent filaments with a nominal denier per filament of about 4.5 or an average diameter of about 25 microns. These filaments comprised the polyester microfiber "islands" having an average diameter of about 2.5 microns.

Example 16

The drawn islands-in-sea bicomponent fibers of Example 15 were cut into short length fibers of 3.2 millimeters and 6.4 millimeters cut lengths, thereby, producing short length bicomponent fibers with 64 islands-in-sea cross-section configurations. These short cut bicomponent fibers comprised "islands" of polyester and "sea" of water dispersible sulfopolyester polymer. The cross-sectional distribution of islands and sea was essentially consistent along the length of these short cut bicomponent fibers.

Example 17

The drawn islands-in-sea bicomponent fibers of Example 15 were soaked in soft water for about 24 hours and then cut into short length fibers of 3.2 millimeters and 6.4 millimeters cut lengths. The water dispersible sulfopolyester was at least partially emulsified prior to cutting into short length fibers. Partial separation of islands from the sea component was therefore effected, thereby, producing partially emulsified short length islands-in-sea bicomponent fibers.

Example 18

The short cut length islands-in-sea bicomponent fibers of Example 16 were washed using soft water at 80° C. to remove the water dispersible sulfopolyester "sea" component, thereby, releasing the polyester microfibers which were the "islands" component of the bicomponent fibers. The washed polyester microfibers were rinsed using soft water at 25° C. to essentially remove most of the "sea" component. The optical microscopic observation of the washed polyester microfibers showed an average diameter of about 2.5 microns and lengths of 3.2 and 6.4 millimeters.

Example 19

The short cut length partially emulsified islands-in-sea bicomponent fibers of Example 17 were washed using soft water at 80° C. to remove the water dispersible sulfopolyester "sea" component, thereby, releasing the polyester microfibers which were the "islands" component of the fibers. The washed polyester microfibers were rinsed using soft water at 25° C. to essentially remove most of the "sea" component. The optical microscopic observation of the washed polyester microfibers showed polyester microfibers of average diameter of about 2.5 microns and lengths of 3.2 and 6.4 millimeters.

Comparative Example 20

Wet-laid hand sheets were prepared using the following procedure. 7.5 gms of Albacel Southern Bleached Softwood Kraft (SBSK) from International Paper, Memphis, Tenn., U.S.A. and 188 gms of room temperature water were placed in a 1000 ml pulper and pulped for 30 seconds at 7000 rpm to produce a pulped mixture. This pulped mixture was transferred into an 8 liter metal beaker along with 7312 gms of room temperature water to make about 0.1% consistency (7500 gms water and 7.5 gms fibrous material) pulp slurry. This pulp slurry was agitated using a high speed impeller mixer for 60 seconds. Procedure to make the hand sheet from this pulp slurry was as follows. The pulp slurry was poured into a 25 centimeters×30 centimeters hand sheet mold while continuing to stir. The drop valve was pulled, and the pulp fibers were allowed to drain on a screen to form a hand sheet. 750 grams per square meter (gsm) blotter paper was placed on top of the formed hand sheet, and the blotter paper was flattened onto the hand sheet. The screen frame was raised and inverted onto a clean release paper and allowed to sit for 10 minutes. The screen was raised vertically away from the formed hand sheet. Two sheets of 750 gsm blotter paper were placed on top of the formed hand sheet. The hand sheet was dried along with the three blotter papers using a Norwood Dryer at about 88° C. for 15 minutes. One blotter paper was removed leaving one blotter paper on each side of the hand sheet. The hand sheet was dried using a Williams Dryer at 65° C. for 15 minutes. The hand sheet was then further dried for 12 to 24 hours using a 40 kg dry press. The blotter paper was removed to obtain the dry hand sheet sample. The hand sheet was trimmed to 21.6 centimeters by 27.9 centimeters dimensions for testing.

Comparative Example 21

Wet-laid hand sheets were prepared using the following procedure. 7.5 gms of Albacel Southern Bleached Softwood Kraft (SBSK) from International Paper, Memphis, Tenn., U.S.A., 0.3 gms of Solivitose N pre-gelatinized quaternary cationic potato starch from Avebe, Foxhol, the Netherlands, and 188 gms of room temperature water were placed in a 1000 ml pulper and pulped for 30 seconds at 7000 rpm to produce a pulped mixture. This pulped mixture was transferred into an 8 liter metal beaker along with 7312 gms of room temperature water to make about 0.1% consistency (7500 gms water and 7.5 gms fibrous material) to produce a pulp slurry. This pulp slurry was agitated using a high speed impeller mixer for 60 seconds. The rest of procedure for making hand sheet from this pulp slurry was same as in Example 20.

Example 22

Wet-laid hand sheets were prepared using the following procedure. 6.0 gms of Albacel Southern Bleached Softwood Kraft (SBSK) from International Paper, Memphis, Tenn., U.S.A., 0.3 gms of Solivitose N pre-gelatinized quaternary cationic potato starch from Avebe, Foxhol, the Netherlands, 1.5 gms of 3.2 millimeter cut length islands-in-sea fibers of Example 16, and 188 gms of room temperature water were placed in a 1000 ml pulper and pulped for 30 seconds at 7000 rpm to produce a fiber mix slurry. This fiber mix slurry was heated to 82° C. for 10 seconds to emulsify and remove the water dispersible sulfopolyester component in the islands-in-sea fibers and release polyester microfibers. The fiber mix slurry was then strained to produce a sulfopolyester dispersion comprising the sulfopolyester and a microfiber-containing mixture comprising pulp fibers and polyester microfiber. The microfiber-containing mixture was further rinsed using 500 gms of room temperature water to further remove the water dispersible sulfopolyester from the microfiber-containing mixture. This microfiber-containing mixture was transferred into an 8 liter metal beaker along with 7312 gms of room temperature water to make about 0.1% consistency (7500 gms water and 7.5 gms fibrous material) to produce a microfiber-containing slurry. This microfiber-containing slurry was agitated using a high speed impeller mixer for 60 seconds. The rest of procedure for making hand sheet from this microfiber-containing slurry was same as in Example 20.

Comparative Example 23

Wet-laid hand sheets were prepared using the following procedure. 7.5 gms of MicroStrand 475-106 micro glass fiber available from Johns Manville, Denver, Colo., U.S.A., 0.3 gms of Solivitose N pre-gelatinized quaternary cationic potato starch from Avebe, Foxhol, the Netherlands, and 188 gms of room temperature water were placed in a 1000 ml pulper and pulped for 30 seconds at 7000 rpm to produce a glass fiber mixture. This glass fiber mixture was transferred into an 8 liter metal beaker along with 7312 gms of room temperature water to make about 0.1% consistency (7500 gms water and 7.5 gms fibrous material) to produce a glass fiber slurry. This glass fiber slurry was agitated using a high speed impeller mixer for 60 seconds. The rest of procedure for making hand sheet from this glass fiber slurry was same as in Example 20.

Example 24

Wet-laid hand sheets were prepared using the following procedure. 3.8 gms of MicroStrand 475-106 micro glass fiber available from Johns Manville, Denver, Colo., U.S.A., 3.8 gms of 3.2 millimeter cut length islands-in-sea fibers of Example 16, 0.3 gms of Solivitose N pre-gelatinized quaternary cationic potato starch from Avebe, Foxhol, the Netherlands, and 188 gms of room temperature water were placed in a 1000 ml pulper and pulped for 30 seconds at 7000 rpm to produce a fiber mix slurry. This fiber mix slurry was heated to 82° C. for 10 seconds to emulsify and remove the water dispersible sulfopolyester component in the islands-in-sea bicomponent fibers and release polyester microfibers. The fiber mix slurry was then strained to produce a sulfopolyester dispersion comprising the sulfopolyester and a microfiber-containing mixture comprising glass microfibers and polyester microfiber. The microfiber-containing mixture was further rinsed using 500 gms of room temperature water to further remove the sulfopolyester from the microfiber-containing mixture. This microfiber-containing mixture was transferred into an 8 liter metal beaker along with 7312 gms of room temperature water to make about 0.1% consistency (7500 gms water and 7.5 gms fibrous material) to produce a microfiber-containing slurry. This microfiber-containing slurry was agitated using a high speed impeller mixer for 60 seconds. The rest of procedure for making hand sheet from this microfiber-containing slurry was same as in Example 20.

Example 25

Wet-laid hand sheets were prepared using the following procedure. 7.5 gms of 3.2 millimeter cut length islands-in-sea fibers of Example 16, 0.3 gms of Solivitose N pre-gelatinized quaternary cationic potato starch from Avebe, Foxhol, the Netherlands, and 188 gms of room temperature water were placed in a 1000 ml pulper and pulped for 30 seconds at 7000 rpm to produce a fiber mix slurry. This fiber mix slurry was heated to 82° C. for 10 seconds to emulsify and remove the water dispersible sulfopolyester component in the islands-in-sea fibers and release polyester microfibers. The fiber mix slurry was then strained to produce a sulfopolyester dispersion and polyester microfibers. The sulfopolyester dispersion was comprised of water dispersible sulfopolyester. The polyester microfibers were rinsed using 500 gms of room temperature water to further remove the sulfopolyester from the polyester microfibers. These polyester microfibers were transferred into an 8 liter metal beaker along with 7312 gms of room temperature water to make about 0.1% consistency (7500 gms water and 7.5 gms fibrous material) to produce a microfiber slurry. This microfiber slurry was agitated using a high speed impeller mixer for 60 seconds. The rest of procedure for making hand sheet from this microfiber slurry was same as in Example 20.

The hand sheet samples of Examples 20-25 were tested and properties are provided in the following table.

TABLE 6

| Ex. No. | Composition | Basis Weight (gsm) | Hand Sheet Thickness (mm) | Density gm/ (cc) | Porosity Greiner (seconds/ 100 cc) | Tensile Strength kg/15 (mm) | Elongation to Break (%) | Tensile x Elongation |
|---|---|---|---|---|---|---|---|---|
| 20 | 100% SBSK | 94 | 0.45 | 0.22 | 4 | 1.0 | 7 | 7 |
| 21 | SBSK + 4% Starch | 113 | 0.44 | 0.22 | 4 | 1.5 | 7 | 11 |
| 22 | 80% SBSK + Starch + 20% 3.2 mm polyester microfibers of Example 19 | 116 | 0.30 | 0.33 | 4 | 2.2 | 9 | 20 |
| 23 | 100% Glass Micro-Strand 475-106 + Starch | 103 | 0.68 | 0.15 | 4 | 0.2 | 15 | 3 |
| 24 | 50% Glass Micro-stand 475-106 + 50% 3.2 mm polyester microfibers of Example 19 + Starch | 104 | 0.45 | 0.22 | 4 | 1.4 | 7 | 10 |
| 25 | 100% 3.2 mm polyester microfibers of Example 19 | 80 | 0.38 | 0.26 | 4 | 3.0 | 15 | 44 |

The hand sheet basis weight was determined by weighing the hand sheet and calculating weight in grams per square meter (gsm). Hand sheet thickness was measured using an Ono Sokki EG-233 thickness gauge and reported as thickness in millimeters. Density was calculated as weight in grams per cubic centimeter. Porosity was measured using a Greiner Porosity Manometer with 1.9×1.9 cm square opening head and 100 cc capacity. Porosity is reported as average time in seconds (4 replicates) for 100 cc of water to pass through the sample. Tensile properties were measured using an Instron Model™ for six 30 mm×105 mm test strips. An average of six measurements is reported for each example. It can be observed from these test data that significant improvement in tensile properties of wet-laid fibrous structures is obtained by the addition of polyester microfibers of the current invention.

Example 26

The sulfopolyester polymer of Example 13 was spun into bicomponent islands-in-the-sea cross-section fibers with 37 islands fibers using a bicomponent extrusion line. The primary extruder fed Eastman F61HC polyester to form the "islands" in the islands-in-the-sea cross-section structure. The secondary extruder fed the water dispersible sulfopolyester polymer to form the "sea" in the islands-in-sea bicomponent fiber. The inherent viscosity of the polyester was 0.61 dL/g while the melt viscosity of dry sulfopolyester was about 7000 poise measured at 240° C. and 1 rad/sec strain rate using the melt viscosity measurement procedure described previously. These islands-in-sea bicomponent fibers were made using a spinneret with 72 holes and a throughput rate of 1.15 gms/minute/hole. The polymer ratio between "islands" polyester and "sea" sulfopolyester was 2 to 1. These bicomponent fibers were spun using an extrusion temperature of 280° C. for the polyester component and 255° C. for the water dispersible sulfopolyester component. This bicomponent fiber contained a multiplicity of filaments (198 filaments) and was melt spun at a speed of about 530 meters/minute forming filaments with a nominal denier per filament of 19.5. A finish solution of 24% by weight PT 769 finish from Goulston Technologies was applied to the bicomponent fiber using a kiss roll applicator. The filaments of the bicomponent fiber were then drawn in line using a set of two godet rolls, heated to 95° C. and 130° C. respectively, and the final draw roll operating at a speed of about 1750 meters/minute, to provide a filament draw ratio of about 3.3× forming the drawn islands-in-sea bicomponent filaments with a nominal denier per filament of about 5.9 or an average diameter of about 29 microns. These filaments comprised the polyester microfiber islands of average diameter of about 3.9 microns.

Example 27

The drawn islands-in-sea bicomponent fibers of Example 26 were cut into short length bicomponent fibers of 3.2 millimeters and 6.4 millimeters cut length, thereby, producing short length fibers with 37 islands-in-sea cross-section configurations. These fibers comprised "islands" of polyester and "sea" of water dispersible sulfopolyester polymers. The cross-sectional distribution of "islands" and "sea" was essentially consistent along the length of these bicomponent fibers.

Example 28

The short cut length islands-in-sea fibers of Example 27 were washed using soft water at 80° C. to remove the water dispersible sulfopolyester "sea" component, thereby, releasing the polyester microfibers which were the "islands" component of the bicomponent fibers. The washed polyester microfibers were rinsed using soft water at 25° C. to essentially remove most of the "sea" component. The optical microscopic observation of the washed polyester microfibers had an average diameter of about 3.9 microns and lengths of 3.2 and 6.4 millimeters.

Example 29

The sulfopolyester polymer of Example 13 was spun into bicomponent islands-in-the-sea cross-section fibers with 37 islands fibers using a bicomponent extrusion line. The primary extruder fed polyester to form the "islands" in the islands-in-the-sea fiber cross-section structure. The secondary extruder fed the water dispersible sulfopolyester polymer to form the "sea" in the islands-in-sea bicomponent fiber. The inherent viscosity of the polyester was 0.52 dL/g while the melt viscosity of the dry water dispersible sulfopolyester was about 3500 poise measured at 240° C. and 1 rad/sec strain rate using the melt viscosity measurement procedure described previously. These islands-in-sea bicomponent fibers were made using two spinnerets with 175 holes each and throughput rate of 1.0 gms/minute/hole. The polymer ratio between "islands" polyester and "sea" sulfopolyester was 70% to 30%. These bicomponent fibers were spun using an extrusion temperature of 280° C. for the polyester component and 255° C. for the sulfopolyester component. The bicomponent fibers contained a multiplicity of filaments (350 filaments) and were melt spun at a speed of about 1000 meters/minute using a take-up roll heated to 100° C. forming filaments with a nominal denier per filament of about 9 and an average fiber diameter of about 36 microns. A finish solution of 24 weight % PT 769 finish was applied to the bicomponent fiber using a kiss roll applicator. The filaments of the bicomponent fiber were combined and were then drawn 3.0× on a draw line at draw roll speed of 100 m/minute and temperature of 38° C. forming drawn islands-in-sea bicomponent filaments with an average denier per filament of about 3 and average diameter of about 20 microns. These drawn island-in-sea bicomponent fibers were cut into short length fibers of about 6.4 millimeters length. These short length islands-in-sea bicomponent fibers were comprised of polyester microfiber "islands" of average diameter of about 2.8 microns.

Example 30

The short cut length islands-in-sea bicomponent fibers of Example 29 were washed using soft water at 80° C. to remove the water dispersible sulfopolyester "sea" component, thereby, releasing the polyester microfibers which were the "islands" component of the fibers. The washed polyester microfibers were rinsed using soft water at 25° C. to essentially remove most of the "sea" component. The optical microscopic observation of washed fibers showed polyester microfibers of average diameter of about 2.8 microns and lengths of about 6.4 millimeters.

Example 31

Wet-laid microfiber stock hand sheets were prepared using the following procedure. 56.3 gms of 3.2 millimeter cut length islands-in-sea bicomponent fibers of Example 16, 2.3 gms of Solivitose N pre-gelatinized quaternary cationic potato starch from Avebe, Foxhol, the Netherlands, and 1410 gms of room temperature water were placed in a 2 liter beaker to produce a fiber slurry. The fiber slurry was stirred. One quarter amount of this fiber slurry, about 352 ml, was placed in 1000 ml pulper and pulped for 30 seconds at 7000 rpm. This fiber slurry was heated to 82° C. for 10 seconds to emulsify and remove the water dispersible sulfopolyester component in the islands-in-sea bicomponent fibers and release polyester microfibers. The fiber slurry was then strained to produce a sulfopolyester dispersion and polyester microfibers. These polyester microfibers were rinsed using 500 gms of room temperature water to further remove the sulfopolyester from the polyester microfibers. Sufficient room temperature water was added to produce 352 ml of microfiber slurry. This microfiber slurry was re-pulped for 30 seconds at 7000 rpm. These microfibers were transferred into an 8 liter metal beaker. The remaining three quarters of the fiber slurry were similarly pulped, washed, rinsed and re-pulped and transferred to the 8 liter metal beaker. 6090 gms of room temperature water was then added to make about 0.49% consistency (7500 gms water and 36.6 gms of polyester microfibers) to produce a microfiber slurry. This microfiber slurry was agitated using a high speed impeller mixer for 60 seconds. The rest of procedure for making hand sheet from this microfiber slurry was same as in Example 20. The microfiber stock hand sheet with the basis weight of about 490 gsm was comprised of polyester microfibers of average diameter of about 2.5 microns and average length of about 3.2 millimeters.

Example 32

Wet-laid hand sheets were prepared using the following procedure. 7.5 gms of polyester microfiber stock hand sheet of Example 31, 0.3 gms of Solivitose N pre-gelatinized quaternary cationic potato starch from Avebe, Foxhol, the Netherlands, and 188 gms of room temperature water were placed in a 1000 ml pulper and pulped for 30 seconds at 7000 rpm. The microfibers were transferred into an 8 liter metal beaker along with 7312 gms of room temperature water to make about 0.1% consistency (7500 gms water and 7.5 gms fibrous material) to produce a microfiber slurry. This microfiber slurry was agitated using a high speed impeller mixer for 60 seconds. The rest of procedure for making hand sheet from this slurry was same as in Example 20. A 100 gsm wet-laid hand sheet of polyester microfibers was obtained having an average diameter of about 2.5 microns.

Example 33

The 6.4 millimeter cut length islands-in-sea bicomponent fibers of Example 29 were washed using soft water at 80° C. to remove the water dispersible sulfopolyester "sea" component, thereby, releasing the polyester microfibers which were the "islands" component of the bicomponent fibers. The washed polyester microfibers were rinsed using soft water at 25° C. to essentially remove most of the "sea" component. The optical microscopic observation of the washed polyester microfibers showed an average diameter of about 2.5 microns and lengths of 6.4 millimeters.

Example 34

The short cut length islands-in-sea bicomponent fibers of Example 16, Example 27 and Example 29 were washed separately using soft water at 80° C. containing about 1% by weight based on the weight of the bicomponent fibers of ethylene diamine tetra acetic acid tetra sodium salt ($Na_4$ EDTA) from Sigma-Aldrich Company, Atlanta, Ga. to remove the water dispersible sulfopolyester "sea" component, thereby, releasing the polyester microfibers which were the "islands" component of the bicomponent fibers. The addition of at least one water softener, such as $Na_4$ EDTA, aids in the removal of the water dispersible sulfopolyester polymer from the islands-in-sea bicomponent fibers. The washed polyester microfibers were rinsed using soft water at 25° C. to essentially remove most of the "sea" component. The optical microscopic observation of washed polyester microfibers showed excellent release and separation of polyester microfibers. Use of a water softing agent, such as $Na_4$ EDTA in the water prevents any $Ca^{++}$ ion exchange on the sulfopolyester which can adversely affect the water dispersiblity of sulfopolyester. Typical soft water may contain up to 15 ppm of $Ca^{++}$ ion concentration. It is desirable that the soft water used in the processes described here should have essentially zero concentration of $Ca^{++}$ and other multi-valent ions or alternately use sufficient amount of water softening agent, such as $Na_4$ EDTA, to bind these $Ca^{++}$ ions and other multi-valent ions. These polyester microfibers can be used in preparing the wet-laid sheets using the procedures of examples disclosed previously.

Example 35

The short cut length islands-in-sea bicomponent fibers of Example 16 and Example 27 were processed separately using the following procedure. 17 grams of Solivitose N pre-gelatinized quaternary cationic potato starch from Avebe, Foxhol, the Netherlands were added to the distilled water. After the starch was fully dissolved or hydrolyzed, then 429 grams of short cut length islands-in-sea bicomponent fibers were slowly added to the distilled water to produce a fiber slurry. A Williams Rotary Continuous Feed Refiner (5 inch diameter) was turned on to refine or mix the fiber slurry in order to provide sufficient shearing action for the water dispersible sulfopolyester to be separated from the polyester microfibers. The contents of the stock chest were poured into a 24 liter stainless steel container, and the lid was secured. The stainless steel container was placed on a propane cooker and heated until the fiber slurry began to boil at about 97° C. in order to remove the sulfopolyester component in the island-in-sea fibers and release polyester microfibers. After the fiber slurry reached boiling, it was agitated with a manual agitating paddle. The contents of the stainless steel container were poured into a 27 in×15 in×6 in deep False Bottom Knuche with a 30 mesh screen to produce a sulfopolyester dispersion and polyester microfibers. The sulfopolyester dispersion comprised water and water dispersible sulfopolyester. The polyester microfibers were rinsed in the Knuche for 15 seconds with 10 liters of soft water at 17° C., and squeezed to remove excess water.

20 grams of polyester microfiber (dry fiber basis) was added to 2000 ml of water at 70° C. and agitated using a 2 liter 3000 rpm ¾ horse power hydropulper manufactured by Hermann Manufacturing Company for 3 minutes (9,000 revolutions) to make a microfiber slurry of 1% consistency. Handsheets were made using the procedure described previously in Example 20.

The optical and scanning electron microscopic observation of these handsheets showed excellent separation and formation of polyester microfibers.

Example 36

This example covers opening of bicomponent islands in the sea (INS) fibers extruded in a manner to form 4.5 denier per filament fibers with each filament having 37 PET islands comprised of Eastman F-61HC polyester and a sea fraction comprised of Eastman sulfopolyester polymer. The ratio of polyester component to sulfopolyester sea component was 70 PET/30 sulfopolyester. The fibers were produced using a bicomponent islands in the sea spin pack manufactured by Hills Inc. (Melbourne, Fl). Extrusion and draw conditions were adjusted to achieve a nominal 22 micron overall starting fiber where a 2.0 micron average diameter of the individual islands was targeted. Drawn yarns were produced which were cut into 1.5 mm long staple fibers. The bicomponent fibers were cut to a 1.5 mm overall length to product cut bicomponent fibers, and were used in evaluation to produce opened microfibers comprised of individual 3.0 micron individual PET islands after the opening process.

Bicomponent fibers comprised of 37 INS filaments cut to 1.5 mm length were opened using a batch opening process to remove the sulfopolyester sea component which was the binder holding together the 37 PET islands in the cut bicomponent fiber. In the opening process of Example 36, a 20 kg. charge of deionized water was added to a 10 gallon laboratory hydropulper (Adirondack Machinery Co.) and heated to 79° C. by addition of low pressure steam while agitating using a 30% speed setting. When the deionized water reached 79° C., 400 grams of the 37 INS cut bicomponent fiber were quickly added to the agitated water, and a timer started after all the cut bicomponent fiber was added. After 10 seconds of agitation, a nominal 400 cc sample of the opened microfiber slurry was withdrawn and immediately screened using a colander to quickly separate the microfiber product from the first mother liquor containing sulfopolyester polymer that was removed during the 10 second contact in 79° C. water. The microfiber product sample was pressed against the screen to dewater the microfiber product down to about 20%-25% moisture content. Samples were withdrawn from the hydropulper after 20 seconds, after 60 seconds, and after 120 seconds mixing time, and each sample was similarly screened to recover the first mother liquor separated from the microfiber product.

The degree of removal of the sulfopolyester sea component was evaluated by measuring the solids content of the first mother liquor recovered from each of the four test samples. In the process, the % solids level in the final samples taken after long 120 seconds contact time represent conditions where the maximum amount of sulfopolyester is removed from the starting cut bicomponent fiber near quantitative removal. The solids content in each sample was measured by measuring the weight of a 3 inch×5 inch aluminum pan (+/−0.001 g) and then adding 100.0 grams of the first mother liquor sample containing the removed sulfopolyester. Water was boiled off using a hot plate at a moderate rate to prevent bumping the liquid out of the pan. After removing almost all of the water on a hot plate, the sample pan containing the polymer residue was further dried to a uniform moisture level by placing the pan in a forced air oven at 180° C. for 5 minutes to condition the residue to uniform moisture content. The pan was reweighed (+/−0.001 g), and the weight of the residue calculated by subtracting the starting pan weight. Solids content was calculated by dividing the residue weight by the starting sample weight.

The variation of solids in the first mother liquor recovered from the opening process of Example 36 is shown in FIG. 8.

After the sulfopolyester polymer is quantitatively removed from the cut multicomponent fibers, the solids residue in the first mother liquor will not increase. Test results found minimal increase in solids content in the first mother liquor recovered after the first 10 second sample was withdrawn. Differences in the solids level of samples withdrawn at 20 seconds, 60 seconds, and 120 seconds are within testing variability. Removal efficiency after only 10 seconds contact in 79° C. water was 95% or within 5% of the removal level considered quantitative. In Example 36, the sulfopolyester sea component was effectively removed from 37 INS cut bicomponent fiber at 4.5 dpf using contact time of 15 seconds or shorter in agitated water at 79° C.

Example 37

The process of Example 36 was repeated with the variation that the speed setting of the Adirondack hydropulper was increased from 30% setting to an 80% setting to improve the mixing of the 37 INS cut bicomponent fiber in the deionized water heated to 79° C. A sulfopolyester removal profile similar to FIG. 8 was observed where the % solids value of the initial 10 second sample was within the testing precision of the later solids values, indicating quantitative sulfopolyester removal after 10 seconds contact time at 79° C.

Example 38

The 37 INS bicomponent fiber opening process was run in the same manner as Example 36 with the modification that the temperature of the deionized water contacting the cut bicomponent fiber was reduced to 74° C. or 5° C. lower than the temperature used in Example 36. The variation of solids in the first mother liquor recovered from the opening process of this Example 38 is shown in FIG. 9.

Samples withdrawn after 20 seconds, 60 seconds, and 120 seconds displayed solids content consistent with quantitative removal of the sulfopolyester from the cut bicomponent fiber. Even at 10 seconds contact at 74° C., sulfopolyester removal was within 5% of quantitative removal, indicating fast removal of the sea component from the cut bicomponent fiber at 74° C.

Example 39

Cut bicomponent fibers of Example 36 having 37 INS construction and 4.5 dpf fineness were opened in a similar manner as described in Example 36 where the agitation of the hydropulper was set at a 50% setting and the temperature of the deionized water used in the opening step was reduced to 68° C. Samples were withdrawn after 15 seconds, 30 seconds, 60 seconds, and 120 seconds conditioning of the cut bicomponent fibers in the agitated 68° C. water. The first mother liquor recovered from each of the samples was analyzed for sulfopolyester content by measuring the solids content using the method described in Example 36. The sulfopolyester content in the first mother liquor as a function of the conditioning time is displayed in FIG. 10. The time required for the solids level to reach an asymptote, where sulfopolyester removal approaches quantitative levels, is an indicator of the speed of the opening step.

At 68° C., quantitative removal of the sulfopolyester sea component was achieved after 60 seconds or longer contact time in 68° C. water but removal after short (15 seconds) contact was far from quantitative (80% of maximum value) and only after 30 seconds approaching quantitative removal. In comparison, Examples 36 through Examples 38 exhibited near quantitative removal of the sulfopolyester sea component in samples taken after 10 seconds contact time where the water temperature in these examples was also higher than in Example 39. Example 39 demonstrates a bicomponent fiber opening process that would be effective if longer fiber/hot water contact times are applied, on the order of 60 seconds or longer at 68° C., but where incomplete removal of the sea component would occur at shorter conditioning times.

Comparative Example 40

A bicomponent fiber opening process was run in the same manner as Example 36, but where the temperature of the deionized water used during the opening process was further reduced to 63° C. Samples were withdrawn after 15 seconds, 30 seconds, 60 seconds, and 120 seconds, and the first mother liquor recovered from each sample was analyzed for solids content to determine the amount of sulfopolyester removed and the opening efficiency. The rate of sulfopolyester removal is displayed in FIG. 11. This response demonstrates slower removal behavior for the sulfopolyester sea component.

About ⅔ of the sulfopolyester sea component was removed from the cut bicomponent fibers after 15 seconds contact time, and about 85% after 30 seconds contact. Removal levels were high at 60 seconds contact time but not quantitative. Opening times in excess of 2 minutes would be required at 63° C. to assure levels of sea component removal from the cut bicomponent fibers that would be considered quantitative. The primary effect of the opening process was to remove the sea component to a level that would be considered quantitative and in this regard the slow removal rates measured in Comparative Example 40 demonstrated opening conditions that would be slower on a commercial scale for opening cut bicomponent fibers comprised of sulfopolyester as the removable component. In Comparative Example 40, the agitation setting was 30% where a higher level of agitation or turbulence during the opening process can reduce the time required to affect quantitative opening and a decrease in mixing energy can slow down the opening process and require even longer times to affect complete removal of the sulfopolyester component.

The removal rates documented in this and all previous Examples are based on cut bicomponent fibers comprised of sulfopolyester as the removable component. If the removable component is replaced with a polymer type which can be removed (dissolved or emulsified) into the water phase either more easily or with greater difficulty, the temperature of the opening process will vary depending on the characteristics of the removable polymer. These examples serve to illustrate removal characteristics of bicomponent fibers containing a specific type of removable sulfopolyester polymer but are not meant to be limiting in terms of opening conditions suitable for bicomponent fibers comprised of different types of removable polymers.

Comparative Example 41

The same procedure described in Example 36 was used in Comparative Example 41 where sufficient $CaCl_2$ was added to the deionized water charge to add $Ca^{+2}$ cations to the water phase at a level of 20 ppm by weight, and the temperature of the opening process was 77° C. The sulfopolyester removal profile for fiber opening under these conditions is displayed in FIG. 12.

In comparison to Examples 36 and 37, carried out at a similar opening temperature but using deionized water, the sulfopolyester removal rates in Comparative Example 41 were much slower. In both previous examples, near quantitative removal of sulfopolyester was recorded after about 10 seconds contact time in deionized water at 79° C. In Comparative Example 41, only about 90% removal was accomplished after 30 seconds with similar levels of agitation.

Compared to the removal characteristics in Examples 36, 37, and 38, the sulfopolyester removal characteristics in Comparative Example 41 were slower, where only 90% removal was measured after 30 seconds in Comparative Example 41 while near quantitative removal was measured after 10-15 seconds in the prior examples. The removal characteristics of Comparative Example 41 were similar to the characteristics measured for Comparative Example 40 (FIG. 4) carried out at a 14° C. lower opening temperature but using deionized water with no hard cations. Comparative Example 41 serves to illustrate that the hardness of the water used in the opening process strongly influences the contact time and temperature required to open bicomponent fibers comprised of water dispersible sulfopolyester components, where 20 ppm Ca+2 hardness is borderline and higher levels may make complete fiber opening very slow or not possible.

Example 42

Continuous Bicomponent Fiber Opening Process

Previous Examples 36 through 39 illustrate the use of a batch type opening process to remove a water dispersible polymer fraction from bicomponent fibers. In commercial production, a continuous type process is generally utilized because of the higher efficiencies afforded by continuous operation. The major improvement in efficiency is due to the elimination of the batch charge and batch discharge phase of the overall batch cycle which removes a substantial amount of processing time during the batch cycle and which in turn permits the same amount of production to be accomplished using smaller equipment sizes.

There are two primary types of continuous operation applicable to an opening process for bicomponent fibers consisting of removing or extracting a water dispersible polymer from a water non-dispersible polymer fiber material into an aqueous phase. The first type process is the continuous stirred tank reactor (CSTR) in which the water and cut multicomponent fiber can be added to a stirred tank at constant proportion and constant feed rate while the opened microfiber slurry can be removed from the stirred tank at the same equal mass flow rate in order to maintain a constant level of cut multicomponent fiber slurry in the stirred tank.

The disadvantage of a CSTR is the residence time distribution of the cut multicomponent fibers inside the stirred tank during the process. In a batch type process, all product is processed for nominally the same amount of time during the batch cycle between the end of the charge phase and the start of the discharge phase. In a CSTR, the cut multicomponent fiber added to the stirred tank is mixed with material in the tank, processed for varying lengths of time, and the material discharged from the tank is comprised of microfibers which were treated inside the tank for varying lengths of time. The amount of time that microfiber stays inside the tank during the CSTR opening process is defined by a statistical average where center point of the statistical average is the average time that the microfiber material resides inside the tank. This statistical average residence time (RT) that the microfiber resides inside the stirred tank is defined by the quantity $RT=V_t/Q$ where $V_t$ is the total volume of liquid contained within the stirred tank and Q is the volumetric flow of liquid out of the tank during continuous operation.

The problem issue with a CSTR for continuous operation is that based on this statistical distribution some of the cut multicomponent fiber added to the tank resides inside for only short periods, which may be insufficient for complete fiber opening, while at the other end of the distribution, some of the cut multicomponent fibers remain in the tank for much longer than the targeted average RT during which time the small diameter microfibers can be mechanically damaged by excessive mixing over the prolonged period inside the tank.

For this reason, another method for a continuous fiber opening process is a plug flow process often used in chemical processing. In this type processing, a fluid is added to a process vessel at a constant rate, and each element of fluid added to the vessel travels through the vessel at nominally the same velocity, so that all elements of fluid are contained inside the vessel for nominally the same amount of time. Compared to a CSTR, a plug flow opening process can eliminate the problems associated with a portion of the cut multicomponent fibers residing inside the process vessel for insufficient time to become fully opened and a portion of the fiber residing in the tank for excessive times leading to mechanical damage of the microfibers.

In one embodiment of a plug flow opening process for bicomponent fibers, the plug flow vessel can be a long section of pipe in which hot aqueous multicomponent fiber slurry is added to one end of the pipe section at a constant volumetric flow rate, the multicomponent fiber slurry passes through the pipe at a nominally constant flow velocity, and the multicomponent fiber slurry exits the other end of the process pipe after a residence time inside the pipe defined by dividing the total volume contained inside the process pipe by the volumetric flow rate of the multicomponent fiber slurry into the process pipe.

General Plug Flow Bicomponent Fiber Opening Process

Several examples are provided of a continuous plug flow process for opening cut multicomponent fiber comprised of a water dispersible sulfopolyester phase which is removed from the cut multicomponent during the opening process. The specific process steps in the overall plug flow operation can be placed in the following categories:
1) Concentrated cold, cut multicomponent slurry prepared from cut multicomponent fiber;
2) Production of a hot, treated aqueous stream for mixing with the cold, cut multicomponent fiber slurry;
3) Combination of streams (1) and (2) to produce a hot multicomponent fiber slurry;
4) Fiber opening as the hot multicomponent fiber slurry (3) flows in plug flow through a process pipe to produce an opened microfiber slurry; and
5) Separation of a microfiber product stream from the opened microfiber slurry containing removed sulfopolyester polymer using a screen filtration device.

A more detailed description of each of these specific process steps is listed used in this example is provided below.

1) Preparation of a Cold, Cut Multicomponent Fiber Slurry from Cut Multicomponent Fiber City water containing nominal 25 ppm hard cations passed through a water softener to reduce the concentration of hard cations to less than 1 ppm. Softened water at about 18° C. was continuously metered into a stirred tank containing 10 gallons fluid level at a target flow rate to maintain a constant fluid level in the stirred tank. Cut multicomponent fiber of Example 36 was added continuously to the well stirred mix tank at a constant rate and proportion relative to water flow in order to generate a cold, cut multicomponent fiber slurry containing cut multicomponent fiber at the target concentration. Cold, cut multicomponent fiber slurry of cut multicomponent fiber was pumped out of the cold slurry mix tank using a variable speed centrifugal pump in order to pump out the cold cut multicomponent fiber slurry at the same rate that ingredients are fed to the mix tank in order to maintain a constant level in the cold slurry mix tank.

The operating principle of the cold slurry process step is to disperse the cut multicomponent fibers into cold water containing a low concentration of hard cations in such a way that the agitation provided is sufficient to hold the cut multicomponent fibers in suspension and prevent the cut multicomponent fibers from settling in the mix tank. Both the water temperature and residence time of the cut multicomponent fibers in the cold slurry tank are designed to prevent significant sulfopolyester removal in the cold slurry tank and minimize mechanical damage to the fibers in the tank.

2) Preparation of a Hot, Treated Aqueous Stream for the Fiber Opening Process

Deionized water was metered to inlet of a steam heated tubular heat exchanger using a micro-motion flow controller to maintain a constant hot water flow at the targeted rate. Steam was applied to the heat exchanger to heat the deionized water stream to an outlet temperature of 96° C.-98° C. at the targeted flow rate. Hot deionized water exiting the heat exchanger was channeled to a mixing tee and combined with the cold, cut multicomponent fiber slurry stream previously described.

3) Combination of Hot Water Stream and Cold Fiber Slurry Stream

The hot water stream (2) and cold, cut multicomponent fiber slurry (1) were combined in a 1½ inch pipe tee by combining both streams continuously using only the turbulence in the fluid flow to homogenously mix both streams and allowing the combined stream to continuously flow out of the mixing tee into a fiber opening section constructed of 1½ inch Schedule 40 CPVC pipe. The ratio of hot water (98° C.) flow rate to cold, multicomponent fiber slurry (18° C.) was selected so that the temperature of the combined stream is sufficiently high to cause rapid opening or removal of sulfopolyester polymer from the cut multicomponent fiber. Target temperature for the combined stream are in the nominal range 70° C. to 80° C. to cause rapid sulfopolyester during flow through the 1½ inch pipe opening device.

4) Fiber Opening in Plug Flow Through 1½ Inch Pipe Device

The opening device was constructed of (5) ten foot section of 1½ inch CPVC pipe which afforded a total 55 feet of flow length from inlet to outlet. The contained pipe volume of 0.78 ft³ was calculated. The typical flow rate of the combined fiber slurry stream was about 1.1 ft³/min., translating to a nominal residence time of 40 seconds as the combined fiber slurry flowed through the plug flow opening device.

Examples are provided where the length of the plug flow pipe section was extended to 110 feet total length to afford a total residence time of 80 seconds during the fiber opening step.

5) Opened Microfiber Recovery

Baskets 18" in diameter by 12" tall were constructed out of perforated steel sheet metal with 3/16" perforations. The holes were sufficiently small to prevent the microfiber product exiting the opening step to pass through but allow the process water to drain out. Effluent from the 1½" pipe opening device was channeled directly into the baskets to allow the first mother liquor containing sulfopolyester to drain through and recover the wet cake comprised of opened PET microfibers.

A continuous opening of 37 islands in the sea bicomponent fibers was conducted by applying the general plug flow bicomponent fiber opening process described previously to the cut bicomponent fiber of Example 36. In this example, a cold, cut bicomponent fiber slurry was produced by passing crude city water at 18° C. through a water softening unit to remove hard cations to less than 1 ppm and metering the softened water at about 2.3 gallons/minute (gpm) or nominal 9 kg./minute into a stirred tank holding previously treated water at a nominal 12 gallon liquid level. As the cold water was added to the tank, it was pumped out from the bottom of the tank and to the mixing tee and plug flow pipe section of the opening process using a variable speed centrifugal pump with 4 inch impeller, where the speed of the pump was adjusted to pump liquid out of the tank at the same nominal 2.3 gpm rate at which it was added in order to maintain a constant tank level.

As water was added to the tank, the 37 INS cut bicomponent fiber of Example 36 was continuously added to the liquid in the mix tank through a port in the top of the tank at a rate of 325 grams/minute while applying sufficient agitation to the bicomponent fiber slurry in the tank to maintain the starting cut bicomponent fiber in suspension inside the tank and prevent settling. During continuous operation, the concentration of the cut multicomponent fiber in the cold, multicomponent fiber slurry approached a steady state slurry concentration of about 3.5% fibers in water by weight.

The hot water stream for the process of Example 42 was generated by using a Pic heater device where deionized water was metered through a micro-motion flow control device at a nominal rate of 6 gpm or 22 kg/min. to the inlet of a steam heated heat exchanger. The outlet temperature of the deionized water exiting the heat exchanger was controlled at 97° C. by a temperature controller which adjusted steam pressure to the jacket of the heat exchanger in order to regulate the outlet temperature.

The hot water stream exiting the Pic heater flowed to the inlet of the mixing tee where it combined with the flow stream from the cold, bicomponent fiber slurry tank before passing through the plug flow contacting device. Total combined flow of the hot water stream and the cold, bicomponent fiber slurry stream was 8.3 gpm or 31 kg/min. The hot water stream amounted to about 71% of the combined stream by weight. Temperature of the combined stream exiting the mixing tee was measured to be 75° C. where the outlet temperature was controlled by the individual temperatures of each stream and the relative proportion at which the streams were combined in the mixing tee. Likewise, the concentration of the cut bicomponent fiber in the combined stream decreased from 3.5% in the cold slurry to 1.0% in the combined stream, based on the proportion of each individual stream before mixing.

The combined fiber slurry stream containing 1.0 weight % cut bicomponent fiber at 75° C. temperature was channeled to the inlet of the plug flow opening device. The plug flow opening device consisted of (5) sections of 1½ inch Schedule 40 CPVC pipe having a total flow length of 55 feet. The mean plug flow velocity of the cut bicomponent fiber slurry through the pipe section was calculated to be 1.2 ft/sec, and the mean residence time of the cut bicomponent slurry in the plug flow section was calculated to be 45 seconds under the flow conditions applied in Example 42. Calculation of the Reynolds number for pipe flow under these conditions determined that the flow is in the turbulent regime where the mixing energy afforded by turbulent flow assisted in the removal of the sulfopolyester polymer from the cut bicomponent fibers to produce an opened microfiber slurry. Essentially quantitative removal of sulfopolyester from the bicomponent precursor fibers in the 45 second contact time inside the pipe section was a process requirement in this example.

Microfibers were filtered out of the opened microfiber slurry exiting the plug flow contacting section using a basket filter with 3/16" perforations (40% of surface area). Compared to the microfibers of Examples 36-38, the microfibers of Example 42 filtered less effectively in terms of slower permeation rates and fine fibers passing through the filter. The effect was caused by lesser entanglement of the microfibers during flow in the plug flow section of Example 42. The turbulent mixing in Example 42 can deform and entangle the microfibers to a lesser degree than the vigorous agitation in the former Examples and dewatering screens with smaller opening may be required for the microfibers of Example 42.

The texture of the microfibers of Example 42 was dramatically changed from the texture of the starting 1.5 mm cut bicomponent fiber. The texture of the starting wet, cut bicomponent fiber was very coarse and gritty. The texture of the filtered microfibers of Example 42 was smooth to the point of being slimy in feel, indicating a dramatic change in fiber characteristics.

The microfibers of Example 42 were re-dispersed in additional water to low dilution and applied to microscope slides for characterization. Microscopic examination found the microfibers of Example 42 to be very fine fibers with nominal fiber diameters of about 3 microns, corresponding to the starting diameter of the starting PET islands domains in the 37 island in the sea cut bicomponent fiber. Microscopic examination found little evidence of residual sea material bonding the 3 micron island fibers together in the product fibers. Only a small fraction of incompletely opened fibers was noted, comprised of multiple island fibrils bonded together by residual sea material incompletely removed during the process of Example 42.

The microfibers of Example 42 were evaluated by re-dispersing filtered microfiber product in water at a 0.02% concentration of solid fiber in water and converting the dilute fiber solution to paper hand sheet samples using a standard 6.25 inch diameter TAPPI sheet former. Comparative tests were conducted using microfibers opened by a batch opening process described in Examples 36-38. The microfibers of Example 42 were noted to be qualitatively equivalent to fibers opened by a batch process in terms of both processing characteristics when re-dispersed to low solids slurry in water and in terms of sheet characteristics when the re-dispersed dilute fiber slurries were converted to paper like products by high dilution forming techniques using a conventional 6.25 inch diameter TAPPI sheet former.

Example 43

In Example 43, the process of Example 42 was conducted where the addition rate of cut, bicomponent fiber to the cold slurry tank was increased from 325 grams/min to 475 grams/minute amounting to an increase in solids level in the cold slurry stream from 3.5 weight % to 5.0 weight %. The nominal concentration of the cut bicomponent fiber in the hot slurry entering the plug flow pipe section was 1.5 weight %. The increased cut bicomponent fiber level in both the cold slurry section and the combined hot slurry section did not cause any notable processing difficulties relative to the process of Example 42.

The microfibers of Example 43 were characterized in the same manner as described in Example 42 and were found to be functionally equivalent in terms of degree of opening and subsequent behavior when re-dispersed into dilute fiber slurries and converted into sheet samples by conventional high dilution paper forming techniques.

Example 44

In Example 44, the process of Example 42 was conducted where the flow rate of cold water to the cold slurry tank was decreased from 2.3 gpm to about 2.0 gpm and the flow rate of 97° C. water from the Pic heater to the mixing tee was increased from 6.0 gpm to 7.2 gpm. The change in ratio of the hot water stream to the cold water stream served to increase the temperature of the combined stream from 75° C. in Example 42 to 80° C. in Example 44. Cut bicomponent fiber was added continuously to the cold slurry tank at about 320 grams/min. amounting to a concentration of 4.0 weight % cut bicomponent fibers in the cold, bicomponent fiber slurry stream. After combining, the concentration of the cut bicomponent fibers in the combined stream exiting the mixing tee amounted to 0.90 weight %.

Compared to the microfibers of Examples 42 and 43, the microfibers of Example 44 filtered better due to a higher degree of entanglement during flow at higher temperature through the 1½" pipe in Example 44 compared to Examples 42 and 43. Microscopic examination of the microfibers of Example 44 found them to consist of fine fibrils with a nominal 3 micron diameter corresponding to the starting diameter of the island domains in the islands in the sea cut bicomponent fibers.

Microfibers of Example 44 were re-dispersed into water at high dilutions and converted into sheet samples in the manner described in Example 42. The characteristics of the microfibers of Example 44 were noted to be qualitatively equivalent to the characteristics of the microfibers of Example 42 opened at a lower temperature in the same plug flow opening process.

Example 45

The process of Example 44 was repeated where the length of the 1½" plug flow pipe section used to contact the cut bicomponent fiber in hot water was increased to 110 feet. The effective residence time of the combined bicomponent fiber slurry at 80° C. was doubled to about 90 seconds in the process of Example 45. Filtration of the microfibers was very efficient and similar to the behavior noted in Example 44. Microscopic examination of the microfibers of Example 45 determined that the microfibers were essentially fully open and comprised of individual fine fibrils having nominal 3 micron diameter. High dilution forming tests of the product of Example 45 in the same manner as Example 44 did not identify any characteristic differences in behaviors.

In Example 45, increasing the residence time in the plug flow pipe section of the apparatus used in Examples 42-45 did not demonstrate any significant improvements relative to the lower residence time used in Examples 42-44. In these examples, the 45 seconds residence time was sufficient to remove the sulfopolyester sea polymer to a sufficient degree to cause opening of the cut bicomponent fibers because of the high temperatures used during the opening processes of Examples 42-44. In the event that a process advantage would be realized in running the opening process at the lowest possible temperature required to effectively remove the water dispersible sulfopolyester polymer from the cut bicomponent fiber, the use of longer plug flow contact times as practiced in Example 45 can provide a larger advantage than noted in these Examples.

That which is claimed is:

1. A process for producing a microfiber product stream, said process comprising:
    (A) contacting short cut multicomponent fibers having a length of less than 25 millimeters with a heated aqueous stream in a mix zone to produce a short cut multicomponent fiber slurry; wherein said short cut multicomponent fibers comprise at least one water dispersible sulfopolyester and at least one water non-dispersible polymer immiscible with said water dispersible sulfopolyester; and wherein said heated aqueous stream is at a temperature of 40° C. or greater;
    (B) mixing said short cut multicomponent fiber slurry and optionally, a heated aqueous stream, in a fiber opening zone for a sufficient time to remove a portion of said water dispersible sulfopolyester to produce an opened microfiber slurry at a temperature in the range of about 55° C. to about 100° C.; wherein said opened microfiber slurry comprises water non-dispersible polymer microfiber, water dispersible sulfopolyester, and water; wherein the weight % of solids in said opened microfiber slurry ranges from 0.1 weight % to about 20 weight %; wherein said water non-dispersible polymer microfiber has a minimum transverse dimension of less than 10 microns; and wherein at least about 50 weight % of said water non-dispersible polymer microfiber is suspended in said opened microfiber slurry;
    (C) routing said opened microfiber slurry to a primary solid liquid separation zone to produce said microfiber product stream and a first mother liquor stream; wherein said first mother liquor stream comprises water and said water dispersible sulfopolyester; and
    D) routing at least a portion of said first mother liquor stream to a second solid liquid separation zone to produce a secondary wet cake stream and a second mother liquor stream; wherein said second mother liquor stream comprises water and water dispersible sulfopolyester; and wherein said secondary wet cake stream comprises microfiber.

2. A process according to claim 1 wherein said cut multicomponent fibers have a length of less than 5 mm.

3. A process according to claim 1 wherein said heated aqueous stream comprises a treated aqueous stream produced by routing an untreated aqueous stream to an aqueous treatment zone; wherein said treated aqueous stream contains less than 50 ppm of divalent and multivalent cations; and routing said treated aqueous stream to a heat exchanger zone to produce said heated aqueous stream.

4. A process according to claim 1 wherein said mix zone comprises at least one piece of equipment selected from the group consisting of a continuous stirred tank reactor, an agitated batch tank, and a pipe.

5. A process according to claim 1 wherein said heated multicomponent fiber slurry in said mix zone has about 10 wt % to about 1 wt % cut mulitcomponet fibers.

6. A process according to claim 1 wherein said fiber opening zone comprises at least one piece of equipment selected from the group consisting of a mix tank, an agitated batch tank, a plug flow reactor, a pipe, and a continuous stirred tank reactor.

7. A process according to claim 1 wherein the temperature of said opened microfiber slurry in said fiber opening zone ranges from about 55° C. to about 100° C.

8. A process according to claim 1 wherein said primary solid liquid separation zone comprises at least one piece of equipment selected from the group consisting of perforated basket centrifuges, continuous vacuum belt filters, batch vacuum nutschfilters, batch perforated settling tanks, twin wire dewatering devices, continuous horizontal belt filters with a compressive zone, non vibrating inclined screen devices with wedge wire filter media, continuous vacuum drum filters, and dewatering conveyor belts.

9. A process according to claim 1 wherein the weight % of solids in said microfiber product stream ranges from about 10 wt % to about 65 wt %.

10. A process according to claim 1 further comprising routing at least a portion of said first mother liquor stream to:
    (A) said mix zone;
    (B) said fiber opening zone;
    (C) a heat exchange zone to produce said heated aqueous stream and routing at least a portion of said heated aqueous stream to said fiber opening zone and/or said mix zone; and/or
    (D) said primary solid liquid separation zone.

11. A process according to claim 1 further comprising routing at least a portion of said second mother liquor stream to a primary concentration zone to produce a primary polymer concentrate stream and a primary recovered water stream.

12. A process according to claim 11 further comprising purging said first mother liquor stream, said second mother liquor stream, and/or said primary recovered water stream from the process for reuse or to a wastewater treatment system.

13. A process according to claim 11 further comprising routing said primary recovered water stream to:
    (A) said mix zone;
    (B) said fiber opening zone;
    (C) a heat exchange zone to produce said heated aqueous stream and routing at least a portion of said heated aqueous stream to said fiber opening zone and/or said mix zone; and/or
    (D) said primary solid liquid separation zone as a wash stream.

14. A process according to claim 11 further comprising routing at least a portion of said primary polymer concentrate stream to a secondary concentration zone to produce a vapor stream and a melted polymer stream.

15. A process according to claim 1 further comprising routing at least a portion of said second mother liquor stream to:
    (A) said mix zone;
    (B) said fiber opening zone;
    (C) a heat exchange zone to produce said heated aqueous stream and routing at least a portion of said heated aqueous stream to said fiber opening zone and/or said mix zone; and/or
    (D) said primary solid liquid separation zone as a wash stream.

* * * * *